(12) United States Patent
Chamarty et al.

(10) Patent No.: US 12,436,590 B2
(45) Date of Patent: *Oct. 7, 2025

(54) TIME SYNCHRONIZATION OF COLLECTING AND REPORTING POWER EVENTS BETWEEN HIERARCHICAL POWER THROTTLING CIRCUITS IN A HIERARCHICAL POWER MANAGEMENT SYSTEM

(71) Applicant: QUALCOMM Incorporated, San Diego, CA (US)

(72) Inventors: Vinod Chamarty, Campbell, CA (US); Sagar Koorapati, Austin, TX (US); Sreeram Jayadev, Austin, TX (US); Alon Naveh, Corte Madera, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 18/339,430

(22) Filed: Jun. 22, 2023

(65) Prior Publication Data
US 2024/0427392 A1 Dec. 26, 2024

(51) Int. Cl.
*G06F 1/3206* (2019.01)
*G06F 1/26* (2006.01)
*G06F 1/3234* (2019.01)

(52) U.S. Cl.
CPC .............. *G06F 1/3206* (2013.01); *G06F 1/26* (2013.01); *G06F 1/3243* (2013.01)

(58) Field of Classification Search
CPC ........ G06F 1/26; G06F 1/3206; G06F 1/3243; G06F 11/3058; G06F 11/3062; G06F 1/3237; G06F 1/324
See application file for complete search history.

(56) References Cited

U.S. PATENT DOCUMENTS

| 7,337,339 | B1 | 2/2008 | Choquette et al. |
| 12,228,988 | B2 * | 2/2025 | Koorapati ................ G06F 1/32 |
| 2006/0082222 | A1 * | 4/2006 | Pincu ..................... G06F 1/3203 307/29 |

(Continued)

OTHER PUBLICATIONS

International Search Report and Written Opinion for International Patent Application No. PCT/US2024/028146, mailed Sep. 3, 2024, 16 pages.

*Primary Examiner* — Thomas J. Cleary
(74) *Attorney, Agent, or Firm* — W&T

(57) ABSTRACT

Hierarchical power estimation and throttling in a processor-based system in an integrated circuit (IC) chip, and related power management and power throttling methods are disclosed. The IC chip includes a processor as well as integrated supporting processing devices for the processor. The hierarchical power management system controls power consumption of devices in the IC chip to achieve the desired performance in the processor-based system based on activity power events generated from local activity monitoring of devices in the IC chip. The circuit levels in the hierarchical power management systems are configured to be time synchronized with each other for the synchronized monitoring and reporting of activity samples and activity power events, and the generation of power limiting management responses to throttle power consumption in the IC chip.

39 Claims, 22 Drawing Sheets

(56) References Cited

U.S. PATENT DOCUMENTS

| | | |
|---|---|---|
| 2007/0083701 A1 | 4/2007 | Kapil |
| 2007/0198863 A1* | 8/2007 | Bose ................... G06F 1/206 |
| | | 713/300 |
| 2016/0070327 A1* | 3/2016 | Nemani ............... G06F 1/3206 |
| | | 713/300 |
| 2017/0031431 A1* | 2/2017 | Khatri .................. G06F 1/3246 |
| 2018/0352509 A1 | 12/2018 | Seshadri et al. |
| 2020/0257349 A1 | 8/2020 | Lobo et al. |
| 2020/0272217 A1 | 8/2020 | Becker |
| 2022/0100247 A1 | 3/2022 | Garg et al. |
| 2022/0413581 A1 | 12/2022 | Naveh et al. |
| 2024/0427392 A1* | 12/2024 | Chamarty ............. G06F 1/324 |
| 2024/0427393 A1 | 12/2024 | Chamarty et al. |
| 2024/0427410 A1 | 12/2024 | Chamarty et al. |
| 2024/0427411 A1* | 12/2024 | Chamarty ............ G06F 1/3206 |

\* cited by examiner

TIME SYNCHRONIZATION OF COLLECTING AND REPORTING POWER EVENTS BETWEEN HIERARCHICAL POWER THROTTLING CIRCUITS IN A HIERARCHICAL POWER MANAGEMENT SYSTEM

BACKGROUND

I. Field of the Disclosure

The field of the disclosure relates to processor-based systems (e.g., a central processing unit (CPU)-based system, a graphic processing unit (GPU)-based system, or a neural network processing unit (NPU)-based system), and more particularly to power distribution management to the circuits in the processor-based systems.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU, or as a discrete hardware element that is separate from the CPU. Other examples of PUs may include neural network processing units or neural processing units (NPUs). In cases of PUs, the PUs are configured to execute software instructions that instruct a processor to fetch data from a location in memory, and to perform one or more processor operations using the fetched data.

PUs are included in a computer system that includes other supporting processing devices (circuits) involved with or accessed as part of performing computing operations in the computer system. Examples of these other supporting processing devices include memory, input/output (I/O) devices, secondary storage, modems, video processors, and related interface circuits. The PUs and supporting processing devices are referred to collectively as processing devices. Processing devices of a processor-based system can be provided in separate ICs in separate IC chips. Alternatively, processing devices of a processor-based system can also be aggregated in a larger IC, like a system-on-a-chip (SoC) IC, wherein some or all of these processing devices are integrated into the same IC chip. For example, a SoC IC chip may include a PU that includes a plurality of processor cores and supporting processing devices such as a memory system that includes cache memory and memory controllers for controlling access to external memory, I/O interfaces, power management systems, etc. A SoC may be particularly advantageous for applications in which a limited area is available for the computer system (e.g., a mobile computing device such as cellular device). To manage power distributed to the processing devices, the SoC may also include a power management system that includes one or more power rails in the SoC that supply power to its components. A separate power management integrated circuit (PMIC) that can be on- or off-chip with the SoC can independently control power supplied to the power rails. The SoC may be designed with a plurality of different power rails that are distributed within the SoC to provide power to various clusters of the processing devices for their operation. For example, all the processor cores in the SoC may be coupled to a common power rail for power, whereas supporting processing devices may be powered from separate power rails in the SoC, depending on the design of the SoC.

SUMMARY OF THE DISCLOSURE

Aspects disclosed herein include a hierarchical power estimation and throttling in a processor-based system in an integrated circuit (IC) chip. Related power management and power throttling methods are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), graphics processing unit (GPU), or neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller, mobile devices (e.g., a cellular phone, a laptop computer), as well as enterprise systems such as server chips in computer servers. The IC chip also includes a hierarchical power management system that is configured to control power consumption by the processor-based system at both local and centralized levels to achieve a desired performance within an overall power budget for the IC chip. The hierarchical power management system can be configured to control power consumption by controlling the power level (e.g., voltage level) distributed at one or more power rails in the IC chip that provide power to the PUs and the integrated supporting processing devices. For example, the hierarchical power management system can be configured to provide additional power to certain power rails supplying power to higher current demanding devices to achieve higher performance, while providing less power to other power rails to keep the overall power within power and/or thermal limits for the IC chip. The hierarchical power management system can also be configured to control power consumption by throttling performance (e.g., frequency, voltage level, etc.) of the processing devices in the processor-based system, which in turn throttles (i.e., reduces, maintains, or increases) their current demand and thus their power consumption. Note as used herein, throttle can mean to take an action that will decrease or increase a parameter that affects power and thus results in a respective decrease or increase in power consumption.

The hierarchical power management system is configured to throttle performance of the processing devices in the processor-based system, because the level of processing activity in the processing devices in a SoC can vary based on workload conditions. Some power rails in the SoC may experience heightened current demand. It is desired that this current demand not exceed the maximum current limitations of its respective power rail. Even if a higher current demand on a power rail is within its maximum current limits, a heightened activity of a processing device in the SoC can generate a sudden increase in current demand from its power rail, referred to as a "di/dt" event. This di/dt event can cause a voltage droop in the power rail, thus negatively affecting performance of processing devices powered by such power rail. Also, even if a higher current demand on a power rail is within its maximum current limits, a higher current demand can increase the overall power consumption of the SoC. Processing devices may have a maximum power rating to properly operate and/or to not impact performance in an undesired manner. Higher current demand from processing devices can also generate excess heat. Thus, the maximum power rating of the SoC may be based in part on the ability of the SoC to dissipate heat generated by the processing devices during their operation.

In exemplary aspects, the hierarchical power management system includes local area management (LAM) circuits distributed in the IC chip that are each associated with one or more processing devices in the IC chip. The LAM circuits are configured to generate power events associated with its monitored processing devices in the IC chip that represent power consumption associated with the monitored processing devices in the IC chip. The power events can be reported from local areas in the IC chip where power estimations for particular monitored processing devices are performed, to a centralized power estimation and limit (PEL) circuit in the hierarchical power management system. The PEL circuit is configured to estimate and control (i.e., throttle) power in the processor-based system in the IC chip to achieve a desired performance within an overall power budget for the IC chip. The PEL circuit determines how to throttle power based on the received power events. For example, the power events may be associated with estimations of power consumption that can be thought of as power throttle recommendations to throttle power in the IC chip if the estimated power consumption exceeds the power limits of the IC chip or negatively affects performance. The PEL circuit and the LAM circuits constitute levels of the hierarchical power management system. Optionally, the power management system may also include regional activity management (RAM) circuits, each of which are assigned to a subset of the LAM circuits. The RAM circuits may be configured to receive and aggregate activity power events reported by assigned LAM circuits. The RAM circuits may further be configured to report the aggregated power events to the PEL circuit. RAM circuits thus constitute one or more intermediate levels in the hierarchical power management system. In some aspects, a RAM circuit may also act as a LAM circuit including the functionality of aggregating local activity power events.

Additionally or alternatively, the LAM circuits, the RAM circuits (if present), and the PEL circuit are configured to detect power information and generate activity power events in a time synchronized manner so that these circuits can perform processing of activity power events as a function of time. For example, these circuits may be configured to estimate power consumption and generate power limiting management responses based on time-based power consumption. For example, the LAM circuits can be configured to sample activity of a monitored processing device for each clock pulse generated by a local clock signal. The LAM circuits can be configured to collect the sampled activity over a given local time window of a defined number of clock pulses of the local clock signal to determine time-based power information, such as current flow rate (e.g., di/dt information) relating to its monitored processing device. This is so that the LAM circuits can use the time-based power consumption information for the monitored processing device to determine locally and more quickly if such exceeds a threshold power consumption. If so, the performance of the monitored processing device can be reduced to reduce its power consumption before the PEL circuit would have time to react. The time synchronization of the LAM circuits also allows the LAM circuits to report an activity power event for each local time window based on the sampled activity in the local time window to the RAM circuits (if present) or the PEL circuit in a time synchronized manner. This allows the RAM circuit and/or PEL circuit to determine whether an expected number of activity power events or aggregated activity power events have been received or not received in their respective time windows since these circuits may also perform time-based determination and/or reporting of power consumption information for throttling power consumption of monitored processing devices and/or other target devices in the processor-based system.

For example, the PEL circuit can be configured to determine throttling of power consumption in the processor-based system based on the received activity power events as a function of time. If a RAM circuit is present in the power management system, if the RAM circuit also acts as a LAM circuit for a monitored processing device, the RAM circuit can also determine time-based power information (e.g., di/dt information) relating to its monitored processing device like described above for the LAM circuit. The RAM circuits can also be time synchronized with the LAM circuits so that the RAM circuits can determine that an expected number of activity power events have been received from its LAM circuits. The RAM circuits, if present, can also be time synchronized with the PEL circuit so that the PEL circuit can determine that an expected number of activity power events have been received from its RAM circuits.

Additionally or alternatively, to time synchronize the LAM circuits, the RAM circuits (if present), and the PEL circuit, pulses of a master clock signal are used by the LAM circuits to sample activity of its respective monitored processing device in a time-based manner. The master clock signal is also used to synchronize the local time windows of a defined number of local clock signals in the respective LAM circuits to control its LAM time windows. The local time windows dictate the time window in which activity of its monitored processing device is sampled to determine local performance throttling. The local pulses of the local clock signal can be used to control the sampling time for sampling activity of a monitored processing device. The activity samples are collected by the LAM circuit to generate an activity power event to be reported for a given local time window to its assigned RAM circuit (if present) or PEL circuit. The RAM circuit (if present) uses the master clock signal to generate a RAM clock signal that controls its RAM time windows (e.g., every one (1) microsecond (µs)) in which to receive an expected number of activity power events from the LAM circuits. The RAM circuit aggregates the received activity power events from the LAM circuit to generate an aggregated activity power event to be reported to the PEL circuit (e.g., every 1 µs). The PEL circuit uses the master clock signal to generate a throttle clock signal that controls its time windows in which to receive an expected number of activity power events (or aggregated activity power events if RAM circuits are present) and for generating power throttling responses. In this manner, the RAM circuits (if present) and the PEL circuits are all time synchronized to the respective LAM circuits and RAM circuits (if present) to control their time windows in which to expect to receive a certain number of activity power events in which to aggregate or determine time-based power consumption information in which to throttle power more accurately.

Additionally or alternatively, if an expected activity sample for a monitored processing device is not received in a given time window by the LAM circuits, the LAM circuits are configured to estimate the expected, missing/late activity sample(s) and substitute the missing activity sample(s) with the estimated activity sample(s). Also, additionally or alternatively, if an expected activity power event(s) is not received in a given time window by the RAM circuits (if present) and/or the PEL circuits, the RAM circuits (if present) and the PEL circuit is configured to estimate the expected, missing/late activity power event(s) and substitute the missing activity power event(s) with the estimated activity power event(s). In the case of the RAM circuit, this is so that the RAM circuit will report an expected number of aggregated activity power events to the PEL circuit in the time window of the PEL circuit for receiving such aggregated activity power events. In the case of the PEL circuit, this is so that the PEL circuit will receive and use a correct number of activity power events over a given time window to then determine power consumption for throttling power.

As one example, a last received activity sample or activity power event in a time window can be used as a substitute for a missing/late activity sample or activity power event(s). In another example, an average of a given number of last received activity samples or activity power events can be used as a substitute for a missing/late activity sample(s) or activity power event(s). In yet another example, a value that is stored in a register, which could be programmable, could be used as a substitute for a missing/late activity sample(s) or activity power event(s).

In this regard, in one exemplary aspect, an IC is provided. The processor-based system comprises a plurality of processing devices each coupled to at least one power rail. The processor-based system also comprises a master clock circuit configured to generate a master clock signal comprising a plurality of first pulses of a first frequency. The processor-based system comprises a hierarchical power management system, comprising a plurality of local area management (LAM) circuits, comprising a local clock circuit configured to generate a local clock signal defining a plurality of local time windows each comprising a defined number of local pulses of the local clock signal. The plurality of LAM circuits are each configured to, for each local time window of the plurality of local time windows: synchronize an initial local pulse of the local time window based on the master clock signal, sample processing activity of at least one processing device of a subset of the plurality of processing devices within the local time window comprising the defined number of local pulses of the local clock signal to generate a plurality of activity samples, determine a current flow rate of the at least one processing device within the local time window based on the plurality of activity samples, estimate power consumption of the at least one processing device based on the plurality of activity samples within the local time window, and generate an activity power event based on the estimated power consumption of the at least one processing device for the local time window. The hierarchical power management system also comprises a PEL circuit comprising a second clock circuit configured to generate a second clock signal defining a plurality of second time windows each comprising a defined number of second pulses of the second clock signal. The PEL circuit is configured to, for each second time window of the plurality of second time windows: synchronize an initial second pulse in the second time window based on the master clock signal, and receive the plurality of activity power events generated by the plurality of LAM circuits within the second time window, and generate a power limiting management response to cause power consumption to be throttled in the IC chip based on the received plurality of activity power events for the second time window.

In another exemplary aspect, a method of throttling power consumption in a processor-based system in an integrated circuit (IC) chip is provided. The method comprises generating a master clock signal comprising a plurality of first pulses of a first frequency. The method also comprises generating a local clock signal defining a plurality of local time windows each comprising a defined number of local pulses of the local clock signal in each LAM circuit of a plurality of LAM circuits. The method also comprises, for each local time window of the plurality of local time windows: synchronizing an initial local pulse of the local time window based on the master clock signal, and sampling processing activity of at least one processing device of a plurality of processing devices within the local time window comprising the defined number of local pulses of the local clock signal to generate a plurality of activity samples. The method also comprises determining a current flow rate of the at least one processing device within the local time window based on the plurality of activity samples. The method also comprises estimating power consumption of the at least one processing device based on the plurality of activity samples within the local time window. The method also comprises generating an activity power event based on the estimated power consumption of the at least one processing device for the local time window. The method also comprises generating a second clock signal defining a plurality of second time windows each comprising a defined number of second pulses of the second clock signal. For each second time window of the plurality of second time windows, the method also comprises synchronizing an initial second pulse in the second time window based on the master clock signal, and receiving the plurality of activity power events generated by the plurality of LAM circuits within the second time window, and generating a power limiting management response to cause the power consumption to be throttled in the IC chip based on the received plurality of activity power events for the second time window.

DETAILED DESCRIPTION

Figure 1:
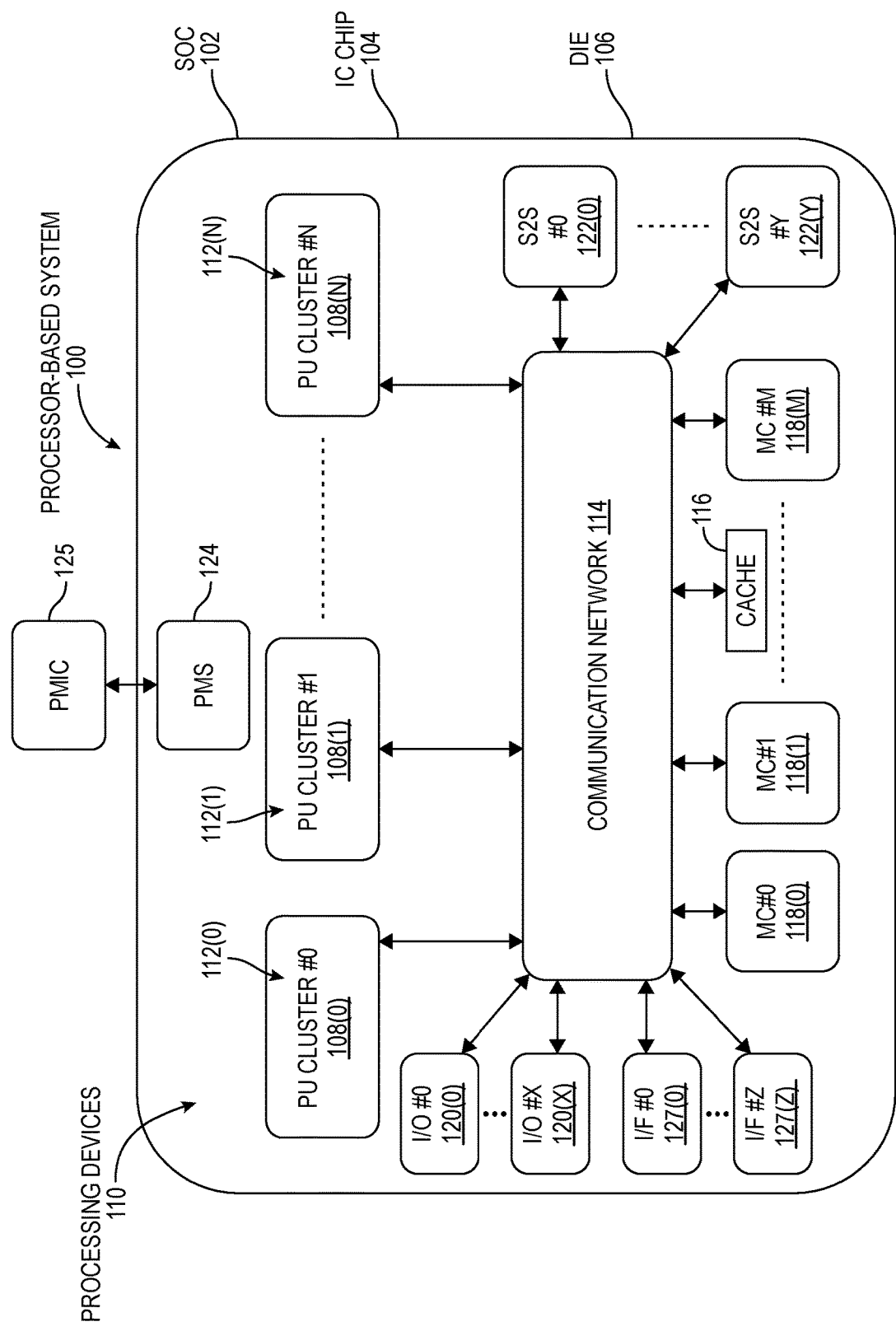
FIG. 1 is a schematic diagram of an exemplary processor-based system in the form of an exemplary system-on-a-chip (SoC) in an integrated circuit (IC) chip.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include a hierarchical power estimation and throttling in a processor-based system in an integrated circuit (IC) chip. Related power management and power throttling methods are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), or graphics processing unit (GPU), or neural network unit (NPU) wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller, mobile devices (e.g., a cellular phone, a laptop computer), as well as enterprise systems such as server chips in computer servers. The IC chip also includes a hierarchical power management system that is configured to control power consumption by the processor-based system at both local and centralized levels to achieve a desired performance within an overall power budget for the IC chip. The hierarchical power management system can be configured to control power consumption by controlling the power level (e.g., voltage level) distributed at one or more power rails in the IC chip that provide power to the PUs and the integrated supporting processing devices. For example, the hierarchical power management system can be configured to provide additional power to certain power rails supplying power to higher current demanding devices to achieve higher performance, while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note as used herein, throttle can mean to take an action that will decrease or increase a parameter that affects power and thus results in a respective decrease or increase in power consumption.

In exemplary aspects, the hierarchical power management system includes local area management (LAM) circuits distributed in the IC chip that are each associated with one or more processing devices in the IC chip. The LAM circuits are configured to generate power events associated with its monitored processing devices in the IC chip that represent power consumption associated with the monitored processing devices in the IC chip. The power events can be reported from local areas in the IC chip where power estimations for particular monitored processing devices are performed, to a centralized power estimation and limit (PEL) circuit in the hierarchical power management system. The PEL circuit is configured to estimate and control (i.e., throttle) power in the processor-based system in the IC chip to achieve a desired performance within an overall power budget for the IC chip. The PEL circuit determines how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

Additionally or alternatively, the LAM circuits, the RAM circuits (if present), and the PEL circuit are configured to detect power information and generate activity power events in a time synchronized manner so that these circuits can perform processing of activity power events as a function of time. For example, these circuits may be configured to estimate power consumption and generate power limiting management responses based on time-based power consumption. For example, the LAM circuits can be configured to sample activity of a monitored processing device for each clock pulse generated by a local clock signal. The LAM circuits can be configured to collect the sampled activity over a given local time window of a defined number of clock pulses of the local clock signal to determine time-based power information (e.g., di/dt information) relating to its monitored processing device. This is so that the LAM circuits can use the time-based power consumption information for the monitored processing device to determine locally and more quickly if such exceeds a threshold power consumption. If so, the performance of the monitored processing device can be reduced to reduce its power consumption before the PEL circuit would have time to react. The time synchronization of the LAM circuits also allows the LAM circuits to report an activity power event for each local time window based on the sampled activity in the local time window to the RAM circuits (if present) or the PEL circuit in a time synchronized manner. This allows the RAM circuit and/or PEL circuit to determine whether an expected number of activity power events or aggregated activity power events have been received or not received in their respective time windows since these circuits may also perform time-based determination and/or reporting of power consumption information for throttling power consumption of monitored processing devices and/or other target devices in the processor-based system.

In this regard, FIG. 1 is a schematic diagram of an exemplary processor-based system 100 in the form of an exemplary system-on-a-chip (SoC) 102 in an integrated circuit (IC) chip 104 in which a hierarchical power management system can be provided. The SoC 102 may be employed in smaller, mobile devices (e.g., a cellular phone, a laptop computer), as well as enterprise systems such as server chips in computer servers. The processor-based system 100 is first described with regard to FIG. 1 before exemplary hierarchical power management systems that can be provided in the processor-based system 100 to estimate and throttle power consumption in the IC chip 104 are described starting at FIG. 2 below.

With reference to FIG. 1, the processor-based system 100 is provided in a single semiconductor die 106 so that the processor-based system 100 is integrated into a single IC chip 104. The processor-based system 100 includes a plurality of processing unit (PU) clusters 108(0)-108(N) that are examples of processing devices 110 in the processor-based system 100. The PU clusters 108(0)-108(N) each can include one or more processor cores 112(0)-112(N) each configured to execute instructions (e.g., software, firmware) to carry out tasks as is known for processors. For example, the PU clusters 108(0)-108(N) may be central processing unit (CPU) clusters wherein one or more of the processor cores 112(0)-112(N) includes CPUs and/or graphics processing unit (GPU) clusters, wherein one or more of the processor cores 112(0)-112(N) includes GPUs. The processor-based system 100 includes an internal communication network 114 that facilitates providing communication paths between the PU clusters 108(0)-108(N) and other supporting processing devices, that are also considered processing devices, to carry out desired processing requests and related processing tasks. The PU clusters 108(0)-108(N) are communicatively coupled to the internal communication network 114. The internal communication network 114 can be a coherent communication bus that provides a fabric in the processor-based system 100. The internal communication network 114 can be a network fabric that typically consists of network nodes and their communication lines, network of wires, and/or communication channels that provide communication paths that provide reliable communication between different PU clusters 108(0)-108(N) and the supporting processing devices 110. Network nodes are the circuits, such as interconnected switches and routers, that provide a reliable network fabric that provides and receives data on the communication paths between different PU clusters 108(0)-108(N) and the supporting processing devices 110. The fabric provided by the internal communication network 114 also includes a network of wires or communication channels that allow different processing devices in the processor-based system 100 to communicate and exchange data with each other at high speeds.

For example, as shown in FIG. 1, the processor-based system 100 also includes internal cache memory 116 and memory controllers (MCs) 118(0)-118(M) as other types of processing devices 110 that provide access to memory. The cache memory 116 shown in FIG. 1 is a shared cache memory that is communicatively coupled to the internal communication network 114 and can be accessed by the PU clusters 108(0)-108(N) through the internal communication network 114. The processor-based system 100 may also include private cache memory and/or private shared cache memory that is integrated or privately accessible by one or more of the respective PU clusters 108(0)-108(N) without having to access such through the internal communications network 114. The memory controllers 118(0)-118(M) are communicatively coupled to the internal communication network 114 in the IC chip 104. The memory controllers 118(0)-118(M) provide the PU clusters 108(0)-108(N) access to memory for storing and retrieving data to carry out processing tasks. For example, the memory controllers 118(0)-118(M) may be coupled to external memory from the IC chip 104 or internal memory integrated in the IC chip 104.

Also as shown in FIG. 1, the processor-based system 100 in this example also includes I/O interface circuits 120(0)-120(X) as other examples of processing devices 110 that are also communicatively coupled to the internal communication network 114. The I/O interface circuits 120(0)-120(X) provide access to I/O devices, which may be internal and integrated in the IC chip 104 or external to the IC chip 104. For example, the I/O interface circuits 120(0)-120(X) may be peripheral component interconnect (PCI) interface circuits that are used for connecting I/O hardware devices to a processor-based system, like the processor-based system 100 in FIG. 1, to allow high-speed data to be transferred between devices and the PU clusters 108(0)-108(N) in the processor-based system 100.

Also as shown in FIG. 1, the processor-based system 100 in this example also includes socket-to-socket (S2S) interface circuits 122(0)-122(Y) as other examples of processing devices 110 that are also communicatively coupled to the internal communication network 114. The S2S interface circuits 122(0)-122(Y) allow the processor-based system 100 to be coupled to another separate processor-based system (which may be like the processor-based system 100 in FIG. 1) in a socket-to-socket connection. For example, the processor-based system 100 shown in FIG. 1 may be a first CPU motherboard system that can be communicatively coupled to another processor-based system through the internal communication network 114 and a coupled S2S interface circuit 122(0)-122(Y).

Also as shown in FIG. 1, the processor-based system 100 in this example also includes other interface (I/F) circuits 127(0)-127(Z) as other examples of processing devices 110 that are also communicatively coupled to the internal communication network 114. The interface circuits 127(0)-127(Z) can provide an additional external communications interface to the SoC 102, and can be configured to provide a communication interface according to the desired standard or protocol. For example, the interface circuits 127(0)-127(Z) could be PCIe interface circuits that are configured to support PCIe communications with the SoC 102.

Thus, in the processor-based system 100 in FIG. 1, the internal communication network 114 enables different processing devices such as PU clusters 108(0)-108(N) and their processor cores 112(0)-112(N), caches, the memory controllers 118(0)-118(M), the I/O interface circuits 120(0)-120(X), and/or the S2S interface circuits 122(0)-122(Y) to work together efficiently. The fabric provided by the internal communication network 114 is designed to provide high bandwidth, low latency, and efficient routing of data between different processing devices of the processor-based system 100.

Also, as shown in FIG. 1 and as described in more detail below, the processor-based system 100 also includes a hierarchical power management system 124. In this example, the hierarchical power management system 124 is integrated into the same IC chip 104 and in the same die 106 that includes the PU clusters 108(0)-108(N) and the internal communication network 114. The hierarchical power management system 124 is configured to control power consumption of the processor-based system 100 by controlling power consumption of some or all of the processing devices 110 in the IC chip 104. The hierarchical power management system 124 is configured to control power consumption to achieve a desired performance within an overall power budget for the IC chip 104. For example, the processor-based system 100 may have an overall power budget that is based on the ability of the IC chip 104 to dissipate heat generated by the operation of the processor-based system 100. The processor-based system 100 may also have an overall power budget that is based on a current limit of power rails in the IC chip 104. The power budget of the processor-based system 100 may also be based on power supply limits of a power supply that is powering the processor-based system 100. Thus, the hierarchical power management system 124 can be configured to control power consumption by controlling the power level (e.g., voltage level, operating frequency) distributed at one or more of the power rails in the IC chip 104 that provide power to the processing devices 110. For example, the hierarchical power management system 124 can be configured to cause additional power to be supplied to certain power rails thereby supplying power to higher current demanding devices to achieve higher performance, while providing less power to other power rails to keep the overall power within power and/or thermal limits for the IC chip 104. For example, the hierarchical power management system 124 can be configured to communicate with or include a power management integrated circuit (PMIC) chip 125 (that can either be on-chip or off-chip to the SoC 102) to actually cause the power supplied to certain power rails to be adjusted.

Also, as discussed in more detail below, the hierarchical power management system 124 can also be configured to control power consumption in the processor-based system 100 by throttling performance (e.g., frequency and/or voltage) of the processing devices 110 in the processor-based system 100. Throttling may refer to any measure (for example, modifying a clock frequency, and/or a supply voltage) to effect (i.e., reduce, maintain, or increase) power consumption. This in turn throttles (i.e., reduces, maintains, or increases) the current demand of such processing devices 110 and thus their power consumption in the IC chip 104. Performance of clocked circuits in the processing devices 110 in the processor-based system 100 in terms of frequency (f) is related to power (P) according to the power equation $P = c\,f\,V^2$, where 'c' is capacitance and 'V' is voltage. Thus, reducing frequency and/or voltage of a clocked circuit in a processing device 110 in the processor-based system 100 also reduces its power consumption.

Figure 2:
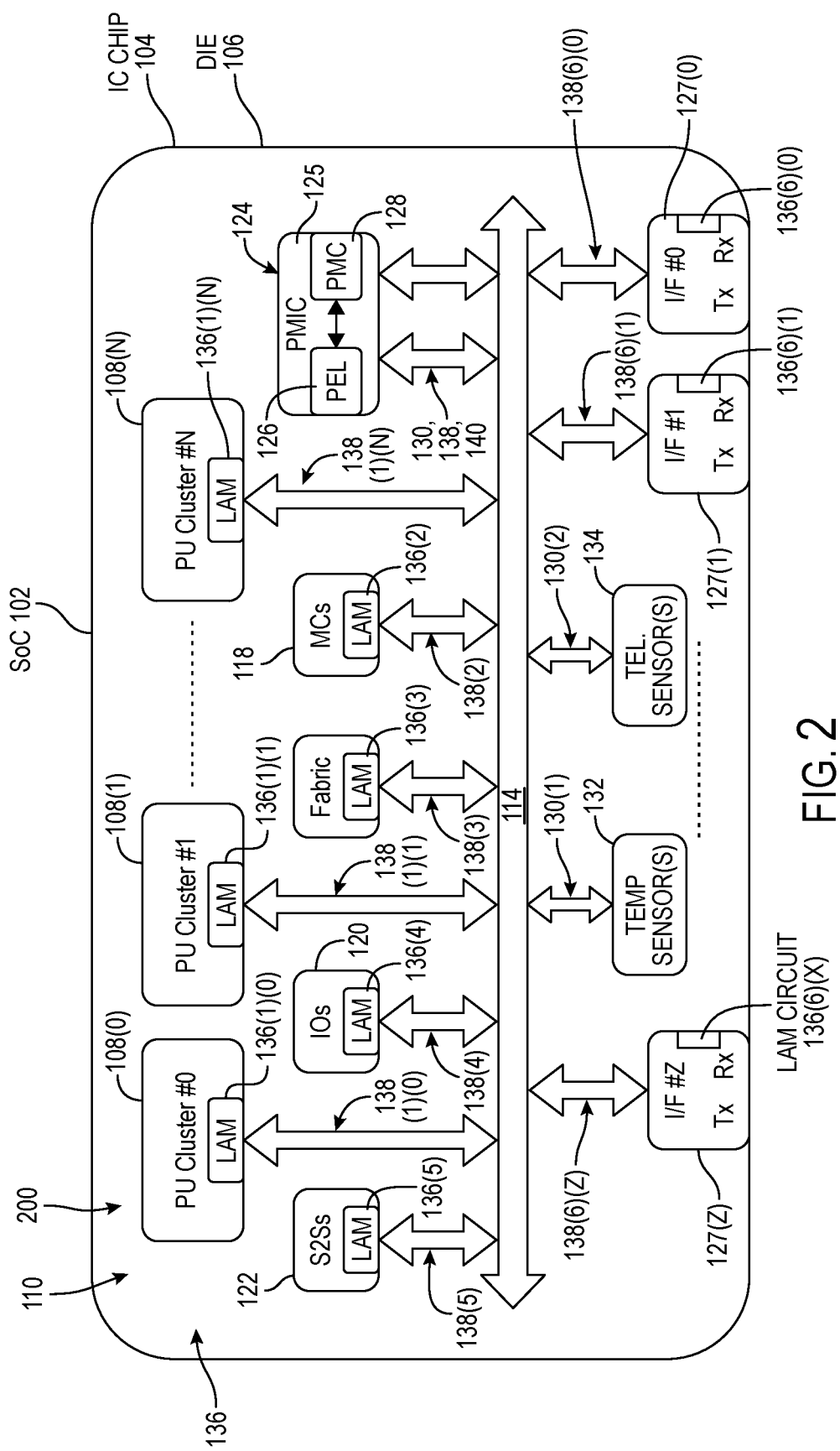
FIG. 2 is a logic diagram of the exemplary processor-based system in FIG. 1 illustrating processing circuits and other support devices communicatively coupled to an internal communication network, and a hierarchical power management system that is configured to perform power estimation and throttling of power consumption.

FIG. 2 is a logic diagram of the exemplary processor-based system 100 in FIG. 1 illustrating processing devices 110 communicatively coupled to the internal communication network 114, and the hierarchical power management system 124 to control power consumption in the IC chip 104. Common elements in the processor-based system 100 in FIGS. 1 and 2 are shown with common elements numbers and thus are not re-described. The IC chip 104 can also include target devices 200 whose control affects power, which can include the processing devices 110 and other circuits that are described below. As will be discussed in more detail below, the hierarchical power management system 124 is configured to throttle power to target devices 200 as well as processing devices 110 to throttle power consumption in the IC chip 104.

As also shown in FIG. 2, the hierarchical power management system 124 includes a centralized power estimation and limiting (PEL) circuit 126 that is configured to estimate power consumption in the IC chip 104 and take actions to limit or throttle power consumption in the IC chip 104. In this example, the PEL circuit 126 can be provided as part of a power management integrated circuit (PMIC) 125 that is integrated in the IC chip 104. The PEL circuit 126 may communicate such power throttling requests to a power management controller (PMC) 128, for example, that is configured to control power provided by voltage rails in the IC chip 104. Throttling power consumption can include both increasing power (e.g., increasing voltage to power rails) to increase power consumption for increased performance as well as decreasing power (e.g., decreasing voltage to power rails) to decrease power consumption. The hierarchical power management system 124 is configured to estimate power consumption in the IC chip 104 through receipt of power events 130 reported to it from devices at lower hierarchical levels in the IC chip 104 that provide information that provides an indirect indication of power consumption. For example, the IC chip 104 may have one or more temperature sensor(s) 132 that are configured to report thermal power events 130(1) to the PEL circuit 126 to provide an indication of the temperature in the IC chip 104 which can then be correlated to power consumption by the processor-based system 100 in the IC chip 104. As another example, the IC chip 104 may have one or more telemetry sensor(s) 134 (e.g., current sensors) that are configured to detect and report telemetry power events 130(2) to the PEL circuit 126 to provide an indication of the telematics information in the IC chip 104 which can then also be correlated to power consumption by the processor-based system 100 in the IC chip 104.

The power consumption of the processing devices 110 in the processor-based system 100 contributes to the power consumption in the IC chip 104. Thus, it may be desired to also have a way for the PEL circuit 126 in the hierarchical power management system 124 to receive a direct indication of power consumption for the processing devices 110. The PEL circuit 126 can then also use this information to estimate power consumption in the IC chip 104 and use such information to throttle the power consumption in the IC chip 104. In this regard, as shown in FIG. 2, hierarchical power management system 124 also includes local area management (LAM) circuits 136 that are each associated with one or more processing devices 110 in the IC chip 104. The LAM circuits 136 could be placed in various places in the IC chip 104, including at corners of the IC chip 104 where power estimation and power limiting may need to be performed. For example, LAM circuits 136(1)(0)-136(1)(N) may be associated with one or more of the PU clusters 108(0)-108(N) as shown in FIG. 2. As another example, LAM circuits 136(2)-136(5), 136(6)(0)-136(6)(X) may also be associated with respective one or more of the memory controllers 118, the internal communication network 114, e.g., the fabric, one or more of the I/O interface circuits 120, the one or more of the S2S circuits 122, and/or one or more interface circuits 127(0)-127(Z). Each LAM circuit 136(2)-136(5), 136(6)(0)-136(6)(X) is configured to monitor the activity related to its associated processing device 110 as a monitored processing device 110 to then generate respective activity power events 138(1)(0)-138(1)(N), 138(2)-138(5), 138(6)(0)-138(6)(Z) that are communicated directly or indirectly to the PEL circuit 126. The activity power events 138(1)(0)-138(1)(N), 138(2)-138(5), 138(6)(0)-138(6)(Z) contain information that relates to power consumption of the respective monitored processing device 110. For example, the activity power events 138(1)(0)-138(1)(N), 138(2)-138(5), 138(6)(0)-138(6)(Z) could contain processing activity information, or power consumption information that is generated by the respective LAM circuits 136(1)(0)-136(1)(N), 136(2)-136(5), 136(6)(0)-136(6)(X) estimating power consumption of its monitored processing device 110 based on processing activity of its monitored processing device 110. In either case, in this manner, the activity power events 138 can be reported from local areas in the IC chip 104 where power estimations for particular monitored processing devices 110 are performed, to the centralized PEL circuit 126. The PEL circuit 126 can then be configured to use the received activity power events 138 and/or the other power events 130 to estimate and control (i.e., throttle) power in the processor-based system 100 in the IC chip 104 to achieve a desired performance within an overall power budget for the IC chip 104. For example, the activity power events 138 that are associated with estimations of power consumption of processing devices 110 that can be thought of in essence as power throttle recommendations to the PEL circuit 126 for the PEL circuit 126 to throttle power in the IC chip 104 if the estimated power consumption exceeds the power limits of the IC chip 104 or negatively affects performance in an undesired manner.

By the PEL circuit 126 being configured to receive activity power events 138 relating to activity for individual processing devices 110 in the processor-based system 100, this may also allow the PEL circuit 126 to throttle power consumption locally to certain processing devices 110 that are responsible for increased power consumption. This allows the PEL circuit 126 to throttle power with more discrimination rather than solely throttling power to power rails or in other ways in the IC chip 104 that affects the power delivered to a larger set of processing devices 110 as a whole. For example, as discussed in more detail below, the PEL circuit 126 can be configured to use the received activity power events 138 to perform performance throttling of processing devices 110 in the processor-based system 100 to throttle its power consumption. The PEL circuit 126 can be configured to generate power limiting management responses 140 to be communicated to certain LAM circuits 136 in the processor-based system 100 to cause such LAM circuits 136 to limit performance of its monitored processing device 110.

Performance throttling of a processing device 110 in the processor-based system 100 to throttle its power consumption can be accomplished in different manners. For example, as discussed in more detail below, performance throttling can be achieved by the PEL circuit 126 by generating a throughput throttling power limiting management response 140, which is destined for the LAM circuit 136(3) associated with the internal communication network 114. The LAM circuit 136(3) can be configured to throttle the throughput of communication traffic in the internal communication network 114, such as at a particular network node in the internal communication network 114, to throttle current demand in the internal communication network 114 and thus its power consumption. Throughput throttling can be isolated to only certain areas or network nodes in the internal communication network 114. In another example, as discussed in more detail below, performance throttling in the processor-based system 100 can be achieved by the PEL circuit 126 by generating a clock throttling power limiting management response 140 to cause a clock circuit (which may be clocking one or more of the processing devices 110) to throttle the speed (i.e., clock frequency) of certain clocked processing devices 110. Clock throttling of a processing device 110 throttles its current demand which throttles its power consumption. In another example, as discussed in more detail below, performance throttling in the processor-based system 100 can be achieved by throttling or changing power states of a monitored processing device 110 to throttle its performance and thus its power consumption.

Figure 3:
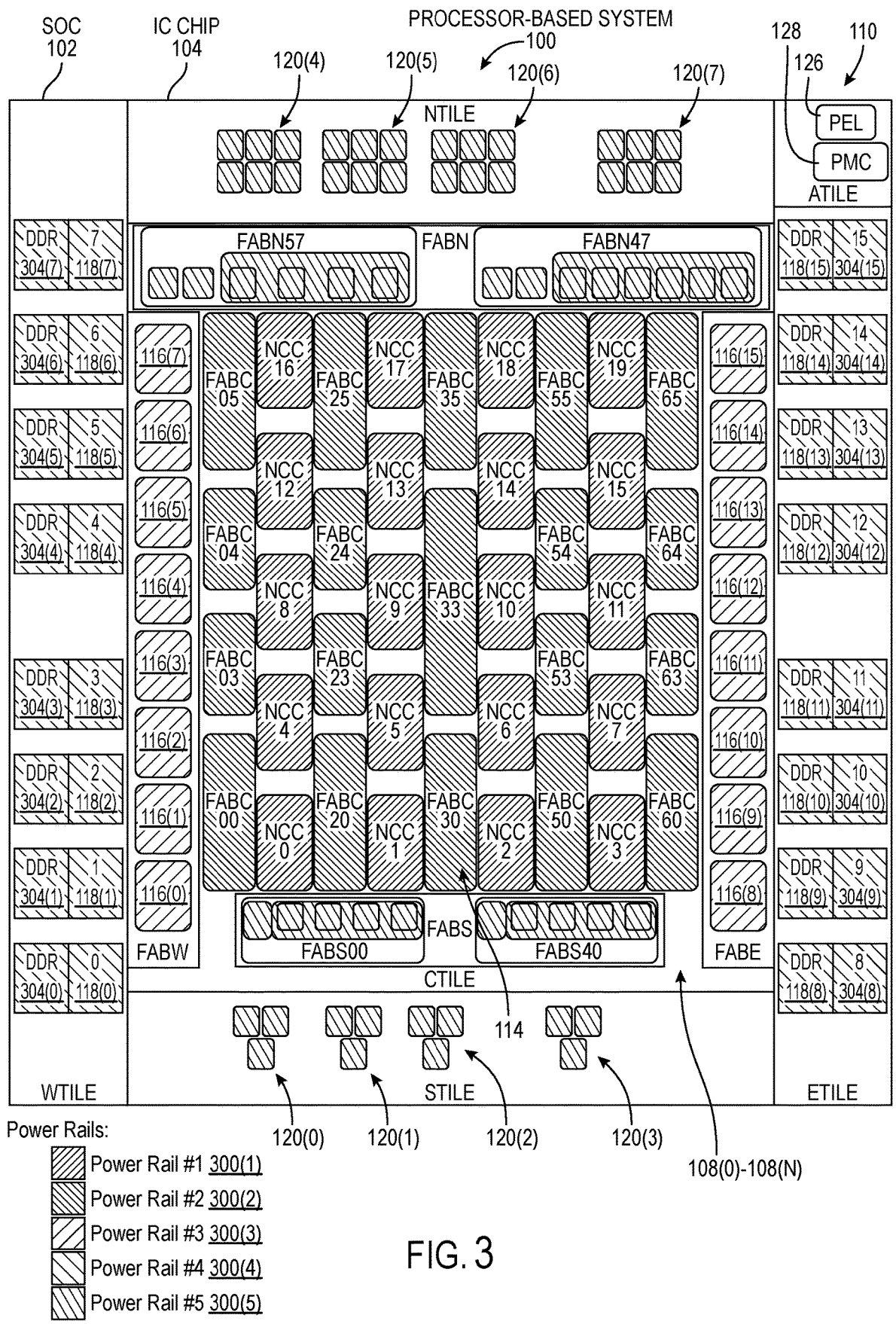
FIG. 3 is a top view of an exemplary physical layout of the semiconductor die ("die") that is an SoC in an IC chip of the processor-based system in FIG. 1 illustrating the physical layout of different tile regions and the devices physically present in such different tile regions, and coded with indicia indicating which devices are powered from separate power rails supplied with power from the hierarchical power management system.

FIG. 3 is a top view of an exemplary physical layout the semiconductor die ("die") 102 of the IC chip 104 in FIG. 1 that includes the processor-based system 100 to illustrate further exemplary details of the physical layout of the hierarchical power management system 124 and an exemplary organization of power rails provided in the processor-based system 100.

As shown in FIG. 3, the IC chip 104 has a physical layout that includes a center tile CTILE, a west tile WTILE, an east tile ETILE, a south tile STILE, a north tile NTILE, and an A-tile ATILE. A tile is a smaller section of a semiconductor die that has been processed in a wafer process and contains a set of IC components. The center tile CTILE in this example includes the PU clusters 108(0)-108(N), shown as NCC0-NCC19. Different numbers of processor cores can be provided in different PU clusters 108(0)-108(N), NCC0-NCC19. In this example, the PU clusters 108(0)-108(N), NCC0-NCC19 are all powered by a same power rail 300(1). The center tile CTILE in this example also includes the internal communication network 114, which is shown by a plurality of center network nodes FABC00-FABC65. The network nodes FABC00-FABC65 are circuits that create a network fabric ("fabric") of communication paths between the different PU clusters 108(0)-108(N) and the supporting processing devices 110. In this example, the network nodes FABC00-FABC65 are powered by a second power rail 300(2). The network nodes FABC00-FABC65 are circuits that can include interconnected switches and/or routers, that provide a reliable network fabric that provides and receives data on the internal communications network 104 between different PU clusters 108(0)-108(N) and the supporting processing devices 110. The center tile CTILE in this example also includes the system level cache memory 116(0)-116(7) powered by a third power rail 300(3) to provide shared cache memory 116 for the PU clusters 108(0)-108(N), NCC0-NCC19. The system level cache memory 116(0)-116(7) that is organized into different quadrants adjacent to and coupled to respective memory circuits DDR0-DDR7 that include respective memory controllers 118(0)-118(7) and coupled memory 304(0)-304(7) (e.g., dynamic data random access memory (DDR) circuits) in the west tile WTILE to provide memory interlacing schemes for example. The memory circuits DDR0-DDR7 may be powered by yet a separate, fourth power rail 300(4). The memory circuits DDR0-DDR7 are also communicatively coupled to the internal communication network 114 through the respective network nodes FABC00-FABC05.

With continuing reference to FIG. 3, the center tile CTILE in this example also includes the system level cache memory 116(8)-116(15), also powered by the third power rail 300(3), to provide additional shared cache memory 116 for the PU clusters 108(0)-108(N), NCC0-NCC19. The system level cache memory 116(8)-116(15) may be organized into different quadrants adjacent to respective memory circuits DDR8-DDR15 that include respective memory controllers 118(8)-118(15) and coupled memory 304(8)-304(15) (e.g., DDR circuits) in the cast tile ETILE to provide memory interlacing schemes for example. The memory circuits DDR8-DDR15 are also shown as being powered by the same fourth power rail 300(4) as is powering the memory circuits DDR0-DDR7 in the west tile WTILE. The memory circuits DDR8-DDR15 are also communicatively coupled to the internal communication network 114 through the respective network nodes FABC60-FABC65.

With continuing reference to FIG. 3, the center tile CTILE of the IC chip 104 in this example includes request node circuits FABS00, FABS40, FABN57, FABN47 that are coupled to the internal communication network 114 to provide network interfaces between the I/O interface circuits 120(0)-120(3), 120(4)-120(7) and the internal communication network 114 in the respective south tile STILE and north tile NTILE.

The request node circuits FABS00, FABS40, FABN57, FABN47 manage the traffic requests from the I/O interface circuits 120(0)-120(3), 120(4)-120(7) to the internal communication network 114 and vice versa. The request node circuits FABS00, FABS40, FABN57, FABN47 and the I/O interface circuits 120(0)-120(3), 120(4)-120(7) in this example are powered by a fifth power rail 300(5).

With continuing reference to FIG. 3, the A-tile ATILE in the IC chip 104 includes the PEL circuit 126 and the PMC 128 of the hierarchical power management system 124 in this example.

Thus, as shown in FIG. 3, the processing devices 110 in the processor-based system 100 in the IC chip 104 are powered by a series of different power rails 300(1)-300(5). Thus, the PEL circuit 126 in the hierarchical power management system 124 has the resolution of each of these different power rails 300(1)-300(5) in which to vary the voltage on such power rails 300(1)-300(5) to throttle power consumption in the IC chip 104 based on the power events 130, 138. Note that each power rail 300(1)-300(5) can actually be included as a single or multiple power rails.

Figure 4:
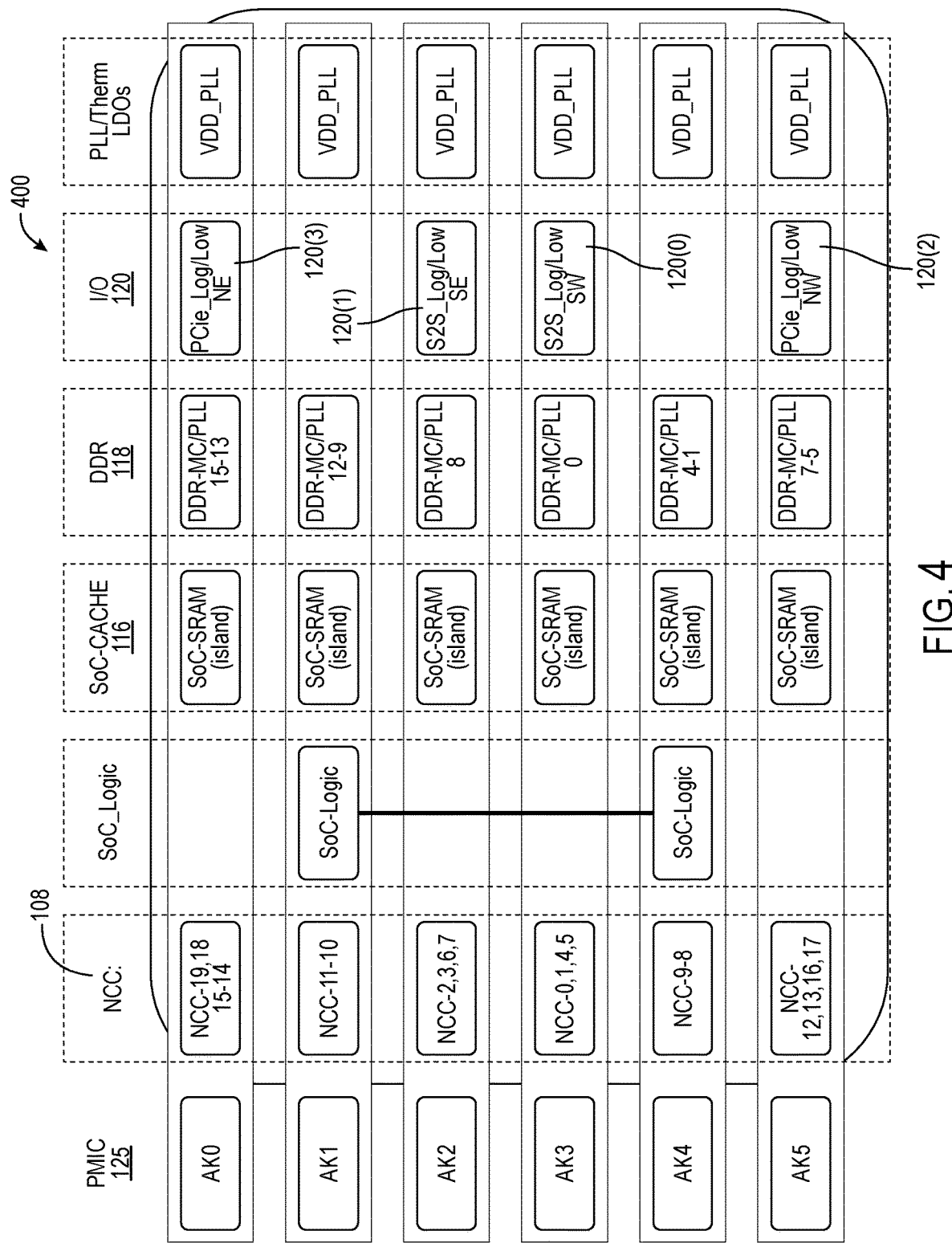
FIG. 4 is a table illustrating an exemplary assignment of power rails driven by respective power management ICs (PMIC) in the processor-based system in FIG. 1, to devices in the processor-based system for supplying power to such devices.

FIG. 4 is a table 400 illustrating an exemplary assignment of power management circuits AK0-AK5 in the PMIC 125 in the processor-based system 100, to devices in the processor-based system 100 for supplying power to such devices. Power management circuits AK0-AK5 can be responsible to control one or more different power rails 300(1)-300(5) as shown in FIG. 3 to supply power to various components. Multiple devices in the processor-based system 100 can be coupled to the same power rail 300(1)-300(5) to receive power. For example, as shown in FIG. 4, in this example, PU clusters NCC19, 18, 15, 14 are powered from power rails controlled by power management circuit AK0, PU clusters NCC 11-10 are powered from power rails controlled by power management circuit AK1, PU clusters NCC2, 3, 6, 7 are powered from power rails controlled by power management circuit AK2, PU clusters NCC0, 1, 4, 5 are powered from power rails controlled by power management circuit AK3, PU clusters NCC9-8 are powered from power rails controlled by power management circuit AK4, and PU clusters NCC12, 13, 16, 17 are powered from power rails controlled by power management circuit AK5. Also, as shown in FIG. 4, a single device in the processor-based system 100 can be coupled to more than one power rail to receive power. For example, power supplied to the logic circuits (SoC_Logic) can be controlled by the multiple power management circuits AK1-AK4. The cache memory 116 can be supplied power from power rails controlled by the power management circuits AK0-AK5. Different memory controllers 118 are shown as being powered by power rails controlled by the power management circuits AK0-AK5. The I/O interface circuits 120(0)-120(3) are shown as being powered by power rails controlled by separate respective power management circuits AK3, AK2, AK5, AK0.

Figure 5:
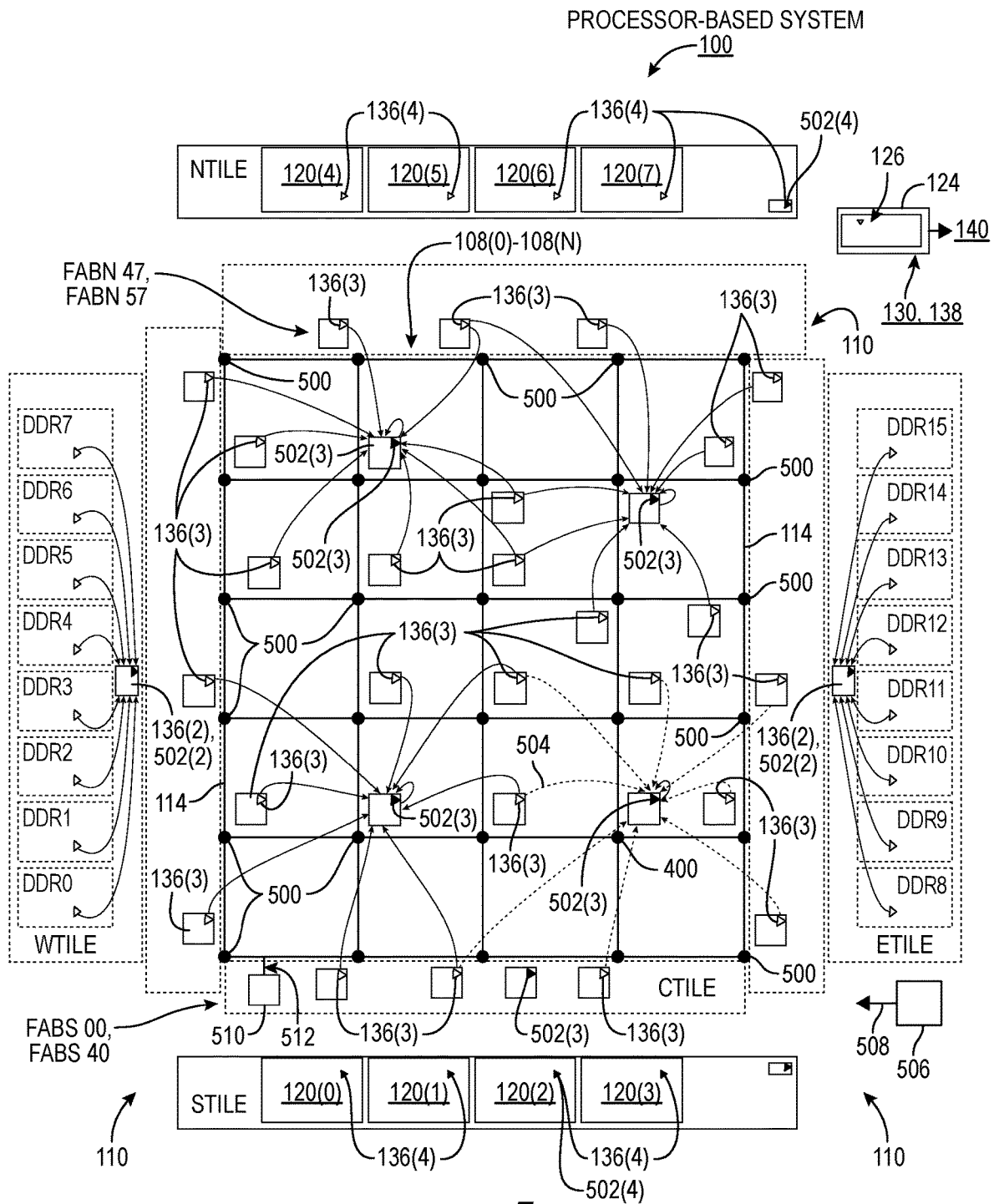
FIG. 5 is another top view of the processor-based system in the IC chip in FIG. 1 illustrating local area management (LAM) circuits, regional area management (RAM) circuits, and a power estimation and limiting (PEL) circuit as part of a hierarchical power management system, wherein the hierarchical power management system is configured to locally monitor activity of devices in the processor-based system to estimate and throttle its power consumption and report activity power events regarding estimated power consumption to the PEL circuit, wherein the PEL circuit is configured to collect activity power events regarding power consumption of the monitored processing devices and throttle power in the IC chip in response.

FIG. 5 is another top view of the processor-based system 100 in the IC chip 104 in FIG. 1 illustrating the local area management (LAM) circuits 136, and the PEL circuit 126 as part of the hierarchical power management system 124. As discussed above with regard to FIG. 2, the LAM circuits 136 are configured to locally monitor activity of processing devices 110, such as the PU clusters 108(0)-108(N) in the processor-based system 100 to estimate and throttle its power consumption and report activity power events 138 regarding estimated power consumption to the PEL circuit 126. The processor-based system 100 in this example includes a clock circuit 506 that generates a clock signal 508 to clock the PU clusters 108(0)-108(N) to control the speed of the PU clusters 108(0)-108(N). The PEL circuit 126 is configured to collect activity power events 138 regarding power consumption of the monitored processing devices 110 and issue power limiting management responses 140 in response to throttle power consumption in the IC chip 104.

As shown in FIG. 5, a plurality of LAM circuits 136(3) are distributed in the center tile CTILE and associated with respective network node 500 (as processing devices 110) of the internal communication network 114. For example, the internal communication network 114 can be a mesh network like shown in FIG. 5. The internal communication network 114 is capable of routing communication traffic from the PU clusters 108(0)-108(N) through different network nodes 500 based on performance and traffic characteristics of the internal communication network 114. In this manner, the throughput of the internal communication network 114 is not limited by any single network node 500. The processor-based system 100 in this example includes a clock circuit 510 that generates a clock signal 512 to clock the network nodes 500 to control the speed of the internal communication network 114. The clock circuit 510 is another example of a target device 200 in the IC chip 104. As will be discussed in more detail below, the LAM circuits 136(3) associated with the network nodes 500 in the internal communication network 114 are configured to sample processing activity of respective assigned network nodes 500 to generate a plurality of activity samples. The LAM circuits 136(3) are then configured to estimate power consumption of the assigned network node 500 based on the activity samples regarding its assigned network node 500 to generate an activity power event 138 based on such estimated power consumption of the respective network node 500.

Also, as shown in FIG. 5, in this example, the hierarchical power management system 124 also includes regional activity management (RAM) circuits 502(3) configured to monitor activity of the internal communication network 114. The RAM circuits 502(3) are located in a particular region of the internal communication network 114 with each being assigned and coupled to a subset of the LAM circuits 136(3). The RAM circuits 502(3) are intermediate power management circuits in the hierarchical power management system 124. The RAM circuits 502(3) are coupled to the PEL circuit 126 through a second communication network 504. The RAM circuits 502(3) are communicatively and hierarchically located between the LAM circuits 136(3) and the centralized PEL circuit 126. The RAM circuits 502(3) are configured to receive and aggregate activity power events 138 reported by assigned LAM circuits 136(3) regarding activity of their monitored network node 500. The RAM circuits 502(3) can then aggregate these activity power events 138 and report an aggregated activity power event to the PEL circuit 126 so that the PEL circuit 126 can determine how power consumption of network nodes 500 should be throttled to achieve a desired overall performance of the internal communication network 114 while also maintaining power consumption within desired limits. The PEL circuit 126 can communicate a power limiting management response 140 back to a given RAM circuit 502(3) to perform throughput throttling of a given network node(s) 500 in response to the power consumption of a network node(s) 500 being determined to exceed desired limits. For example, as discussed in more detail below, the RAM circuit 502(3) can be configured to throttle throughput of a given network node(s) 500 by selectively enabling and disabling communication traffic through the network node(s) 500.

Also, as shown in FIG. 5, in this example, a plurality of LAM circuits 136(2) are distributed in the west tile WTILE and the east tile ETILE and associated with respective memory circuits DDR0-DDR7, DDR8-DDR15 (as processing devices 110).

As will also be discussed in more detail below, the LAM circuits 136(2) associated with the memory circuits DDR0-DDR7, DDR8-DDR15 are configured to sample processing activity of respective assigned memory circuits DDR0-DDR7, DDR8-DDR15 to generate a plurality of activity samples. The LAM circuits 136(2) are then configured to estimate power consumption of the assigned memory circuit DDR0-DDR7, DDR8-DDR15 based on the activity samples regarding their assigned network node 500 to generate an activity power event 138 based on such estimated power consumption of the respective memory circuits DDR0-DDR7, DDR8-DDR15.

Also, as shown in FIG. 5, in this example, the hierarchical power management system 124 also includes RAM circuits 502(2) configured to monitor activity of the memory circuits DDR0-DDR7, DDR8-DDR15. The RAM circuits 502(2) are located in a particular region of the memory circuits DDR-DDR7, DDR8-DDR15 with each being assigned and coupled to a subset of the LAM circuits 136(2). The RAM circuits 502(2) are communicatively and hierarchically located between the LAM circuits 136(2) and the centralized PEL circuit 126. The RAM circuits 502(2) are coupled to the PEL circuit 126 through the second communication network 504. The RAM circuits 502(2) are configured to receive and aggregate activity power events 138 reported by assigned LAM circuits 136(2) regarding activity of their monitored memory circuits DDR0-DDR7, DDR8-DDR15. The RAM circuits 502(2) can then aggregate these activity power events 138 and report an aggregated activity power event to the PEL circuit 126 so that the PEL circuit 126 can determine how power consumption of the memory circuits DDR0-DDR7, DDR8-DDR15 should be throttled to achieve a desired overall performance of the memory circuits DDR0-DDR7, DDR8-DDR15 while also maintaining power consumption within desired limits. The PEL circuit 126 can communicate a power limiting management response 140 back to a given RAM circuit 502(2) to perform throughput and/or performance throttling of a given memory circuit(s) DDR0-DDR7, DDR8-DDR15 in response to the power consumption of a memory circuit DDR0-DDR7, DDR8-DDR15 being determined to exceed desired limits. For example, as discussed in more detail below, the RAM circuit 502(2) can be configured to throttle throughput and/or performance of a given memory circuit(s) DDR0-DDR7, DDR8-DDR15 by selectively enabling and disabling memory access requests/responses to the memory circuits DDR0-DDR7, DDR8-DDR15.

Also, as shown in FIG. 5, in this example, the hierarchical power management system 124 also includes RAM circuits 502(4) configured to monitor activity of the I/O interface circuits 120(0)-120(7). The RAM circuits 502(4) are located in a particular region of the I/O interface circuits 120(0)-120(7) with each being assigned and coupled to a subset of the LAM circuits 136(4) as shown. The RAM circuits 502(4) are communicatively and hierarchically located between the LAM circuits 136(4) and the centralized PEL circuit 126. The RAM circuits 502(4) are coupled to the PEL circuit 126 through the second communication network 504. The RAM circuits 502(4) are configured to receive and aggregate activity power events 138 reported by assigned LAM circuits 136(4) regarding activity of their monitored I/O interface circuits 120(0)-120(7). The RAM circuits 502(4) can then aggregate these activity power events 138 and report an aggregated activity power event to the PEL circuit 126 so that the PEL circuit 126 can determine how power consumption of the I/O interface circuits 120(0)-120(7) should be throttled to achieve a desired overall performance of the I/O interface circuits 120(0)-120(7) while also maintaining power consumption within desired limits. The PEL circuit 126 can communicate a power limiting management response 140 back to a given RAM circuit 502(4) to perform throughput and/or performance throttling of a given I/O interface circuit(s) 120(0)-120(7) in response to the power consumption of an I/O interface circuit(s) 120(0)-120(7) being determined to exceed desired limits. For example, as discussed in more detail below, the RAM circuit 502(4) can be configured to throttle throughput and/or performance of a given I/O interface circuit(s) 120(0)-120(7) by selectively enabling and disabling access requests/responses to the I/O interface circuit(s) 120(0)-120(7).

As shown back in FIG. 2, LAM circuits 136(1)(0)-136(1)(N) can also be associated with each PU cluster 108(0)-108(N) in the processor-based system 100 to sample activity therein to estimate power consumption in a respective PU cluster 108(0)-108(N). The LAM circuits 136(1)(0)-136(1)(N) can be configured to generate activity power events 138 that includes the estimated power consumptions in response to a RAM circuit 502, which in turn aggregates such activity power events 138 to the PEL circuit 126. The RAM circuits 502 assigned to the subset of LAM circuits 136(1)(0)-136(1)(N) are coupled to the PEL circuit 126 through the second communication network 504. The PEL circuit 126 can generate power limiting management responses 140 in response to throttle the performance of the PU clusters 108(0)-108(N).

As also shown in FIG. 2, LAM circuits 136(5) can also be associated with each S2S interface circuit 122(0)-122(Y) in the processor-based system 100 to sample activity therein to estimate power consumption in a respective S2S interface circuit 122(0)-122(Y). The LAM circuits 136(5) can be configured to generate activity power events 138 that includes the estimated power consumptions in response to a RAM circuit 502, which in turn aggregates such activity power events 138 to the PEL circuit 126. The RAM circuits 502 assigned to the subset of LAM circuits 136(5) are coupled to the PEL circuit 126 through the second communication network 504. The PEL circuit 126 can generate power limiting management responses 140 in response to throttle the performance of the S2S interface circuits 122(0)-122(Y).

As shown back in FIG. 2, LAM circuits 136(6)(0)-136(6)(X) can also be associated with each interface circuit 127(0)-127(Z) in the processor-based system 100 to sample activity therein to estimate power consumption in a respective interface circuit 127(0)-127(Z). The LAM circuits 136(6)(0)-136(6)(X) can be configured to generate activity power events 138 that includes the estimated power consumptions in response to a RAM circuit 502, which in turn aggregates such activity power events 138 to the PEL circuit 126. The RAM circuits 502 assigned to a subset of LAM circuits 136(6)(0)-136(6)(X) is coupled to the PEL circuit 126 through the second communication network 504. The PEL circuit 126 can generate power limiting management responses 140 in response to throttle the performance of the interface circuits 127(0)-127(Z).

In this example, any of the RAM circuits 502, 502(2)-504(4) discussed above can also include circuitry to behave functionally as a LAM circuit for an assigned processing device 110. In this regard, any of the RAM circuits 502, 502(2)-504(4) can also be configured to sample the processing activity of its respective assigned processing device 110 to generate a plurality of activity samples for such processing device 110. Such RAM circuits 502, 502(2)-504(4) can be configured to estimate power consumption of its assigned processing device 110 based on the activity samples regarding its assigned processing device 110 to generate an aggregated activity power event based on such estimated power consumption of the respective processing device 110 and the other received activity power events 138 from its coupled LAM circuits 136(1)(0)-(1)(N), 136(2)-136(5), 136(6)(0)-136(6)(X).

Note that in any of the above referenced examples, the RAM circuits 502 are optional for any of the monitored processing devices 110, and their respective LAM circuits 136(1)-136(6) can be configured to directly communicate activity power events 138 directly to the PEL circuit 126.

Figure 6:
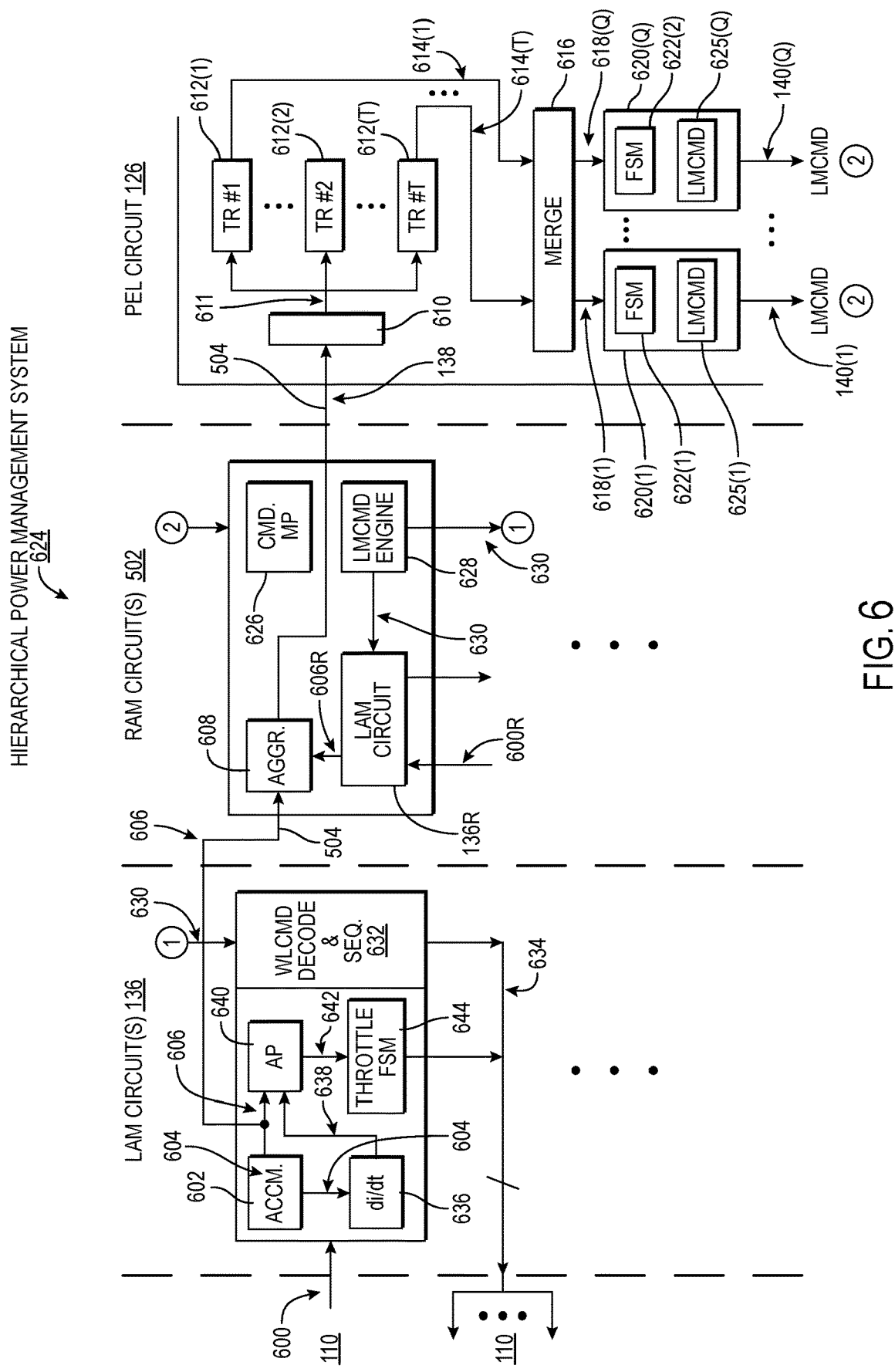
FIG. 6 is a schematic diagram of an exemplary three (3) level hierarchical power management system that can be provided in the processor-based system in the IC chip in FIG. 1, wherein the three (3) level hierarchical power management system includes: a first local level of LAM circuits configured to perform local device monitoring and power consumption throttling, and reporting activity power events regarding monitored processing device power consumption, a second, intermediate level of RAM circuits configured to receive and aggregate local activity power events, and a third, centralized level of a PEL circuit configured to collect aggregated activity power events regarding power consumption of the monitored processing devices and throttle power in the IC chip in response.

FIG. 6 is a schematic diagram illustrating additional exemplary detail of a three (3) level hierarchical power management system 624 that can be provided as the hierarchical power management system 124 in the processor-based system 100 in the IC chip 104 in FIGS. 1-3 and 5. Common elements between the hierarchical power management system 624 in FIG. 6 and the hierarchical power management system 124 in FIGS. 1-3 and 5 are shown with common element numbers. In this regard, FIG. 6 illustrates a single LAM circuit 136 communicatively coupled to a single RAM circuit 502 which is coupled to the PEL circuit 126. Note however that this is to simplify the illustration in FIG. 6. In the hierarchical power management system 624 in FIG. 6, there can be a plurality of RAM circuits 502 that are communicatively coupled to the PEL circuit 126. There can also be a plurality of LAM circuits 136 that are communicatively coupled to each RAM circuit 502 of the plurality of RAM circuits 502. The discussion below regarding the exemplary operation of the LAM circuit 136 and RAM circuit 502 are equally applicable to any number of LAM circuits and RAM circuits included in the processor-based system, including the LAM circuits 136(1)(0)-(1)(N), 136(2)-136(5), 136(6) (1)-136(6)(X) and the RAM circuits 502, 502(2)-502(4).

With reference to FIG. 6, the LAM circuit 136 in this example is configured to sample the processing activity as a received activity sample 600 of an assigned, monitored processing device 110 in each cycle of a given local time window. The LAM circuit 136 periodically samples activity of its monitored processing device 110 in a local time window representing the activity of the assigned, monitored processing device 110 in that local time window. In this example, the LAM circuit 136 is configured to correlate received activity samples 600 into a power consumption during a given local time window for the activity of the processing device 110 for that given local time window. The LAM circuit 136 includes an accumulate circuit 602 that is configured to accumulate the estimated power consumptions based on the received activity samples 600 sampled in a given local time window to generate an estimated current demand 604 for the monitored processing device 110 for the local time window. The estimated current demand 604 is an estimate of the accumulated current measurement reported by the assigned processing device 110 (i.e., power consumption) over the local time window. The accumulate circuit 602 then provides the estimated current demand 604 (current demand over time) for each local time window in a generated activity power event 606 on the second communication network 504 representing the estimated power consumption of the monitored processing device 110 that is communicated to the RAM circuit 502 assigned to the LAM circuit 136. The accumulate circuit 602 repeats the same process for subsequent local time windows to accumulate the estimated power consumptions for received activity samples 600 during the local time window to generate a next estimated current demand 604 for the monitored processing device 110.

With continuing reference to FIG. 6, the RAM circuit 502 includes an aggregation circuit 608 that is configured to aggregate the received activity power events 606 from its coupled LAM circuits 136 into a generated aggregated activity power event 138. The RAM circuit 502 is then configured to communicate the aggregated activity power event 138 on the second communication network 504 to the PEL circuit 126. Note that in this example, the RAM circuit 502 also includes its own LAM circuit 136R that may be configured like the LAM circuit 136 in FIG. 6. In this regard, the LAM circuit 136R is configured to sample the processing activity 600R of an assigned processing device 110 into a plurality of activity samples 600R. The processing activity 600R of the assigned processing device 110 is sampled periodically by the LAM circuit 136R to generate a plurality of activity samples over a given local time window representing the activity of the assigned, monitored processing device 110. The LAM circuit 136R is configured to determine a current flow rate and/or change in current flow rate (i.e., di/dt) of the assigned processing device 110 represented by the received plurality of activity samples 600R. The LAM circuit 136R can be programmed to correlate processing activity to power consumption to estimate the power consumption of the monitored processing device 110 over the local time window. The LAM circuit 136R can then be configured to generate an activity power event 606R representing the estimated power consumption of the monitored processing device 110 that is communicated to the aggregation circuit 608 of the RAM circuit 502 to be aggregated into the aggregated activity power event 138.

With continuing reference to FIG. 6, the PEL circuit 126 is configured to receive the aggregated activity power events 138 from the one or more RAM circuits 502 included in the hierarchical power management system 624. In this example, the PEL circuit 126 includes a decode circuit 610 that is configured to decode the received aggregated activity power events 138 into a decoded activity power events 611 to be routed to a corresponding activity tracker circuit 612(1)-612(T) that are each associated with a monitored processing device 110 in the processor-based system 100. The PEL circuit 126 can also include other energy tracker circuits (not shown) that are associated with other power events (e.g., temperature, droop detection) that can also affect how the PEL circuit 126 decides to throttle power. The activity tracker circuits 612(1)-612(T) are configured to aggregate associated activity power events 138 for an assigned monitored processing device 110 to determine whether power consumption for a monitored processing device 110 exceeds a defined threshold current flow rate. The activity tracker circuits 612(1)-612(T) can also each include a power limit management policy that is configured to generate respective power throttle recommendations 614(1)-614(T) for the PEL circuit 126 to use to determine how to throttle the distributed power and/or performance of the monitored processing devices 110 to throttle power consumption.

With continuing reference to FIG. 6, the PEL circuit 126 also includes a merge circuit 616 that merges the power throttle recommendations 614(1)-614(T) for the individual monitored processing devices 110 into merged power throttle recommendations 618(1)-618(Q). The merged power throttle recommendations 618(1)-618(Q) are provided to respective assigned target circuits 620(1)-620(Q). Each target circuit 620(1)-620(Q) is associated with a different target device 200 in the processor-based system 100 in which the PEL circuit 126 can issue power limiting management responses 140(1)-140(Q) to limit the power consumption of such target device 200. The target devices 200 are devices in the IC chip 104 whose operational control (e.g., operating voltage, frequency, workload) can affect power consumption in the IC chip 104. The target devices in the IC chip 104 can include more than just the processing devices 110 in the processor-based system 100. For example, the target devices 200 can include the power rails 300(1)-300(5) as shown in FIG. 3 and/or any of the processing devices 110 in the processor-based system 100. The PEL circuit 126 can be programmed to map (e.g., through firmware, electronic fuses, etc.) the merged power throttle recommendations 618(1)-618(Q) to a particular target device 200, and thus a target circuit 620(1)-620(Q), that may not directly correlate to each other. For example, it may be desired for the PEL circuit 126 to throttle power consumption of the I/O interface circuits 120(0)-120(X) by not only throttling power consumption for the I/O interface circuits 120(0)-120(X) but also by throttling power of the PU clusters 108(0)-108(N) that may be contributing to the power consumption by the I/O interface circuits 120(0)-120(X). In this manner, the merged power throttle recommendations 618(1)-618(Q) and/or other power events related to power issues and power consumption in the IC chip 104 can be mapped in the PEL circuit 126 to correlate to different target devices 200 for throttling power consumption. The merge circuit 616 can be programmed in a "many-to-many mapping" to correlate to different power limiting management responses within the IC chip 104 in the desired manner for more flexibility in managing power consumption in the IC chip 104 while still achieving the desired performance. In this manner, the power throttling management behavior of the PEL circuit 126 can be configured and changed even after the IC chip 104 is deployed in an application.

With continuing reference to FIG. 6, the target circuits 620(1)-620(Q) are each configured to determine if the power consumption of an associated target device 200 in the processor-based system 100 should be throttled based on the merged power throttle recommendations 618(1)-618(Q) provided to the target circuits 620(1)-620(Q). The target circuits 620(1)-620(Q) can each include finite state machine (FSM) circuits 622(1)-622(Q) that are configured to analyze the respective received merged power throttle recommendation 618(1)-618(Q) to determine if power consumption of an associated target device 200 should be throttled. If a FSM circuit 622(1)-622(Q) determines that power consumption of an associated target device 200 in the processor-based system 100 should be throttled, the FSM circuit 622(1)-622(Q) cause an associated power limiting command generation circuit 625(1)-625(Q) to generate a power limiting management response 140(1)-140(Q) to cause the power consumption of a target device 200 associated with the power limiting management response 140(1)-140(Q) to limit power consumption.

For example, if the target circuit 620(1)-620(Q) is assigned to a target device 200 of a power rail 300(1)-300(5), the target circuit 620(1)-620(Q) can be configured to determine how to throttle the voltage to the associated power rail 300(1)-300(5) to control power consumption of processing devices 110 powered by such power rail 300(1)-300(5). The respective power limiting command generation circuit 625(1)-625(Q) can be configured to generate a performance throttling power limiting management response 140(1)-140(Q) to cause the voltage provided to the associated power rail 300(1)-300(5) to be throttled to control power consumption of processing devices 110 powered by such associated power rail 300(1)-300(5).

In another example, if the target circuit 620(1)-620(Q) is assigned to a target device 200 such as the internal communication network 114, the target circuit 620(1)-620(Q) can be configured to determine how to throttle performance of the internal communication network 114 to control power consumption of the internal communication network 114. For example, to throttle the throughput performance of the internal communication network 114, the target device 200 may be the clock circuit 506 (FIG. 5) that is configured to clock the internal communication network 114. The clock circuit 506 is another example of a target device 200 in the IC chip 104. The target circuit 620(1)-620(Q) can determine a throttle frequency of the clock signal 508 generated by the clock circuit 506 (FIG. 5) for generating a clock throttling power limiting management response 140(1)-140(Q). The clock throttling power limiting management response 140(1)-140(Q) will cause the clock signal 508 to be throttled, which will in turn throttle the speed and the throughput performance of the internal communication network 114 and thus its power consumption and/or other circuits clocked by the clock signal 508.

In another example, if the target circuit 620(1)-620(Q) is assigned to a target device 200 as a PU cluster 108(0)-108(N) or any other processing device 110, the target circuit 620(1)-620(Q) can be configured to determine how to throttle performance of the internal communication network 114 to control power consumption of the internal communication network 114. For example, to throttle performance of the PU cluster 108(0)-108(N) or other processing device 110, the target device 200 may also be the clock circuit 506 (FIG. 5) that is configured to clock the PU clusters 108(0)-108(N). The target circuit 620(1)-620(Q) can determine a throttle frequency of the clock signal 508 generated by the clock circuit 506 for generating a performance power limiting management response 140(1)-140(Q). The clock throttling power limiting management response 140(1)-140(Q) will cause the clock signal 508 to be throttled, which will in turn throttle the performance of the PU clusters 108(0)-108 (N) or other processing devices 110.

As shown in FIG. 6, in this example, to communicate the power limiting management responses 140(1)-140(Q) generated by the PEL circuit 126 to effect a power throttling of a target device 200 in the processor-based system 100, the power limiting management responses 140(1)-140(Q) are communicated to a target device 200 in the processor-based system 100. For target devices 200 that are monitored processing devices 110 monitored by a LAM circuit 136 or RAM circuit 502, the PEL circuit 126 can be configured to communicate an associated power limiting management response 140(1)-140(Q) to the RAM circuit 502. The RAM circuit 502 in this example includes a command processor 626 that is configured to receive a power limiting management response 140(1)-140(Q) to process the power limiting management response 140(1)-140(Q) to identify the LAM circuit 136 to communicate with to effectuate the power throttling requested in the received power limiting management response 140(1)-140(Q). In this example, the RAM circuit 502 includes a limiting command engine circuit 628 that is configured to generate a local power limiting management response 630 directed to the LAM circuit 136 that can effectuate the power throttling requested in the received power limiting management response 140(1)-140(Q). Note that if the local power limiting management response 630 is to throttle power consumption of multiple processing devices 110 monitored by multiple LAM circuits 136 associated with the RAM circuit 502, the limiting command engine circuit 628 can address the local power limiting management response 630 to multiple LAM circuits 136. Also note that in this example, if the RAM circuit 502 includes the LAM circuit 136R, and the RAM circuit 502 is monitoring a processing device 110 that is the target device 200 to be throttled, the limiting command engine circuit 628 generates the local power limiting management response 630 directed to the LAM circuit 136R.

With continuing reference to FIG. 6, in response to a LAM circuit 136 receiving a local power limiting management response 630, a power limiting management decode and sequencer circuit 632 is configured to process the received local power limiting management response 630. The power limiting management decode and sequencer circuit 632 is configured to determine the power throttling response to be effectuated to a monitored processing device 110 based on the local power limiting management response 630. In this regard, the power limiting management decode and sequencer circuit 632 is configured to generate local throttle signals 634 to cause the power consumption in the processing device 110 to be throttled. For example, power limiting management decode and sequencer circuit 632 can be configured to generate a sequence of local throttle signals 634 to continually throttle up or down the power consumption of the monitored processing device 110 associated with its LAM circuit 136.

Note that in the sequence of operations and communications described above with regard to the LAM circuits 136 communicating activity power events 606 to the RAM circuits 502, and the RAM circuits 502 communicating aggregated activity power events 138 to the PEL circuit 126, communication delays are incurred. There is a delay between generating the activity samples 600 of sampling of power consumptions in a processing device 110 in a LAM circuit 136 and the reporting and receipt of an associated aggregated activity power event 138 in the PEL circuit 126. This delay can be particularly large for an IC chip 104 that has a larger area, such as one that includes a number of PU clusters 108(0)-108(N) and other processing devices 110 as in the processor-based system 100. By the time the PEL circuit 126 receives the associated aggregated activity power event 138 and processes such to a generation of an associated power limiting management response 140(1)-140(Q), the power consumed by monitored processing device 110 may have already exceeded desired power limits in an undesired manner and/or for an undesired amount of time, possibly causing the power consumption in the IC chip 104 to exceed designed power limits. Further, instantaneous current demand by a monitored processing device 110 can cause di/dt events or voltage droop events that can cause performance issues and/or failures that may not be able to be timely addressed by the PEL circuit 126.

To mitigate the delay in the PEL circuit 126 receiving an aggregated activity power events 138 associated with monitored processing devices 110 in the processor-based system 100 that may affect throttling of power consumption within the processor-based system 100, the LAM circuits 136, 136R can also be configured to directly throttle performance of its monitored processing device 110 to throttle its current demand and thus throttle its power consumption. This gives the PEL circuit 126 more reaction time to receive and process aggregated activity power events 138 to determine how power consumption in the processor-based system 100 should be throttled to achieve a desired overall performance while also maintaining power consumption within desired limits. In this manner, then LAM circuits 136, 136R may be able to more timely mitigate a power issue by locally throttling power consumption of its specific monitored processing device 110 on a device granularity (without having to throttle performance in other processing devices 110). The LAM circuits 136, 136R can be configured to continuously monitor and throttle power consumption locally in its monitored processing device 110 co-existent with the PEL circuit 126 generating power limiting management responses 140 to limit power consumption by target devices 200 in the processor-based system 100.

In this regard, as shown in FIG. 6, the LAM circuit 136 in this example includes a di/dt circuit 636 to track the rate of change of power consumption by the processing device 110 for local power consumption throttling of its monitored processing device 110. In this regard, the di/dt circuit 636 is configured to receive the estimated current demand 604 for the activity of the processing device 110 sampled by the LAM circuit 136 from the accumulate circuit 602 in each local time window. For each incoming estimated current demand 604 received (e.g., received for a given local time window), the di/dt circuit 636 is configured generate a next summed current demand 638 of such incoming estimated current demand 604 in the next local time window from the accumulate circuit 602 with one or more previous received estimated current demands 604 received for a previous estimated current demand 604 in a previous local time window. In this manner, the next summed current demand 638 is a running sum of the estimated current demands 604 for the processing device 110 over consecutive local time windows. The di/dt circuit 636 provides the next summed current demand 638 to an application processor 640 that provides a determined next current flow rate 642 based on the next summed current demand 638 to a throttle FSM circuit 644. The throttle FSM circuit 644 is configured to determine on an ongoing basis whether the next current flow rate 642 of the assigned processing device 110 exceeds a threshold current flow rate or change in current flow rate configured for the monitored processing device 110 in the LAM circuit 136. In response to determining that the next current flow rate 642 of the assigned processing device 110 exceeding the threshold current flow rate, the throttle FSM circuit 644 is configured to generate the local throttle signals 634 to throttle the power consumption of the monitored processing device 110.

In this manner, the LAM circuit 136 is configured to continually monitor the ongoing current flow rate of its monitored processing device 110 to be able to locally throttle the power consumption of the monitored processing device 110. In this manner, the LAM circuit 136 is configured to more quickly respond to power consumption issues caused by the current demand of the monitored processing device 110, such as di/dt events and voltage droops, before the PEL circuit 126 may be able to respond.

As an example, if the monitored processing device 110 by the LAM circuit 136 is a network node 500 of the internal communication network 114, the local throttle signals 634 generated by the LAM circuit 136 may be a throughput throttle to selectively enable and disable communication flow in the network node 500 to throttle its throughput thus throttling its power consumption. As another example, if the monitored processing device 110 by the LAM circuit 136 is a PU cluster 108(0)-108(N) or other processing device 110, the local throttle signals 634 generated by the LAM circuit 136 may be a performance throttle to selectively throttle performance or workload of the monitored PU cluster 108(0)-108(N) or other processing device 110 to throttle its performance thus throttling its power consumption.

Note that the components to perform local throttling by the LAM circuit 136 can also be provided in the LAM circuit 136R in the RAM circuit 502 so that the LAM circuit 136R is also configured to locally throttle a monitored processing device 110.

Note that sampling of processing activity discussed herein may be accomplished by determining or sampling a quantity that is associated with an instantaneous activity of the monitored processing device 110. For example, the workload performed by a monitored processing device 100 may be determined or discoverable as an indirect method to determine instantaneous activity that can be correlated to an estimated current or power consumption. As another example, activity of a monitored processing device 110 may be determined by sensing a temperature at a temperature sensor associated with the processing device 110. As another example, a voltage droop may be sensed at the processing device 110 to determine an activity sample. Also, other quantities may be used to sample activity. As an example, an incoming interrupt at the processing device, a status register, a state of an interrupt queue, or a signal indicating whether the processing device is busy or idle, may be used for sampling of processing activity.

Figure 7:
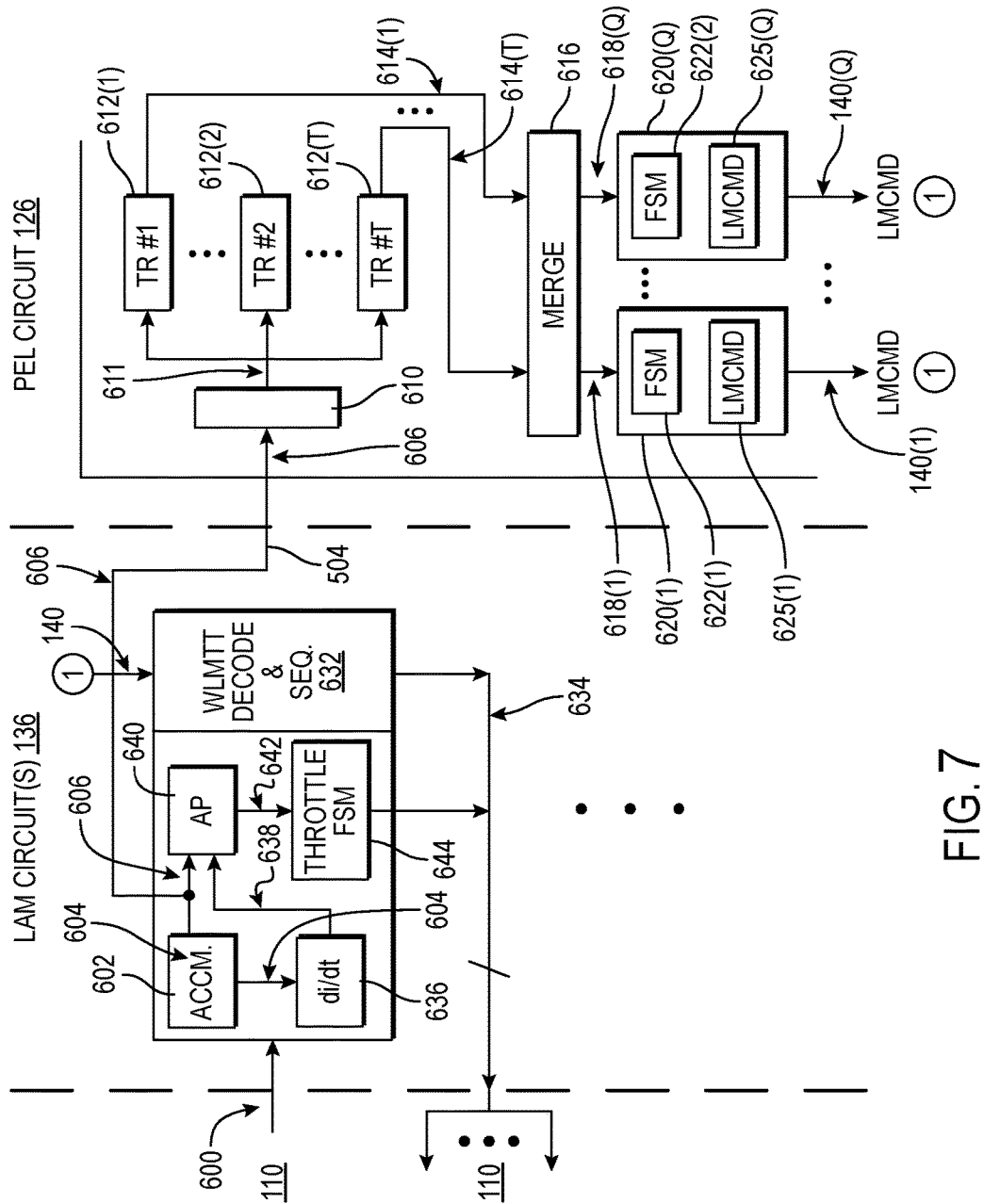
FIG. 7 is a schematic diagram of another exemplary two (2) level hierarchical power management system that can be provided in the processor-based system in the IC chip in FIG. 1, wherein two (2) level hierarchical power management system includes: a first local level of LAM circuits configured to perform local device monitoring and power consumption throttling, and a second, centralized level of a PEL circuit configured to collect aggregated activity power events regarding power consumption of the monitored processing devices and throttle power in the IC chip in response.

Note that the hierarchical power management system 124 provided in the IC chip 104 for the processor-based system 100 in FIG. 1 is not limited to the three (3) level hierarchical power management system 624 in FIG. 6. For example, FIG. 7 is a schematic diagram of an alternative two (2) level hierarchical power management system 724 that can be provided as the hierarchical power management system 124 in the processor-based system 100 in the IC chip 104 in FIGS. 1-3 and 5. The hierarchical power management system 724 in FIG. 7 is similar to the hierarchical power management system 624 in FIG. 6, except that the intermediate RAM circuits 502 are not included in the hierarchical power management system 724 in FIG. 7. The LAM circuits 136 are configured to provide activity power events 606 directly to the PEL circuit 126 to be processed. Common elements between the hierarchical power management system 724 in FIG. 7 and the hierarchical power management system 124 in FIGS. 1-3 and 5 are shown with common element numbers and are not re-described.

Also, as discussed herein or the claims, it is stated that the PEL circuit 126 receives activity power events 606 from a LAM circuit 136, this receipt of activity power events 606 can be directly from the LAM circuit 136 to the PEL circuit 126 or indirectly from one or more intermediate circuits, including the RAM circuits 502. For example, as discussed above, the activity power events 606 generated by the LAM circuits 136 can be indirectly reported to the PEL circuit 126 the as part of being included in aggregated activity power events 138 generated and reported by a RAM circuit 502 to the PEL circuit 126 as part of received activity power events 606.

Figure 8:
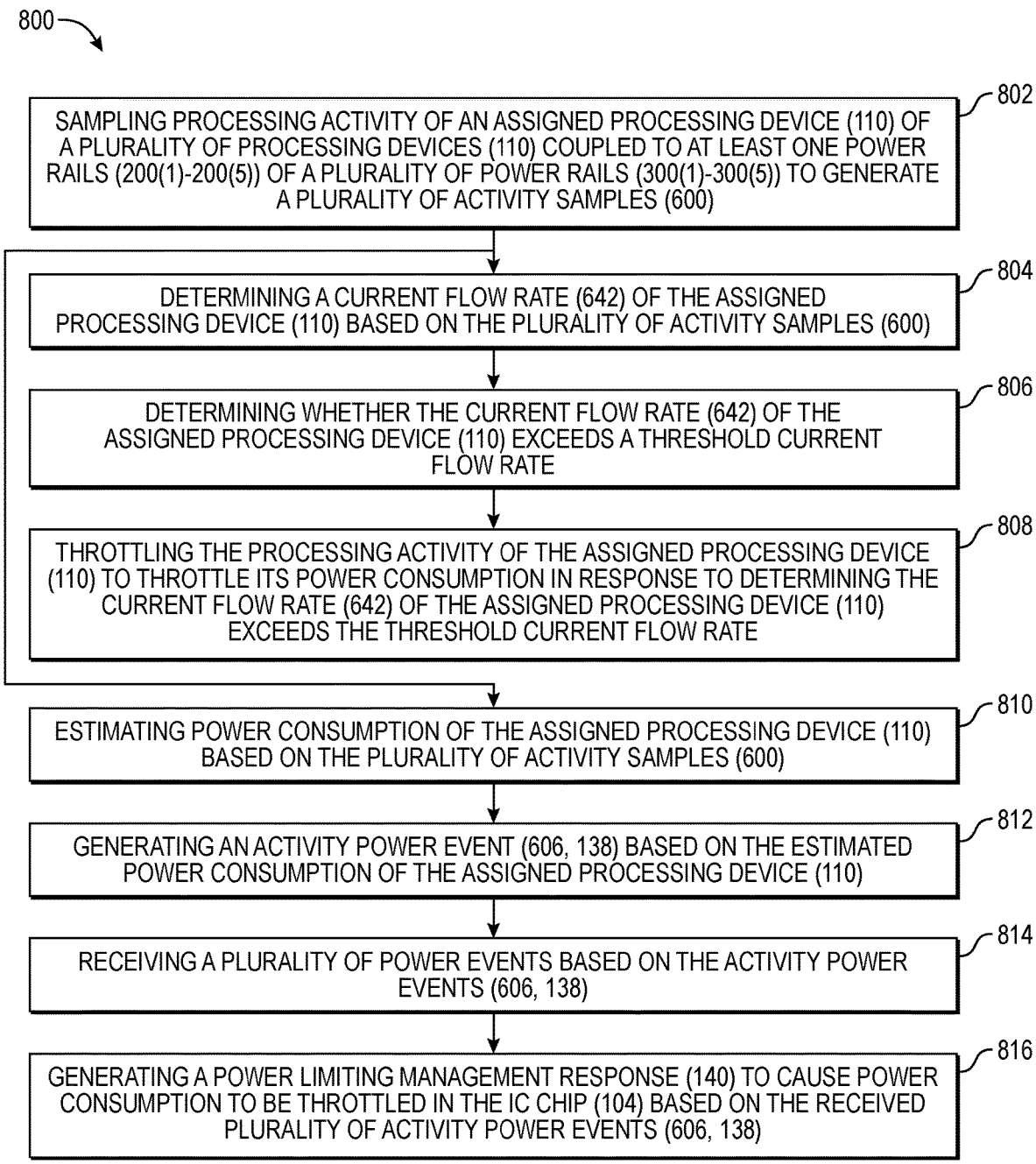
FIG. 8 is a flowchart illustrating an exemplary process of the hierarchical power management system of the processor-based system in FIG. 6 locally monitoring and throttling power consumption of monitored processing devices and hierarchically reporting activity power events related to the monitored power consumption to a PEL circuit configured to throttle power consumption in the processor-based system in response to the received power events.

FIG. 8 is a flowchart illustrating an exemplary process 800 of the LAM circuits 136 and/or the RAM circuits 502 in the hierarchical power management systems 124, 624, 724 in FIGS. 1-3 and 5-7 locally monitoring and throttling power consumption of monitored processing devices 110. The process 800 also includes the hierarchically reporting activity power events 606, 138 related to the monitored power consumption by LAM circuits 136 and/or the RAM circuits 502 to throttle power consumption in the processor-based system 100 in response to the received activity power events 606, 138. The process 800 in FIG. 8 is discussed with regard to the hierarchical power management systems 624, 724 as examples.

In this regard, as shown in FIG. 8, a first step of the process 800 can be sampling processing activity of an assigned processing device 110 of a plurality of processing devices 110 coupled to at least one power rails 300(1)-300(5) of a plurality of power rails 300(1)-300(5) to generate a plurality of activity samples 600 (block 802 in FIG. 8). A next step in the process 800 can be determining a current flow rate 642 of the assigned processing device 110 based on the plurality of activity samples 600 (block 804 in FIG. 8). A next step in the process 800 can be determining whether the current flow rate 642 of the assigned processing device 110 exceeds a defined threshold current flow rate (block 806 in FIG. 8). A next step in the process 800 can be throttling the processing activity of the assigned processing device 110 to throttle its power consumption in response to determining the current flow rate 642 of the assigned processing device 110 exceeds the threshold current flow rate (block 808 in FIG. 8). Also, in addition to and/or in parallel to steps 804-808, another step in the process 800 can be estimating power consumption of the assigned processing device 110 based on the plurality of activity samples 600 (block 810 in FIG. 8). A next step in the process 800 can be generating an activity power event 606, 138 based on the estimated power consumption of the assigned processing device 110 (block 812 in FIG. 8). A next step in the process 800 can be receiving a plurality of power events based on the activity power events 606, 138 (block 814 in FIG. 8). A next step in the process 800 can be generating a power limiting management response 140 to cause power consumption to be throttled in the IC chip 104 based on the received plurality of activity power events 606, 138 (block 816 in FIG. 8).

Figure 9A:
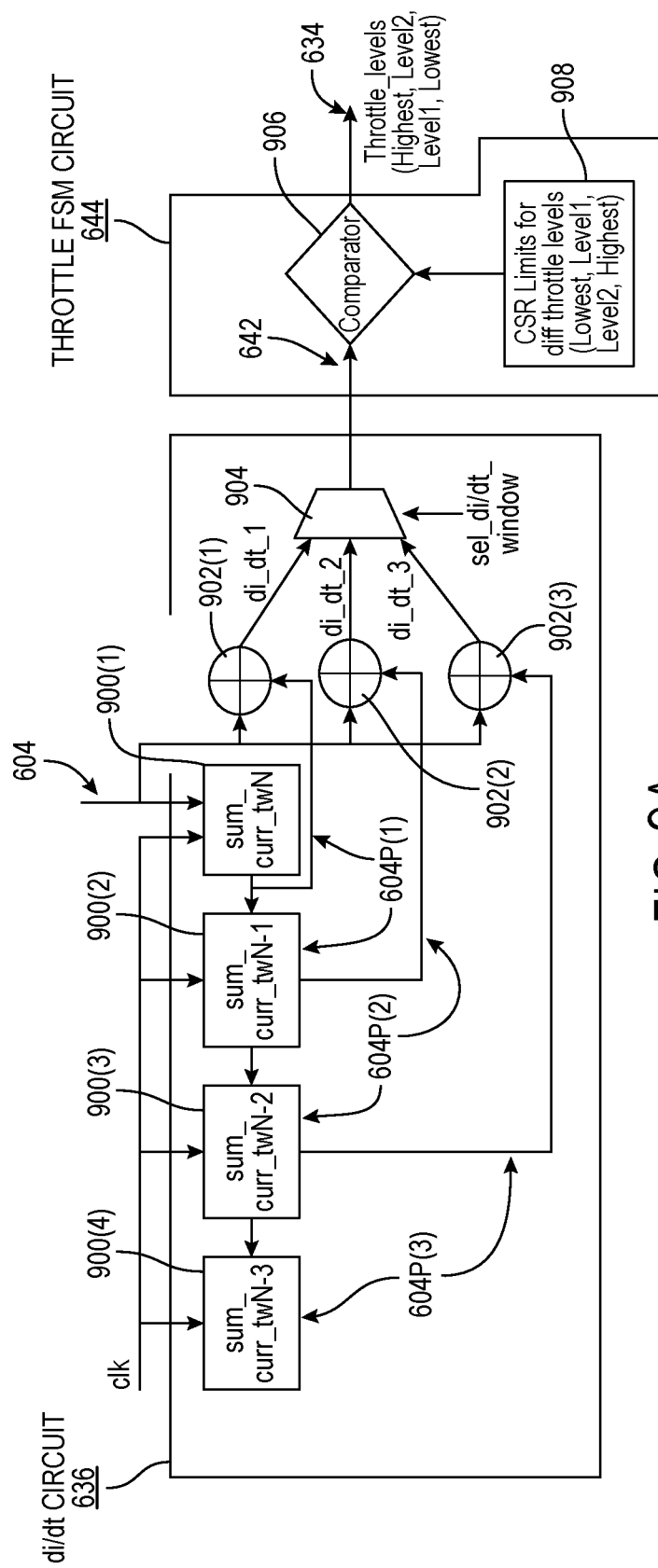
FIG. 9A is a schematic diagram illustrating an exemplary di/dt circuit that can be provided in a LAM circuit in the hierarchical power management system in FIG. 6, wherein the di/dt circuit is configured to collect activity samples of a device monitored by the LAM circuit and correlate the activity samples to estimate current and generate estimated current samples in a designated time window which can then be used to determine the slope of a rate of change in current/current flow rate (di/dt) consumed by the monitored processing device to determine whether the power consumption of the monitored processing device should be throttled by the LAM circuit.

FIG. 9A is a schematic diagram illustrating exemplary detail of the di/dt circuit 636 and throttle FSM circuit 644 in the LAM circuit 136 shown in FIG. 6 to collect received estimated current demands 604 for processing activity of a monitored processing device 110 over local time windows and determine if a current flow rate and/or change in current flow rate of the monitored processing device 110 exceeds a threshold current flow rate. This information is used by the LAM circuit 136 to determine if its monitored processing device 110 should be locally throttled by its assigned LAM circuit 136 as previously discussed in FIG. 6.

In this regard, as shown in FIG. 9A, the di/dt circuit 636 is configured to receive next estimated current demands 604 that are generated for each local time window of the LAM circuit 136 as discussed in FIG. 6. The di/dt circuit 636 includes a plurality of latch circuits 900(1)-900(4) that are clocked circuits (e.g., flip-flops) and are configured to store the incoming next estimated current demands 604 and previously received estimated current demands 604P(1)-604P(3). Latch circuit 900(1) stores the next incoming estimated current demand 604. The next incoming estimated current demand 604 stored in the latch circuit 900(1) and the previous estimated current demands 604P(1)-604P(3) stored in the latch circuits 900(1)-900(3) are then shifted to the next respective latch circuit 900(2)-900(4) for each newly received incoming estimated current demand 604 representing a local time window. For each incoming estimated current demand 604 received representing a local time window, the incoming estimated current demand 604 and previous estimated current demands 604P(1)-604P(3) are provided to respective summing circuits 902(1)-902(4). The summing circuits 902(1)-902(3) subtract the incoming estimated current demand 604 with a respective previous estimated current demand 604P(1)-604P(3) to generate respective current flow rates over local time windows (i.e., change in current flow rates) di_dt_1, di_dt_2, di_dt_3, as discussed below, of the incoming estimated current demand 604 and the respective estimated current demands 604P(1)-604P(3). Thus, the determined change in current flow rates di_dt_1, di_dt_2, di_dt_3 represent a rate in change in current flow rate or current demand and thus rate of change in power consumption of the monitored processing device 110 between the local time windows when the incoming estimated current demand 604 was received and a previous local time window of the respective previous estimated current demands 604P(1)-604P(3). di_dt_1 is the change in current or current flow rate between respective estimated current demand 604 and 604P(1). di_dt_2 is the change in current or current flow rate between respective estimated current demand 604 and 604P(2). di_dt3 is the change in current or current flow rate between respective estimated current demand 604 and 604P(3).

Figure 9B:
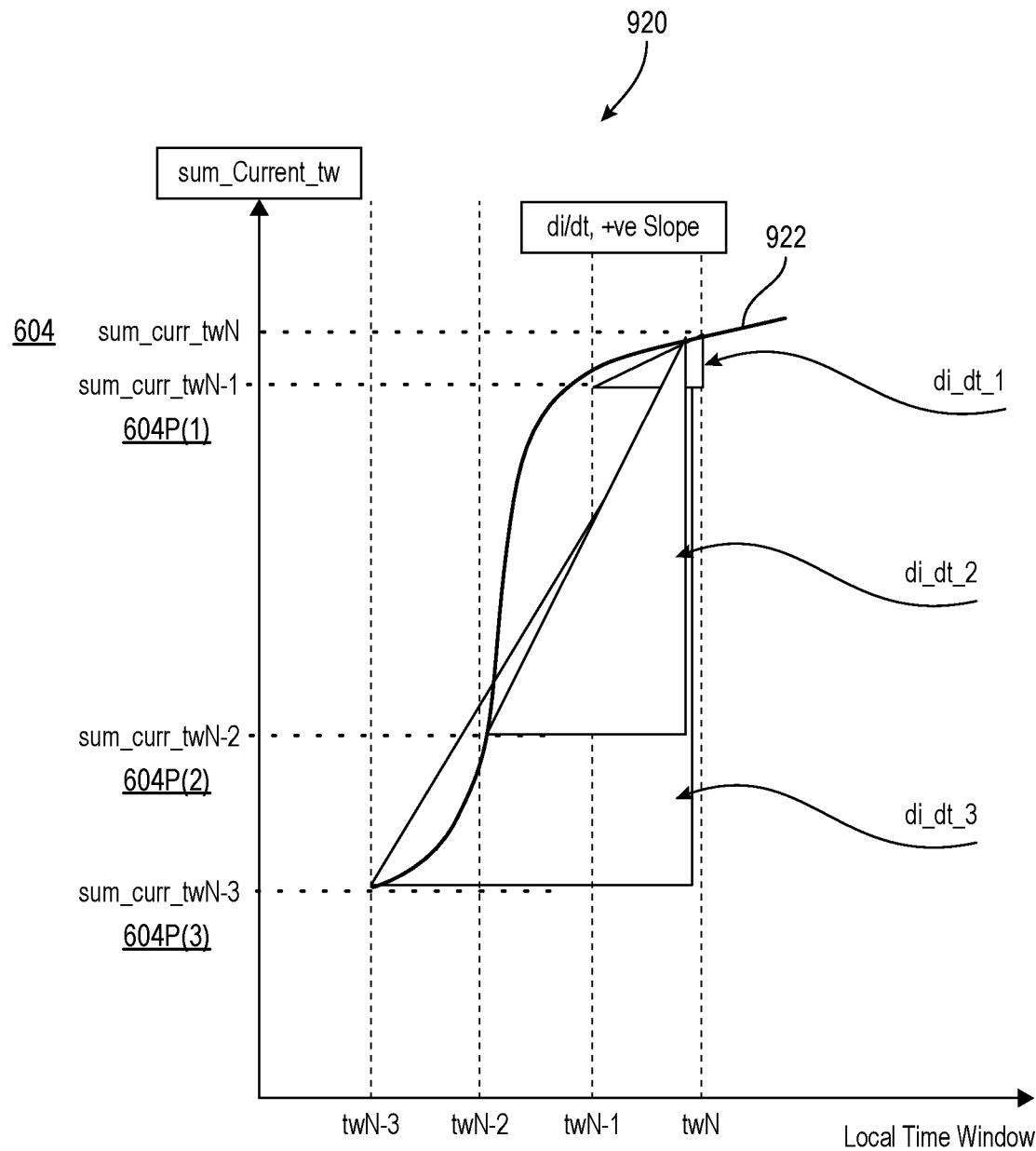
FIG. 9B is a graph illustrating exemplary estimated current samples collected by the di/dt circuit in FIG. 9A plotted as a function of time to determine the rate of change in current flow rate (di/dt) consumed by the monitored processing device.

With continuing reference to FIG. 9A, these changes in current flow rates di_dt_1, di_dt_2, di_dt_3 are then provided to a multiplexing circuit 904 that can selectively provide one of the changes in current flow rates di_dt_1, di_dt_2, di_dt_3 as the next current flow rate 642 to a comparator circuit 906 in the throttle FSM circuit 644, discussed below. The selected change in current flow rates di_dt_1, di_dt_2, di_dt_3 provided as the next current flow rate 642 to the multiplexing circuit 904 is based on a local time window selection signal sel_di_dt_window to select the local time windows to be compared to each current flow rate. This allows the flexibility of the di/dt circuit 636 to be programmed to select the local time windows of estimated current demands 604P(1), 604P(2) to be compared to the incoming estimated current demand 604. For example, FIG. 9B is a graph 920 illustrating exemplary incoming and estimated current demands 604, 604P(1)-604P(3) collected by the di/dt circuit 636 in FIG. 9A plotted as a function of local time window to show how the incoming and estimated current demands 604, 604P(1)-604P(3) can be subtracted to generate respective changes in current flow rates di_dt_1. di_dt_2, di_dt_3 between the incoming estimated current demand 604 and the estimated current demands 604P(1)-604P(3) over their respective local time windows twN, twN-1, twN-2, twN-3. The duration of the local time windows is known. Thus, the changes in current flow rates di_dt_1, di_dt_2, di_dt_3 represent a charge in current demand between the incoming estimated current demand 604 in a current local time window and a respective previous estimated current demand 604P(1)-604P(3) over the difference in their local time windows. The current flow rate curve 922 represents the current flow rate of a processing device 110 over a period of local time windows twN-3, twN-2, twN-1, and twN. As shown in FIG. 9B, the slope of the current flow rate curve 922 changes at each of the local time windows twN-3, twN-2, twN-1, and twN based on the change in current demand or change in current flow rate demanded of the processing device 110 between local time windows twN-3, twN-2, twN-1, and twN. FIG. 9B shows the basis on which the di/dt circuit 636 in FIG. 9A can generate the changes in current flow rates di_dt_1, di_dt_2, di_dt_3 representing a charge in current demand between the incoming estimated current demand 604 in a current local time window and a respective previous estimated current demand 604P(1)-604P(3) over the difference in their local time windows twN-3, twN-2, twN-1, and twN. This can be used to provide the current flow rate 642 of the processing device 110 to use to determine local power consumption throttling.

The selected next current flow rate 642 is provided by the di/dt circuit 636 to the comparator circuit 906 in the throttle FSM circuit 644. The throttle FSM circuit 644 is configured to generate the local throttle signals 634 to throttle power consumption of the monitored processing device 110 based on whether the selected next current flow rate 642 (from selection of change in current flow rate di_dt_1, di_dt_2, di_dt_3) exceeds a threshold current flow rate (which can include a threshold change in current flow rate) for the monitored processing device 110. The threshold current flow rate for the monitored processing device 110 can be obtained from a current flow rate register 908. The current flow rate register 908 can be programmed with a threshold current flow rate for the monitored processing device 110. For example, the current flow rate register 908 can be programmed with different threshold current flow rates (e.g., lowest, level 1, level 2, highest) so that the comparator circuit 906 can generate local throttle signals 634 for different levels of power consumption throttling based on the comparison of selected next current flow rate 642 (from selection of change in current flow rate di_dt_1, di_dt_2, di_dt_3) with the selected threshold current flow rate obtained from the current flow rate register 908.

Note that when current flow rate is discussed herein, such also means current flow and represents current (I) over a period of time (t) (I/t) or a change in the current flow rate (di/dt). A determined change in the current flow rate (di/dt) is determined from a determined current flow rate (I/t).

Figure 10:
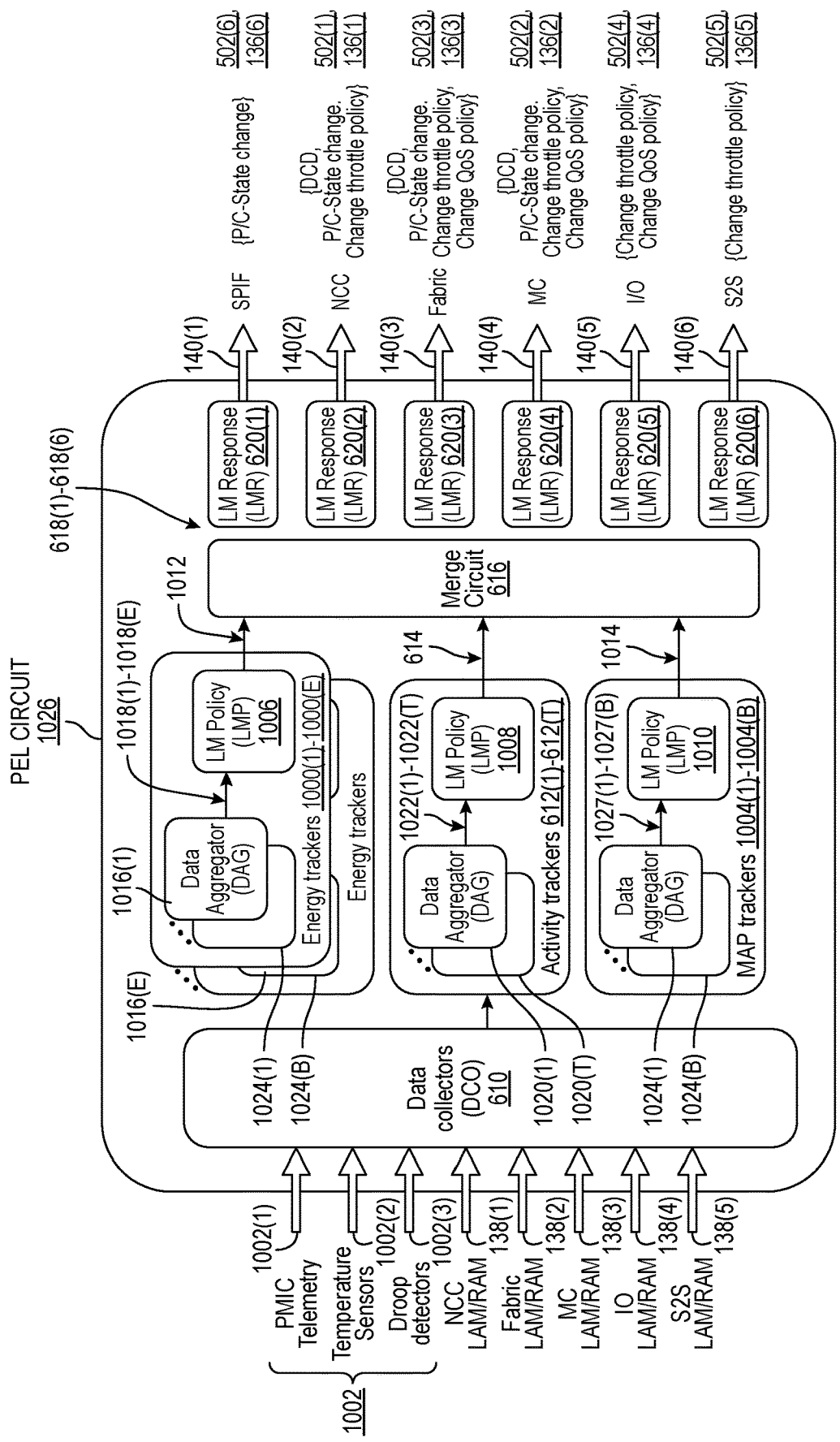
FIG. 10 is a logic diagram of an exemplary PEL circuit that can be provided in the hierarchical power management system of the processor-based system, and that illustrates exemplary components for receiving power events, decoding the received power events in tracking circuits, and merging the tracked power events to generate a power limiting management responses to throttle power consumption in the processor-based system in response to the received power events.

The components of the hierarchical power management systems 124, 624, 724 in FIGS. 1-3 and 5-7 described above can be provided in different implementations. For example, FIG. 10 is a logic diagram of another exemplary PEL circuit 1026 that can be PEL circuit 126 provided in the hierarchical power management system 124, 624, 724 in FIGS. 1-3 and 5-7. Common elements between the PEL circuit 1026 in FIG. 10 and the PEL circuit 126 in the hierarchical power management system 124, 624, 724 in FIGS. 1-3 and 5-7 are shown with common element numbers.

In this regard, as shown in FIG. 10, the PEL circuit 1026 is configured to receive the aggregated activity power events 138(1)-138(5) from the one or more RAM circuits 502. In this example, the PEL circuit 126 includes the decode circuit 610 that is configured to decode the received aggregated activity power events 138(1)-138(5) into the corresponding activity tracker circuit 612(1)-612(T) as previously described. The PEL circuit 1026 in this example also includes energy tracker circuits 1000(1)-1000(E) that are associated with energy power events 1002, such as PMIC telemetry power events 1002(1), temperature events 1002(2), and voltage droop detection events 1002(3) (all of which are examples of non-activity power events), that can also affect how the PEL circuit 126 decides to throttle power. The PEL circuit 1026 in this example also includes maximum average power (MAP) tracker circuits 1004(1)-1004(B) that are circuit trackers that track the total power consumed in the SoC 102 according to a defined maximum power consumption limit. Similar to the activity tracker circuits 612(1)-612(T), the energy tracker circuits 1000(1)-1000(E) and the MAP tracker circuits 1004(1)-1004(B) are configured to respective energy power events 1002(1)-1002(3) and/or aggregated activity power events 138(1)-138(5) to determine whether a factor exists that is dependent on power consumption that exceeds a defined power (e.g., current) threshold/limit.

The energy tracker circuits 1000(1)-1000(E) each include respective data aggregator circuits 1016(1)-1016(E) that are configured to aggregate the received energy power events 1002 into respective aggregated energy power events 1018(1)-1018(E). The activity tracker circuits 1000(1)-1000(E) also each include respective data aggregator circuits 1020(1)-1020(T) that are configured to aggregate received energy power events into respective aggregated energy power events 1022(1)-1022(T). The MAP tracker circuits 1004(1)-1004(B) also each include respective data aggregator circuits 1024(1)-1024(B) that are configured to aggregate received energy power events into respective aggregated MAP power events 1027(1)-1027(B). The energy tracker circuits 1000(1)-1000(E), the activity tracker circuits 612(1)-612(T), and the MAP tracker circuits 1004(1)-1004 (B) in this example each include a respective energy power limit management policy circuits 1006, activity power limit management policy circuits 1008, and MAP power limit management policy circuits 1010 that are configured to generate respective energy power throttle recommendations 1012, activity power throttle recommendations 614, and MAP power throttle recommendations 1014. These generated respective energy power throttle recommendations 1012, activity power throttle recommendations 614, and MAP power throttle recommendations 1014 are based on the respective received aggregated energy power events 1018(1)-1018(E), aggregated activity power events, 1022(1)-1022(T), aggregated MAP power events 1027(1)-1027(B) for the PEL circuit 126 to process to determine how to throttle power consumption in the IC chip 104.

With continuing reference to FIG. 10, the energy tracker circuits 1000(1)-1000(E), the activity tracker circuits 612(1)-612(T), and the MAP tracker circuits 1004(1)-1004(B) are configured to compare a power consumption indicated by the respective aggregated energy power events 1018(1)-1018(E), aggregated activity power events 1022(1)-1022(T), and aggregated MAP power events 1027(1)-1027(B), to the respective energy power limit management policy circuits 1006, activity power limit management policy circuits 1008, and MAP power limit management policy circuits 1010 energy tracker circuits 1000(1)-1000(E), the activity tracker circuits 612(1)-612(T), and the MAP tracker circuits 1004(1)-1004(B). The energy tracker circuits 1000(1)-1000(E), the activity tracker circuits 612(1)-612(T), and the MAP tracker circuits 1004(1)-1004(B) are then configured to generate the respective energy power throttle recommendations 1012, activity power throttle recommendations 614, and MAP power throttle recommendations 1014 based on the comparison of the power consumptions indicated by the respective aggregated power events 1018(1)-1018(E), 1022(1)-1022(T), 1027(1)-1027(B) to the respective power limit management policy circuits 1006, 1008, 1010. For example, the energy power limiting management policy circuits 1006, the activity power limit management policy circuits 1008, and the MAP limiting management policy circuits 1010 may each have respective a threshold power consumption that is compared to the respective aggregated power events 1018(1)-1018(E), 1022(1)-1022(T), 1027(1)-1027(B) to determine the respective power throttle recommendations 1012, 614, 1014.

With continuing reference to FIG. 10, the PEL circuit 1026 also includes the merge circuit 616 that merges the energy power throttle recommendations 1012, generate respective activity power throttle recommendations 614, and MAP power throttle recommendations 1014 into merged power throttle recommendations 618(1)-618(6). The merged power throttle recommendations 618(1)-618(6) are provided to respective assigned target circuits 620(1)-620(6). Note that each merged power throttle recommendations 618(1)-618(6) can be influenced by power throttle recommendations from each of the energy power throttle recommendations 1012, generate respective activity power throttle recommendations 614, and MAP power throttle recommendations 1014. Each target circuit 620(1)-620(6) is associated with a different target device 200 in the processor-based system 100 in which the PEL circuit 1026 can issue power limiting management responses 140(1)-140(6) to limit the power consumption of such target device 200.

The target devices 200 can include the interface circuits 127(1)-127(Z) that can be throttled by power limiting management responses 140(1) communicated to a RAM circuit 502(6) and/or LAM circuit 136(6) configured to throttle power consumption in such interface circuits 127(1)-127(Z). The target devices 200 can include the PU clusters 108(0)-108(N) that can be throttled by power limiting management responses 140(2) communicated to a RAM circuit 502(1) and/or LAM circuit 136(1) configured to throttle power consumption in such PU clusters 108(0)-108(N). The target devices 200 can include the internal communication network 114 that can be throttled by power limiting management responses 140(3) communicated to a RAM circuit 502(3) and/or LAM circuit 136(3) configured to throttle power consumption in such internal communication network 114. The target devices 200 can include the memory controllers 118(0)-118(M) that can be throttled by power limiting management responses 140(4) communicated to a RAM circuit 502(2) and/or LAM circuit 136(2) configured to throttle power consumption in such memory controllers 118(0)-118(M). The target devices 200 can include the I/O interface circuits 120(0)-120(X) that can be throttled by power limiting management responses 140(5) communicated to a RAM circuit 502(4) and/or LAM circuit 136(4) configured to throttle power consumption in such I/O interface circuits 120(0)-120(X). The target devices 200 can include the S2S interface circuits 122(0)-122(Y) that can be throttled by power limiting management responses 140(6) communicated to a RAM circuit 502(5) and/or LAM circuit 136(5) configured to throttle power consumption in such S2S interface circuits 122(0)-122(Y).

The merge circuit 616 in the PEL circuit 1026 can be programmed to map (e.g., through firmware, electronic fuses, etc.) merged power throttle recommendations 618(1)-618(6) to a particular target device 200, and thus a target circuit 620(1)-620(6), that may not directly correlate to each other. In this manner, the merged power throttle recommendations 618(1)-618(6) related to power issues and power consumption in the IC chip 104 can be mapped in the PEL circuit 1026 to correlate to different target devices 200 for throttling power consumption. The merge circuit 616 can be programmed in a "many-to-many mapping" to correlate to different power limiting management responses within the IC chip 104 in the desired manner for more flexibility in managing power consumption in the IC chip 104 while still achieving the desired performance. In this manner, the power throttling management behavior of the PEL circuit 1026 can be configured and changed even after the IC chip 104 is deployed in an application.

With continuing reference to FIG. 10, the target circuits 620(1)-620(6) are each configured to determine if the power consumption of an associated target device 200 in the processor-based system 100 should be throttled based on the merged power throttle recommendations 618(1)-618(6) provided to the target circuits 620(1)-620(6). The target circuits 620(1)-620(6) are each configured to analyze the respective received merged power throttle recommendation 618(1)-618(6) to determine if power consumption of an associated target device 200 should be throttled. If a target circuit 620(1)-620(Q) determines that power consumption of an associated target device 200 in the processor-based system 100 should be throttled, the target circuit 620(1)-620(Q) causes an associated power limiting management response 140(1)-140(6) to be generated to be communicated to a respective RAM circuit 502(1)-502(6) and/or LAM circuit 136(1)-136(6) cause the power consumption of a target device 200 associated with the power limiting management response 140(1)-140(Q) to limit power consumption.

In another exemplary aspect, the LAM circuits, the RAM circuits (if present), and the PEL circuit in a hierarchical power management system, including the hierarchical power management systems 124, 624, 724 in FIGS. 1-3 and 5-7, are configured to detect power information and generate activity power events in a time synchronized manner so that these circuits can perform processing of activity power events as a function of time. For example, these circuits may be configured to estimate power consumption and generate power limiting management responses based on time-based power consumption. For example, the LAM circuits 136 can be configured to sample activity of a monitored processing device for each clock pulse generated by a local clock signal. The LAM circuits 136 can be configured to collect the sampled activity over a given local time window of a defined number of clock pulses of the local clock signal to determine time-based power information (e.g., di/dt information) relating to its monitored processing device 110. This is so that the LAM circuits 136 can use the time-based power consumption information for the monitored processing device 110 to determine locally and more quickly if such exceeds a threshold power consumption. If so, the performance of the monitored processing device 110 can be reduced to reduce its power consumption before the PEL circuit 126 would have time to react. The time synchronization of the LAM circuits 136 also allows the LAM circuits 136 to report an activity power event 606 for each local time window based on sampled activity in the local time window to the RAM circuits 502 (if present) or the PEL circuit 126, 1026 in a time synchronized manner. This allows the RAM circuit 502 and/or PEL circuit 126, 1026 to determine whether an expected number of activity power events 606 or aggregated activity power events 138 have been received or not received in their respective time windows since these circuits may also perform a time-based determination and/or reporting of power consumption information for throttling power consumption of its monitored processing devices 100 and/or other target devices 200 in the processor-based system 100.

For example, the PEL circuit 126, 1026 can be configured to determine throttling of power consumption in the processor-based system 100 based on the received activity power events 138, 606 as a function of time. If RAM circuits 502 are present in the hierarchical power management systems, the RAM circuits 502 can also act as a localized LAM circuit 136 as previously discussed for a monitored processing device 110. The RAM circuits 502 can also determine time-based power information including current flow rate relating to its monitored processing device 110 like described above for the LAM circuit 136. The RAM circuits 502 can also be time synchronized with the LAM circuits 136 so that the RAM circuits 502 can determine that an expected number of activity power events 606 have been received from its assigned LAM circuits 136 to aggregate received activity power events 606 into aggregated activity power events 138. The RAM circuits 502, if present, can also be time synchronized with the PEL circuit 126, 1026 so that the PEL circuit 126, 1026 can determine that an expected number of aggregated activity power events 138 have been received from the RAM circuits 502. The LAM circuits 136 can also be configured to synchronize the sampling of the activity of its monitored processing device 100 to generate the activity power events 606 to be reported to its assigned RAM circuit 502 (if present) or the PEL circuit 126, 1026.

Figure 11:
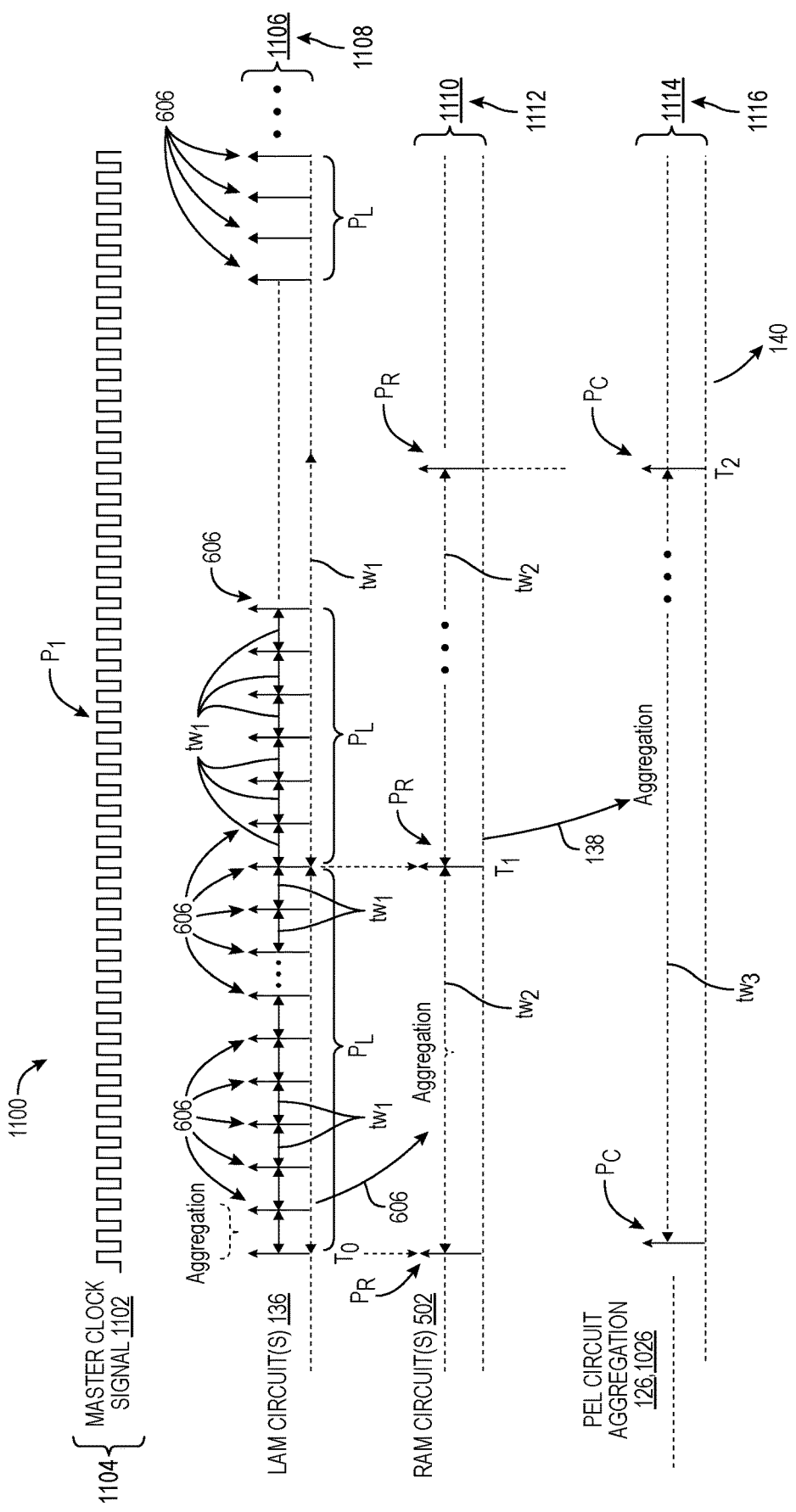
FIG. 11 is a timing diagram illustrating exemplary time windows that can be provided and synchronized between the LAM circuits, RAM circuits (if present), and the PEL circuit in a hierarchical power management system, including the hierarchical power management systems in FIGS. 1-3, and 5-7, so that circuits can perform reporting and reception of activity power events in a time synchronized manner as a function of time to determine power consumption throttling in the hierarchical power management system.

In this regard, FIG. 11 is a timing diagram 1100 illustrating exemplary time windows to show an exemplary time synchronization between a LAM circuit 136, its assigned RAM circuit 502, and the PEL circuit 126, 1026 in a hierarchical power management system, such as the hierarchical power management systems in FIGS. 1-3, and 5-7. As previously discussed, the LAM circuits 136 are configured to report activity power events 606 to the RAM circuits 502, which in turn aggregate activity power events 606 from multiple LAM circuits 136 to report as aggregated activity power events 138 to the PEL circuit 126, 1026. The reporting and reception of activity power events 138, 606 performed by the LAM circuits 136, the RAM circuits 502 (if present), and the PEL circuit 126, 1026, can be time synchronized as a function of time so that the LAM circuits 136, the RAM circuits 502 (if present), and the PEL circuit 126, 1026 can not only collect and receive respective activity samples 600 to determine time-based power consumption of monitored processing devices 110, but also generate and receive activity power events 606, 138 in an expected synchronized fashion to more accurately determine how to throttle power consumption in the IC chip 104. It is important for the RAM circuits 502 (if present), and the PEL circuit 126, 1026 to receive an expected number of activity power events 606, 138 in a particular timing that is synchronized, because these circuits involve aggregating activity power events 606, 138 over a known time to then determine power consumption rates and how to throttle power consumption in the IC chip 104 in response. Note that the timing diagram 1100 in FIG. 11 only shows the timing for one LAM circuit 136 and one RAM circuit 502, but note that the timing for the LAM circuit 136 applies to a plurality of LAM circuits 136 and plurality of RAM circuits 502 if provided in the hierarchical power management system.

As shown in the timing diagram 1100 in FIG. 11, to time synchronize reporting and reception of the activity power events 138, 606 performed by the LAM circuits 136, the RAM circuits 502 (if present), and the PEL circuit 126, a master clock signal 1102 generated by a master clock circuit 1104 is employed in the hierarchical power management system. The master clock circuit 1104 generates the master clock signal 1102 of first pulses $P_1$ at a given first frequency (e.g., period of 10 ns) that will then be used by the clock circuits in the LAM circuits 136, the RAM circuits 502 (if present), and the PEL circuit 126 to synchronize their clock signals to for controlling their respective time windows $tw_1$, $tw_2$, $tw_3$. As shown in FIG. 11, the LAM circuit 136 has a plurality of local time windows $tw_1$ that are controlled by local pulses $P_L$ of a local clock signal 1106 generated by a local clock circuit 1108 within or accessible by the LAM circuit 136. The LAM circuit 136 controls the width or duration of the local time window $tw_1$ by controlling the frequency of the local clock signal 1106. For example, the duration of each local time window $tw_1$ may be a time period of fifty (50) ns. However, the local clock signal 1106 is time synchronized to the master clock signal 1102 to generate its local pulses $P_1$. The local clock circuit 1108 generates each local pulse $P_1$ based on the frequency of the local clock signal 1106, but the exact timing of its generation is also time synchronized with the master clock signal 1102 to avoid clock drift.

The LAM circuit 136 is configured to use the local pulses $P_L$ of the local clock signal 1106 to know that a current local time window $tw_1$ has ended and a next local time window $tw_1$ has begun to then start collecting activity samples 600 from its monitored processing device 110 for the next local time window $tw_1$. The collected activity samples 600 within a local time window $tw_1$ are correlated to power consumptions and accumulated in an ongoing manner, as previously discussed, to then generate an activity power event 606 reported to the RAM circuit 502. The LAM circuit 136 is configured to report an activity power event 606 for activity samples 600 collected in a given local time window $tw_1$, at the end of a respective local time window $tw_1$ triggered by a next local pulse $P_L$ of the local clock signal 1106. In this manner, the local time windows $tw_1$ controls the duration of collection of activity samples 600 by the LAM circuit 136 from a monitored processing device 110 to use to generate an activity power event 606. Also, in response to the end of a local time window $tw_1$, the LAM circuit 136 begins to collect new activity samples 600 from its monitored processing device 110 in a next local time window $tw_1$. These new activity samples are correlated to power consumptions and included in a next activity power event 606 generated in response to the next local pulse $P_L$ of the local clock signal 1106 (which may be the last local pulse $P_L$ of the previous local time window $tw_1$) signifying the end of the next local time window $tw_1$.

With continuing reference to FIG. 11, the RAM circuit 502 has a plurality of regional time windows $tw_2$ that are controlled by regional pulses $P_R$ of a regional clock signal 1110 generated by a regional clock circuit 1112 within or accessible by the RAM circuit 502. The RAM circuit 502 controls the width or duration of the regional time window $tw_2$ by controlling the frequency of the regional clock signal 1110. For example, the duration of each regional time window $tw_2$ may be a time period of 200 ns signified by a time difference between time $T_0$ and time $T_1$ in FIG. 11. However, the regional clock signal 1110 is also time synchronized to the master clock signal 1102 to generate its regional pulses $P_R$. The regional clock circuit 1112 generates each regional pulse $P_R$ based on the frequency of the regional clock signal 1110, but the exact timing of its generation is also time synchronized with the master clock signal 1102 to avoid clock drift. Synchronizing the regional clock signal 1110 to the master clock signal 1102 also synchronizes the RAM circuit 502 to its assigned LAM circuits 136, since the LAM circuits 136 are time synchronized to the master clock signal 1102. This allows the RAM circuit 502 and its regional clock circuit 1112 to control the duration of each of its regional time windows $tw_2$ so that the timing of each regional time windows $tw_2$ correlates accurately with the local time windows $tw_1$ of the LAM circuits 136. The RAM circuit 502 uses the timing of its regional time windows $tw_2$ to expect a certain number of activity power events 606 from its assigned LAM circuits 136 to be aggregated into generated aggregate activity power events 138 reported to the PEL circuit 126, 1026.

The RAM circuit 502 is configured to use the regional pulses $P_R$ of the regional clock signal 1110 to know that a regional time window $tw_2$ has ended and a next regional time window $tw_2$ has begun to then start collecting activity power events 606 from its assigned LAM circuits 136 for the next regional time window $tw_2$. The collected activity power events 606 within a regional time window $tw_2$ are aggregated to generate an aggregated activity power event 138 reported to the PEL circuit 126, 1026. The RAM circuit 502 is configured to report an aggregated activity power event 138 for activity power events 606 collected in a given regional time window $tw_2$, at the end of a respective regional time window $tw_2$ triggered by a next regional pulse $P_R$ of the regional clock signal 1110. In this manner, the regional time window $tw_2$ controls the duration of collection of activity power events 606 by the RAM circuit 502 from assigned LAM circuits 136 to use such to generate an aggregated activity power event 138. Also, in response to the end of a regional time window $tw_2$, the RAM circuit 502 begins to collect new activity power events 606 from its assigned LAM circuits 136 in a next regional time window $tw_2$. These new activity power events 606 are processed as discussed above and included in a next aggregated activity power event 138 generated in response to the next regional pulse $P_R$ of the regional clock signal 1110 (which may be the last regional pulse $P_R$ of the previous regional time window $tw_2$) signifying the end of the next regional time window $tw_2$.

Note that as previously discussed above, the RAM circuit 502 can also include a LAM circuit 136 or its similar circuitry to act as a LAM circuit 136 to collect and aggregate activity samples 600 from its own local monitored processing device 110. In this regard, the RAM circuit 502 will also include the ability to generate a local clock signal 1106 like discussed above to control the timing of local time windows $tw_1$ within the RAM circuit 502 like described above for the LAM circuit 136. The RAM circuit 502 will use the timing of local time windows $tw_1$ to control the timing of collection of activity samples 600 from its local monitored processing device 100 to then correlate to current flow rates and include in a generated activity power event 606 to be aggregated in its aggregated activity power event 138 according to the timing of its regional time windows $tw_2$ to be reported to the PEL circuit 126, 1026.

With continuing reference to FIG. 11, the PEL circuit 126, 1026 has a plurality of second, centralized time windows $tw_3$ that are controlled by second, centralized pulses Pc of a second, centralized clock signal 1114 generated by a second, centralized clock circuit 1116 within or accessible by the PEL circuit 126, 1026. The PEL circuit 126, 1026 controls the width or duration of the centralized time windows $tw_3$ by controlling the frequency of the centralized clock signal 1114. For example, the duration of each centralized time window $tw_3$ may be a time period of 1000 ns signified by a time difference between time $T_0$ and time $T_2$ in FIG. 11. However, the centralized clock signal 1114 is also time synchronized to the master clock signal 1102 to generate its centralized pulses Pc. The centralized clock circuit 1116 generates each centralized pulse Pc based on the frequency of the centralized clock signal 1114, but the exact timing of its generation is also time synchronized with the master clock signal 1102 to avoid clock drift. Synchronizing the centralized clock signal 1114 to the master clock signal 1102 also time synchronizes the PEL circuit 126, 1026 to its assigned RAM circuits 502 (which are time synchronized to its assigned LAM circuits 136) to the master clock signal 1102. This allows the PEL circuit 126, 1026 and its centralized clock circuit 1116 to controls the duration of each of its centralized time windows $tw_3$ so that the timing of each centralized time windows $tw_3$ correlates accurately with the regional time windows $tw_2$ of the RAM circuits 502. The PEL circuit 126, 1026 uses the timing of its centralized time windows $tw_3$ to expect a certain number of aggregated activity power events 138 from its assigned RAM circuits 502 to be received and processed into power limiting management responses 140, as previously discussed.

The PEL circuit 126, 1026 is configured to use the centralized pulses Pc of the centralized clock signal 1114 to know that a centralized time window $tw_3$ has ended and a next centralized time window $tw_3$ has begun to then start collecting aggregated activity power events 138 from its assigned RAM circuits 502 for the next centralized time window $tw_3$. The collected aggregated activity power events 138 within a centralized time window $tw_3$ are aggregated to be processed to generate power limiting management responses 140 to cause power consumption to be throttled in the IC chip 104. The PEL circuit 126, 1026 is configured to generate power limiting management responses 140 in response to received aggregated activity power events 138 collected in a given centralized time window $tw_3$, at the end of a respective centralized time window $tw_3$ triggered by a next centralized pulse Pc of the centralized clock signal 1114. In this manner, the centralized time window $tw_3$ controls the duration of collection of aggregated activity power events 138 from assigned RAM circuits 502 to use such to generate the power limiting management responses 140. Also, in response to the end of a centralized time window $tw_3$, the PEL circuit 126, 1026 begins to collect new aggregated activity power events 138 from its assigned RAM circuits 502 in a next centralized time window $tw_3$. These new aggregated activity power events 138 are processed as discussed above and used to generate next power limiting management responses 140 in response to the next centralized pulse Pc of the centralized clock signal 1114 (which may be the last centralized pulse Pc of the previous centralized time window $tw_3$) signifying the end of the next centralized time window $tw_3$.

Note that the timings of the time windows $tw_1$, $tw_2$, $tw_3$ described above with regard to FIG. 11 are configurable. FIG. 11 is discussed above with exemplary timings of the time windows $tw_1$, $tw_2$, $tw_3$.

Figure 12:
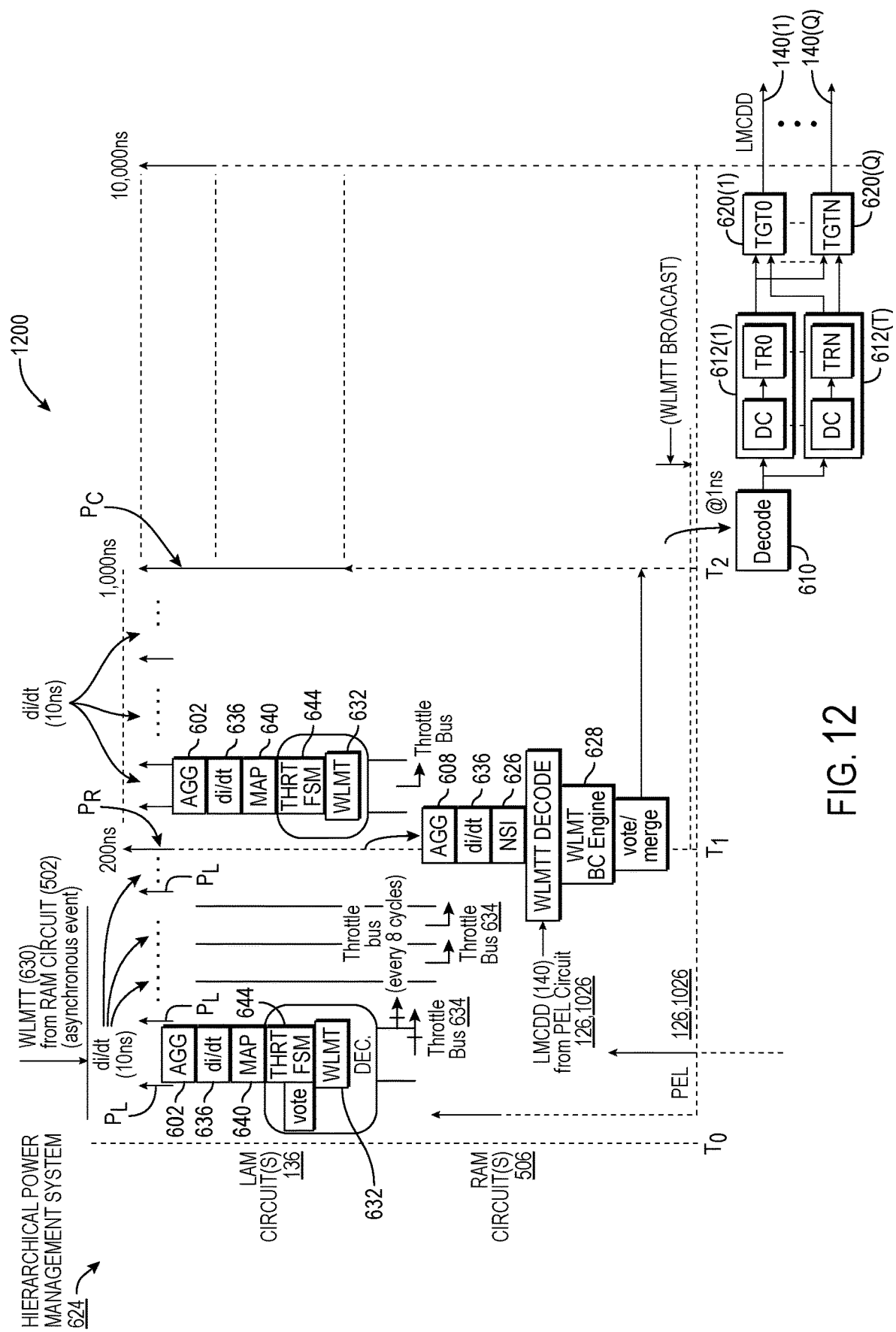
FIG. 12 is another timing diagram illustrating exemplary time windows that can be provided and synchronized between the LAM circuits, RAM circuits (if present), and the PEL circuit in a hierarchical power management system, including the hierarchical power management systems in FIGS. 1-3, and 5-7, so that these circuits can sample, report, and receive activity power events in a time synchronized manner as a function of time for processing to determine power consumption throttling in the hierarchical power management system.

FIG. 12 is another timing diagram 1200 illustrating exemplary time windows in the hierarchical power management system 624 to show an exemplary time synchronization between a LAM circuit 136, its assigned RAM circuit 502, and the PEL circuit 126, 1026 in a hierarchical power management system, such as the hierarchical power management systems in FIGS. 1-3, and 5-7. The timing diagram 1200 in FIG. 12 contains common timing labels with the timing diagram 1100 in FIG. 11, and thus the description of the timing diagram 1100 in FIG. 11 above is also applicable to the timing diagram 1200 in FIG. 12. References to the LAM circuit(s) 136, RAM circuit(s) 502, and PEL circuit 126, 1026 are with reference to the hierarchical power management system 624 in FIGS. 6 and 10, as examples, and are shown with common element numbers and thus are not re-described.

Figure 13A:
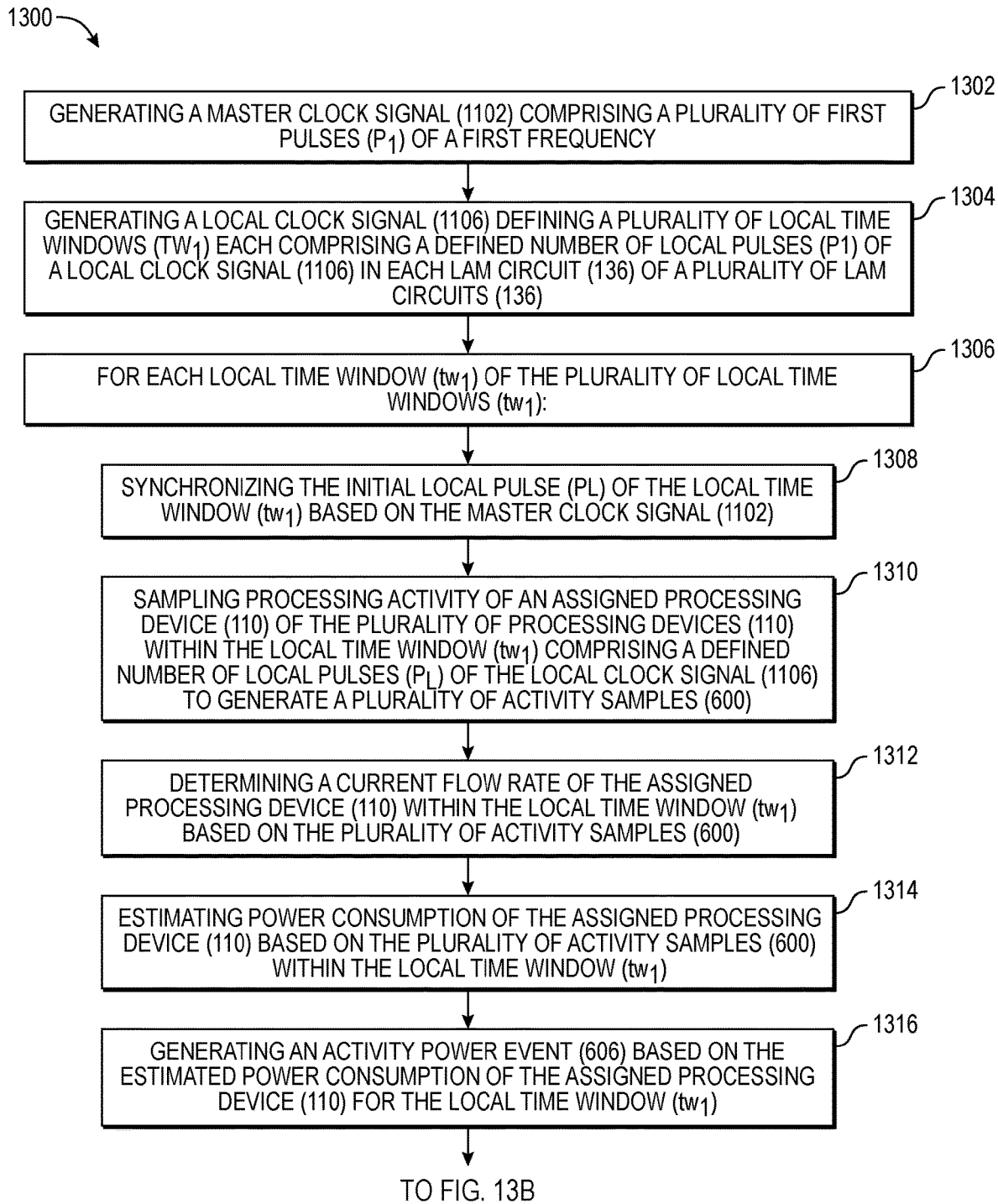
FIGS. 13A and 13B is a flowchart illustrating an exemplary process of time synchronizing the LAM circuits and the PEL circuit in a hierarchical power management system, including the hierarchical power management systems in FIGS. 1-3, 5-7, and 11-12, so that these circuits can sample, report, and receive activity power events in a time synchronized manner as a function of time for processing to determine power consumption throttling in the hierarchical power management system.
Figure 13B:
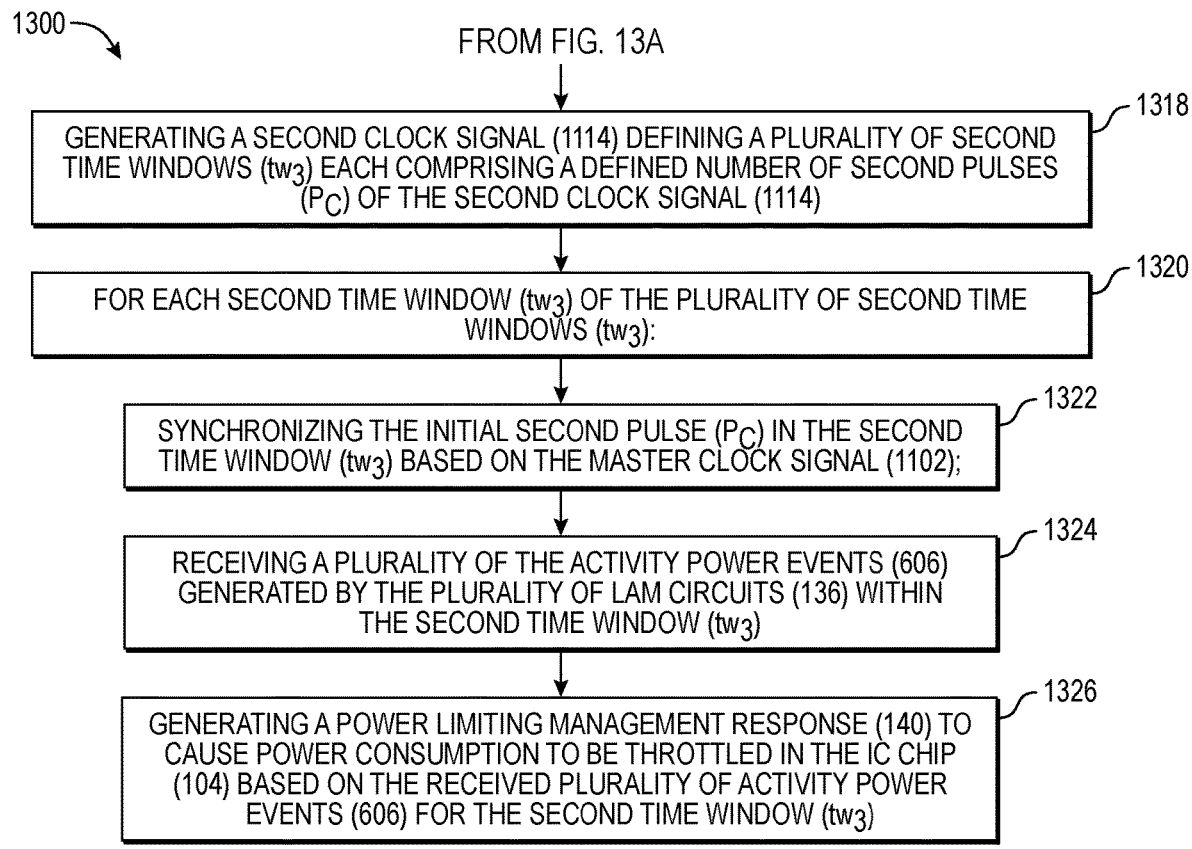

FIGS. 13A and 13B is a flowchart illustrating an exemplary process 1300 of time synchronizing the LAM circuits 136 and the PEL circuit 126, 1026 in a hierarchical power management system, including the hierarchical power management systems 124, 624, 724 in FIGS. 1-3, 5-7, and 11-12, so that these circuits can sample, report, and receive activity power events in a time synchronized manner as a function of time for processing to determine power consumption throttling in the hierarchical power management system. Note that the process 1300 is discussed with regard to the hierarchical power management system 624 in FIG. 6, but such is not limiting. Further, note that the process 1300 in FIGS. 13A and 13B is discussed with regard to the LAM circuits 136 and PEL circuits 126, 1026, but note that the process 1300 can also include processing performed by the RAM circuits 502.

In this regard, as a first step in the process 1300 is generating a master clock signal 1102 comprising a plurality of first pulses $P_1$ of a first frequency (block 1302 in FIG. 13A). A next step in the process 1300 is generating a local clock signal 1106 defining a plurality of local time windows $tw_1$ each comprising a defined number of local pulses $P_L$ of the local clock signal 1106 in each LAM circuit 136 of a plurality of LAM circuits 136(block 1304 in FIG. 13A). A next step in the process 1300 is, for each local time window $tw_1$ of the plurality of local time windows $tw_1$ (block 1306 in FIG. 13A), synchronizing an initial local pulse $P_L$ of the local time window $tw_1$ based on the master clock signal 1102 (block 1308 in FIG. 13A). A next step in the process 1300 is also, for each local time window $tw_1$ of the plurality of local time windows $tw_1$ (block 1306 in FIG. 13A), sampling processing activity of an assigned processing device 110 of the plurality of processing devices 110 within the local time window $tw_1$ comprising the defined number of local pulses $P_L$ of the local clock signal 1106 to generate a plurality of activity samples 600 (block 1310 in FIG. 13A). A next step in the process 1300 is also, for each local time window $tw_1$ of the plurality of local time windows $tw_1$ (block 1306 in FIG. 13A), determining a current flow rate of the assigned processing device 110 within the local time window $tw_1$ based on the plurality of activity samples 600 (block 1312 in FIG. 13A). A next step in the process 1300 is also, for each local time window $tw_1$ of the plurality of local time windows $tw_1$ (block 1306 in FIG. 13A), estimating power consumption of the assigned processing device 110 based on the plurality of activity samples 600 within the local time window $tw_1$ (block 1314 in FIG. 13A). A next step in the process 1300 is also, for each local time window $tw_1$ of the plurality of local time windows $tw_1$ (block 1306 in FIG. 13A), generating an activity power event 606 based on the estimated power consumption of the assigned processing device 110 for the local time window $tw_1$ (block 1316 in FIG. 13A).

With reference to FIG. 13B, a next step in the process 1300 is generating a centralized clock signal 1114 defining a plurality of second time windows $tw_3$ each comprising a defined number of second pulses Pc of the centralized clock signal 1114 (block 1318 in FIG. 13B). A next step in the process 1300 is, for each second time window $tw_3$ of the plurality of second time windows $tw_3$ (block 1320 in FIG. 13B): synchronizing an initial second pulse Pc in the second time window $tw_3$ based on the master clock signal 1102 (block 1322 in FIG. 13B), receiving a plurality of activity power events 606 generated by the plurality of LAM circuits 136 within the second time window $tw_3$ (block 1324 in FIG. 13B), and generating a power limiting management response 140 to cause power consumption to be throttled in the IC chip 104 based on the received plurality of activity power events 606 for the second time window $tw_3$ (block 1326 in FIG. 13B).

Figure 14A:
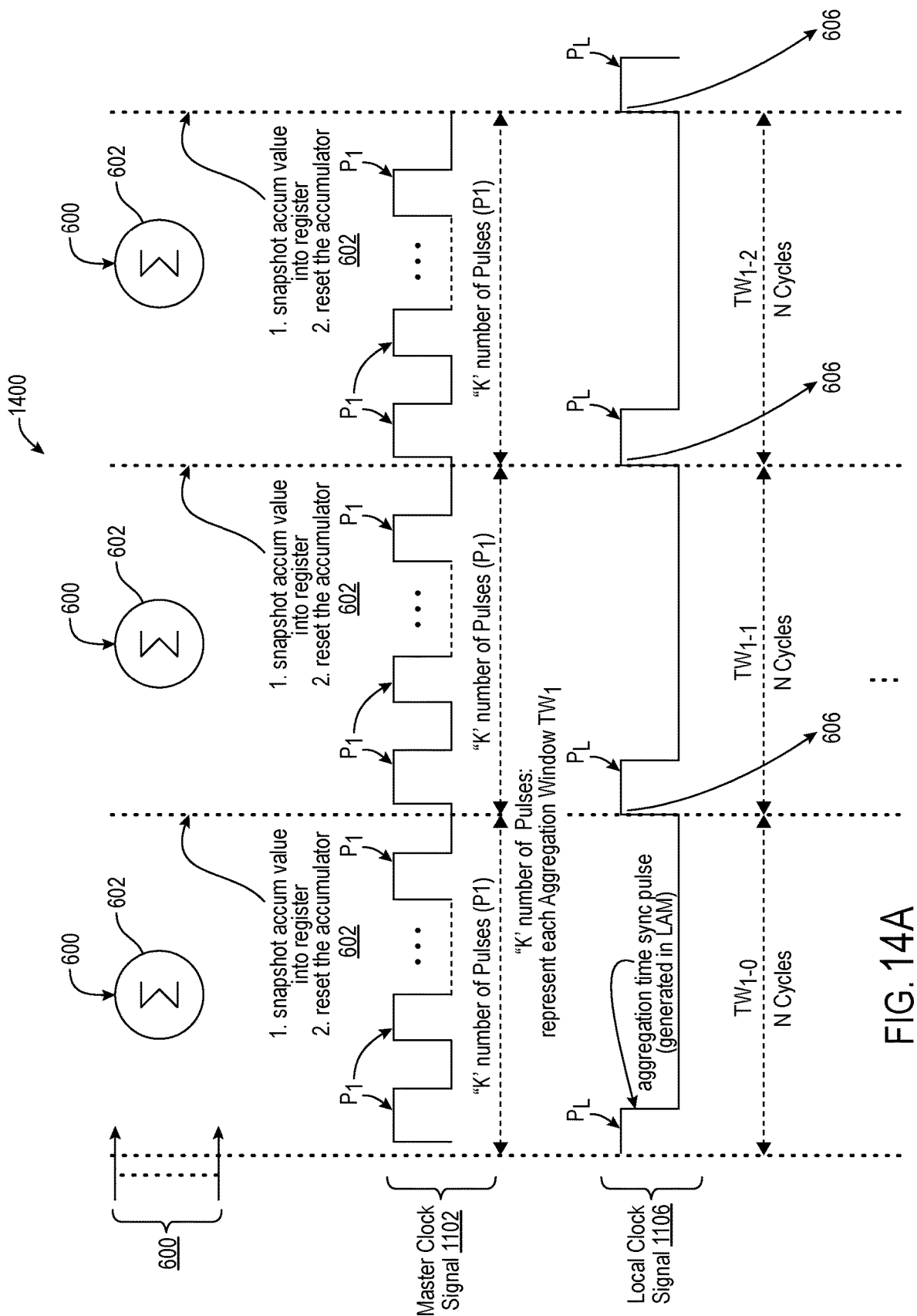
FIG. 14A is a timing diagram illustrating exemplary time windows in a LAM circuit controlled by a local clock signal that is time synchronized with a master clock signal in a hierarchical power management system for sampling activity of a monitored processing device, and collecting the sampled activity in a local time window to determine time-based power consumption rates of its monitored processing device and to generate activity power events based on the collected sampled activity in the local time window in a time synchronized manner.

FIG. 14A is another exemplary timing diagram 1400 illustrating exemplary local time windows $tw_1$ in a LAM circuit 136 controlled by the local clock signal 1106 that is time synchronized with the master clock signal 1102 as discussed above in the timing diagrams 1100, 1200 in FIGS. 11 and 12. The LAM circuit 136 is configured to use the local pulses $P_L$ of the local clock signal 1106 to know that a current local time window $tw_1$ (e.g., local time window $tw_{1-0}$) has ended and a next local time window $tw_1$ (e.g., local time window $tw_{1-1}$) has begun to then start collecting activity samples 600 from its monitored processing device 110 for the next local time window $tw_1$. For example, the local clock circuit 1108 (FIG. 11) in the LAM circuit 136 is configured to generate a local pulse $P_L$ for every 'K' pulses $P_1$ of the master clock signal 1102, where 'K' is a whole positive integer. However, to synchronize the local clock signal 1106 and thus the local time windows $tw_1$ of the LAM circuit 136, the local clock signal 1106 is synchronized to the master clock signal 1102 for the generation of each local pulse $P_L$.

The collected activity samples 600 within a local time window $tw_1$ are correlated to power consumptions and accumulated in an ongoing manner by the accumulate circuit 602 in the LAM circuit 136, as previously discussed, to then generate an activity power event 606 reported to the RAM circuit 502 and/or the PEL circuit 126, 1026. The LAM circuit 136 is configured to report an activity power event 606 for activity samples 600 collected in a given local time window $tw_1$, at the end of a respective local time window $tw_1$ triggered by a next local pulse $P_L$ of the local clock signal 1106. In this manner, the local time windows $tw_1$ controls the duration of collection of activity samples 600 by the LAM circuit 136 from a monitored processing device 110 to use to generate an activity power event 606. Also, in response to the end of a local time window $tw_1$, the LAM circuit 136 begins to collect new activity samples 600 from its monitored processing device 110 in a next local time window $tw_1$. These new activity samples are correlated to power consumptions and included in a next activity power event 606 generated in response to the next local pulse $P_L$ of the local clock signal 1106 (which may be the last local pulse $P_L$ of the previous local time window $tw_1$ signifying the end of the next local time window $tw_1$.

Figure 14B:
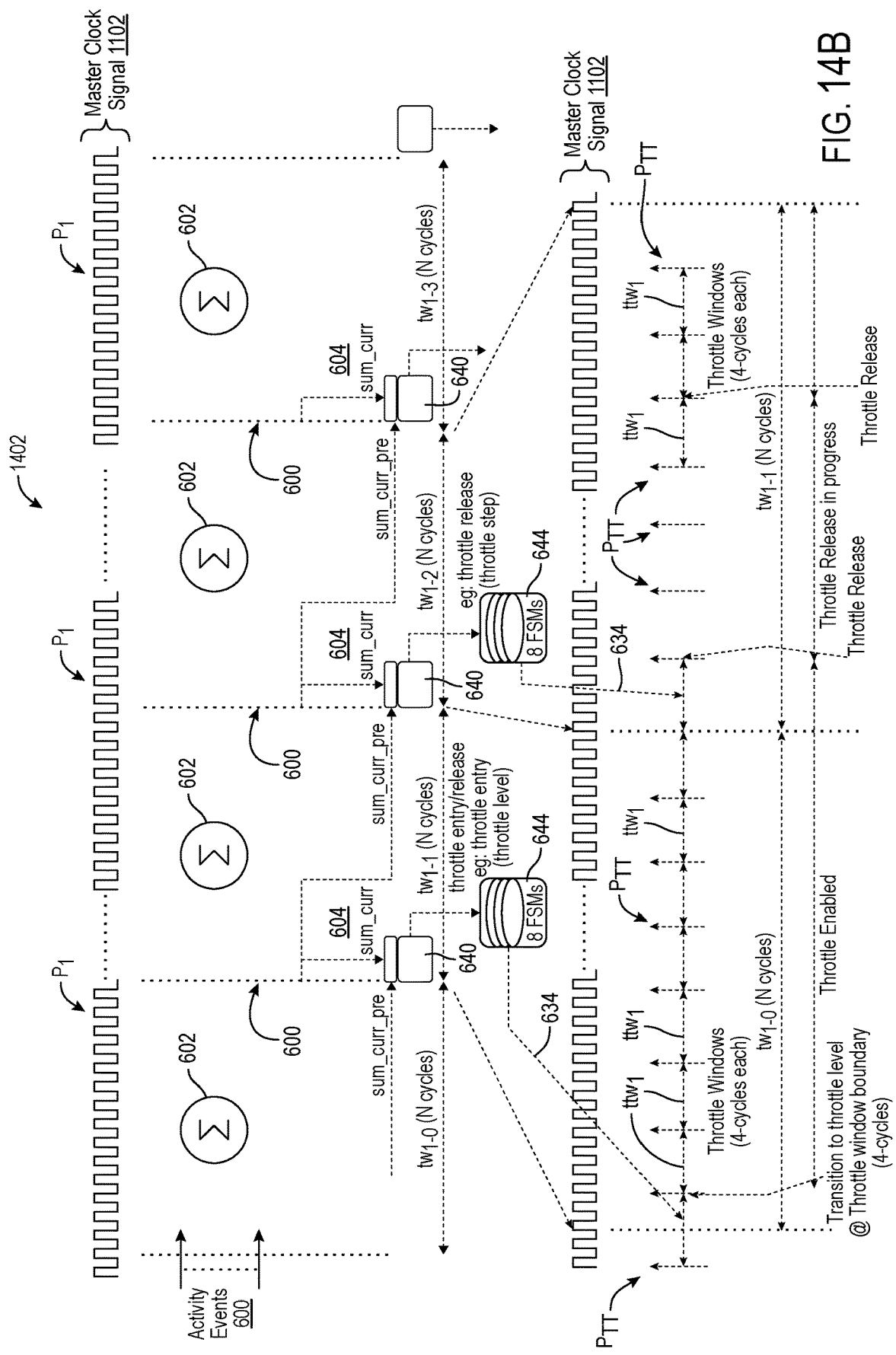
FIG. 14B is the timing diagram in FIG. 14A with additional exemplary detail provided to illustrate the timing of the local power consumption throttling of a monitored processing device by the LAM circuit based on the estimated current demand accumulated from received activity samples.

FIG. 14B is the timing diagram 1402 in FIG. 14A with additional exemplary detail provided to illustrate the timing of the local power consumption throttling of a monitored processing device 110 by the LAM circuit 136 based on the estimated current demand 604 accumulated from received activity samples 600. Common elements and timings shown between the timing diagram 1402 in FIG. 14B and the timing diagram 1400 in FIG. 14A are shown with common elements and element numbers. Common elements between the LAM circuit 136 in FIG. 6 and elements in the timing diagram 1402 in FIG. 14B are shown with common element numbers.

As shown in the timing diagram 1402 in FIG. 14B, the master clock signal 1102 can also be used by the LAM circuit 136 to synchronize local throttle windows $ttw_1$ that control the generation of the local throttle signals 634 as discussed in FIG. 6 to locally throttle power consumption of a monitored processing device 110. The LAM circuit 136 is configured to generate the local throttle windows $ttw_1$ as a function of throttle pulses PTT. In this example, a throttle pulse PTT is generated every four (4) cycles of the master clock signal 1102, and thus is synchronized to the master clock signal 1102. The duration or time between each consecutive throttle pulse PTT defines the local throttle windows $ttw_1$. When the throttle FSM circuit 644 determines that the local monitored processing device 110 assigned to the LAM circuit 136 should be power throttled based on the current flow rate determined by the estimated current demand 604 within a given local throttle windows $ttw_1$, the throttle FSM circuit 644 is configured to generate the local throttle signals 634 in a throttle enablement mode.

As shown in FIG. 14B, the throttle FSM circuit 644 can be programmed to continue to generate the throttle signals 634 once the current flow rate of the assigned processing device 110 of the LAM circuit 136 is determined by the estimated current demand 604 is beyond the desired current flow rate. The throttle FSM circuit 644 can be configured to continue to generate the local throttle signals 634 for a desired number of local throttle windows $ttw_1$ in a throttle enabled period as shown in FIG. 14B. After the defined number of local throttle windows $ttw_1$ in which power enabling through the local throttle signals 634 has passed, the throttle FSM circuit 644 can be configured to release throttling by discontinuing the generation of the local throttle signals 634. This allows the power consumption of the monitored processing device 110 to once again be controlled by the PEL circuit 126, 1026 to settle in possible new power consumption rate. Thereafter, the throttle FSM circuit 644 can again process a new estimated current demand 604 in a local time window $tw_1$ of the monitored processing device 110 be analyzed again for current flow rate to determine if locally power throttling is again appropriate in an ongoing basis, where the process of power throttling enablement and disablement can be performed as described above. As previously discussed, the LAM circuit 136 has the ability to locally throttle the power consumption of its monitored processing device 110, because this may give time for the PEL circuit 126 react to received activity power events 606 or aggregated activity power events 138 to throttle power in the IC chip 104 from a more global knowledge of power consumption by a variety of different processing devices 110 and/or other target devices 200.

Figure 15:
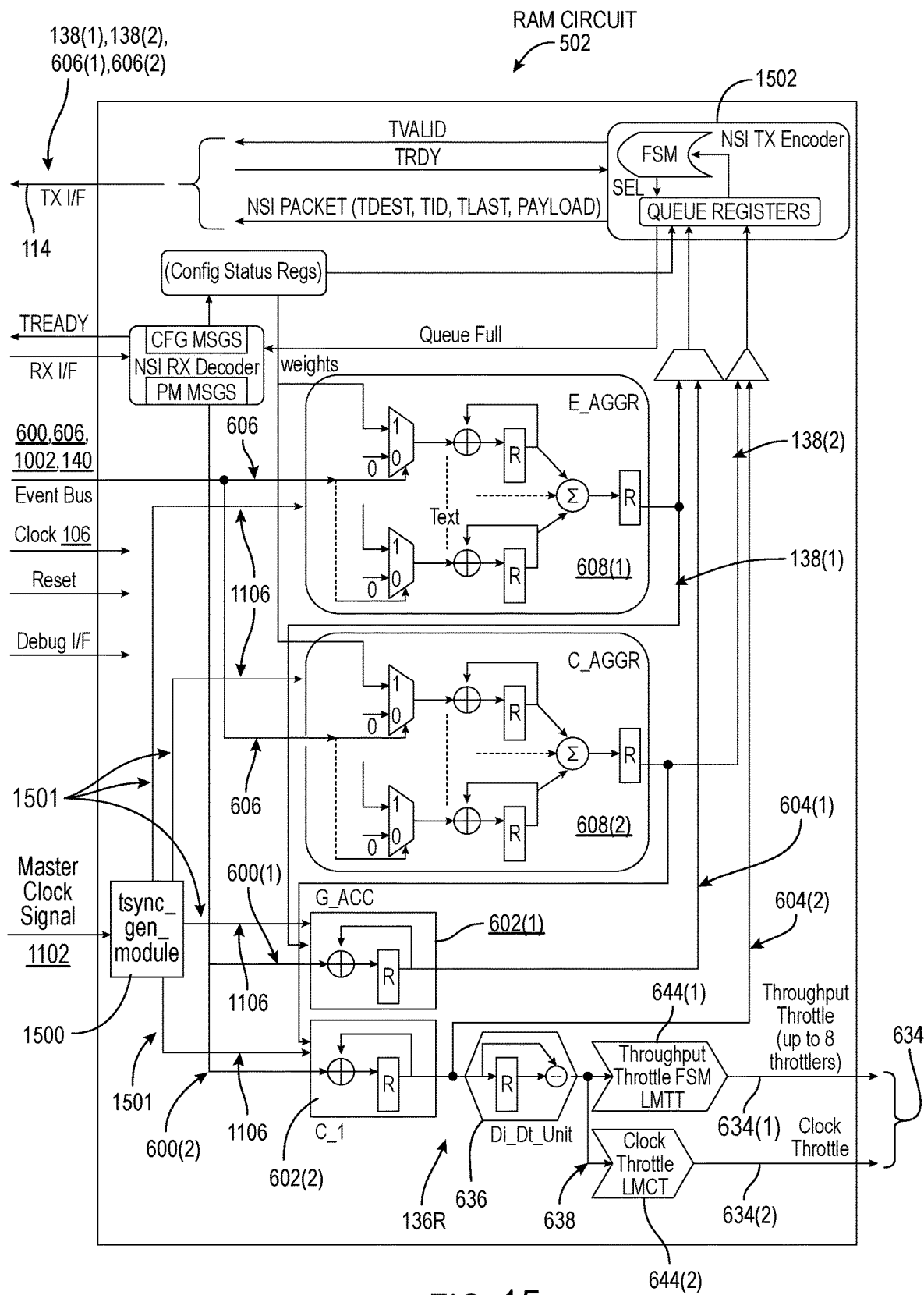
FIG. 15 is a schematic diagram of an exemplary LAM circuit that can be provided in the hierarchical power management systems in FIGS. 1-3, 5-7, and 11-12 wherein the LAM circuit includes a time synchronization generation circuit configured to generate a local clock signal based on a received master clock signal.

FIG. 15 is a schematic diagram of an exemplary RAM circuit 502 that can be provided in the hierarchical power management systems 124, 624, 724 in FIGS. 1-3, 5-7, and 11-12 to illustrate further exemplary detail of time synchronization to the master clock signal 1102. In this regard, the RAM circuit 502 shown in FIG. 15 includes both the capability to generate the aggregated activity power events 138 based on received activity power events 606 from other LAM circuits 136 as well as a LAM circuit functionality. Common components between the RAM circuit 502 in FIG. 15 and the RAM circuit 502 and its LAM circuit 136R in FIG. 6 are shown with common element numbers.

As shown in FIG. 15, the RAM circuit 502 receives a local clock signal 1106 that is also used to generate the regional clock signal 1110 or its regional pulses $P_R$ (see FIG. 11). The RAM circuit 502 includes a time synchronization circuit 1500 that is configured to receive the master clock signal 1102 and synchronize the local clock signal 1106 or regional clock signal 1110 as previously discussed in FIGS. 11, 12, and 14A. The time synchronization circuit 1500 is configured to generate a sync pulse 1501 to the master clock signal 1102 after every 'K' first pulse $P_1$ of the master clock signal 1102, wherein 'K' is a whole positive integer. The RAM circuit 502 is configured to synchronize the initial local pulse $P_L$ or regional pulse $P_R$ in each of the respective local time windows $tw_1$ or regional time windows $tw_2$ based on the respective local clock signal 1106 or regional clock signal 1110. The RAM circuit 502 in this example includes an energy aggregation circuit 608(1) that is like the aggregation circuit 608 in FIG. 6, but is configured to aggregate energy power events 138(1) (e.g., PMIC telemetry events, temperature events, voltage droop detector events) based on regional time windows $tw_2$ as previously discussed in FIGS. 11, 12, and 14A that are controlled by the regional clock signal 1110 time synchronized with the master clock signal 1102. The RAM circuit 502 in this example also includes an activity aggregation circuit 608(2) that is like the aggregation circuit 608 in FIG. 6, but is configured to aggregated activity power events 138(2) based on regional time windows tw$_2$ as previously discussed that are controlled by the regional clock signal 1110 time synchronized with the master clock signal 1102. The energy aggregation circuit 608(1) and the activity aggregation circuit 608(2) are configured to generate the aggregate energy power events 138(1) and aggregated activity power events 138(2) described in FIG. 6 for their respective energy power events 606(1) and activity power events 606(2) (like activity power events 606 described above) to be provided to an encoder circuit 1502. The encoder circuit 1502 is configured to aggregate energy power events 138(1) and aggregated activity power events 138(2) to the PEL circuit 126 over the internal communication network 114 (see also, FIG. 1).

The RAM circuit 502 in this example also includes an energy accumulate circuit 602(1) that is like the accumulate circuit 602 in FIG. 6, but is configured to accumulate energy samples 600(1) (e.g., PMIC telemetry samples, temperature samples, voltage droop detector samples) based on regional time windows tw$_2$ as previously discussed that are controlled by the regional clock signal 1110 time synchronized with the master clock signal 1102. The RAM circuit 502 in this example also includes an accumulate circuit 602(2) like the accumulate circuit 602 in FIG. 6, but the accumulate circuit 602(2) is configured to accumulate activity samples 600(2) based on regional time windows tw$_2$ as previously discussed in FIGS. 11, 12, and 14A that are controlled by the regional clock signal 1110 time synchronized with the master clock signal 1102. The energy accumulate circuit 602(1) and the activity accumulate circuit 602(2) are configured to generate estimated current demands 604(1), 604(2) like the estimated current demand 604 described in FIG. 6 for their respective accumulated energy power events 606(1) (e.g., PMIC telemetry events, temperature events, voltage droop detector events) and accumulated activity power events 606(2) (like activity power events 606 described above) to be provided to the encoder circuit 1502. The encoder circuit 1502 is configured to generate the energy power events 606(1) and activity power events 606(2) onto the internal communication network 114 (see also, FIG. 1).

As also shown in FIG. 15, the RAM circuit 502 includes the di/dt circuit 636 like shown in FIG. 6 to determine current flow rate based on the accumulated energy samples 600(1) and accumulated activity samples 600(2). The di/dt circuit 636 is configured to generate the next summed current demand 638 to a throttle FSM circuit 644 like shown in FIG. 6 to determine if a local monitored processing device 110 should be throttled in its power consumption through the generation of local throttle signals 634 in time throttle window ttw$_1$ as shown in FIG. 14B. In this example in FIG. 15, there are two throttle FSM circuits 644 provided: a throughput throttle FSM circuit 644(1) and a clock throttle FSM circuit 644(2). The throughput throttle FSM circuit 644(1) is configured to generate local throttle signals 634(1) like local throttle signals 634 in FIG. 6 based on the next summed current demand 638 to throttle the throughput of a monitored processing device 110, such as the internal communication network 114. The clock throttle FSM circuit 644(2) is configured to generate local throttle signals 634(2) like local throttle signals 634 in FIG. 6 based on the next summed current demand 638 to throttle a clock signal used to clock a processing device 110, such as the clock signal 508 generated by clock circuit 506 in FIG. 5.

Figure 16:
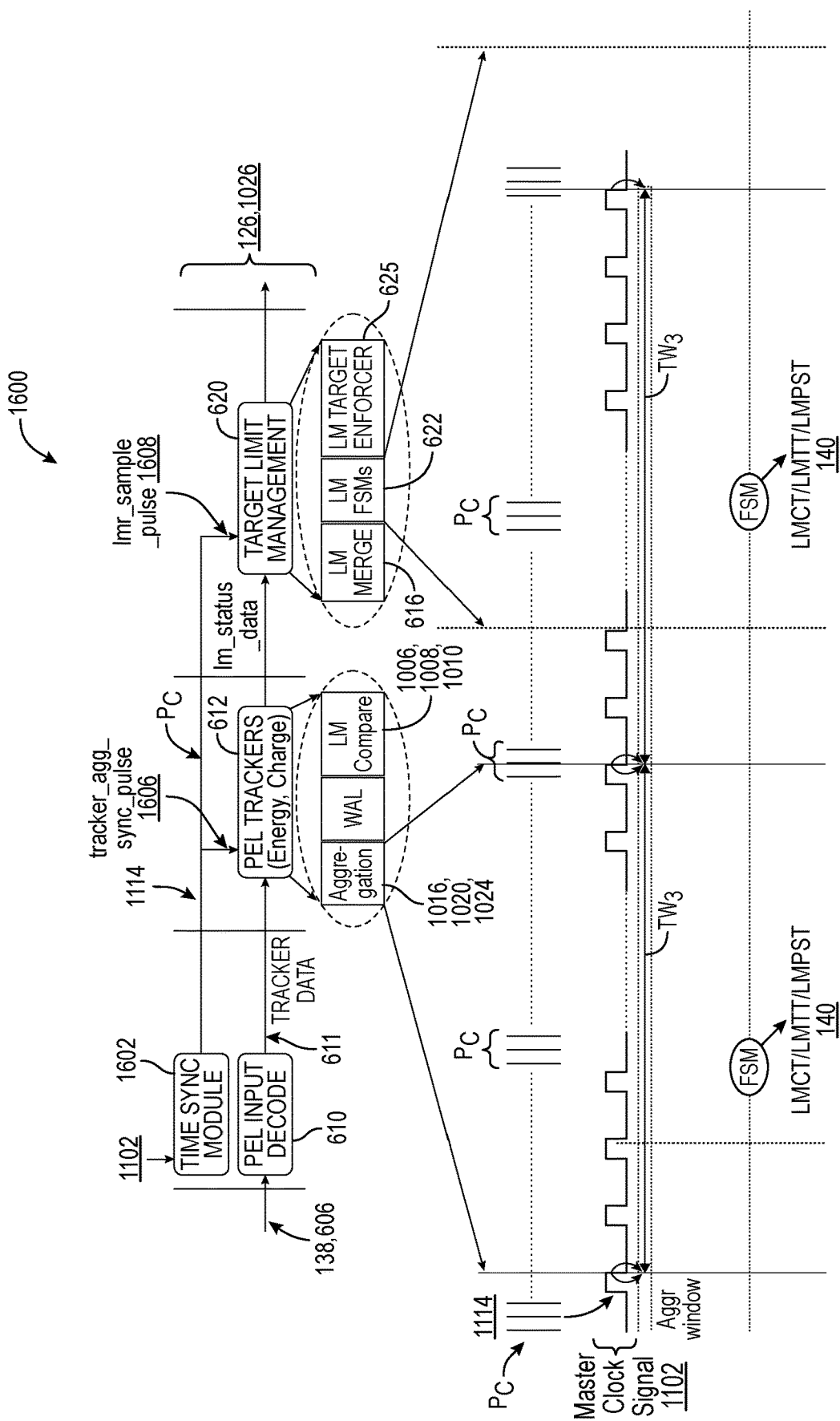
FIG. 16 is a timing diagram illustrating exemplary time windows that can be provided and synchronized in the PEL circuit in a hierarchical power management system, including the hierarchical power management systems in FIGS. 1-3, 5-7, and 11-12 so that the PEL circuit can perform reception of activity power events in a time synchronized manner as a function of time for determine power throttling in the hierarchical power management system.

FIG. 16 is a timing diagram 1600 illustrating exemplary time windows that can be provided and synchronized in the PEL circuit 126, 1026 in a hierarchical power management system, including the hierarchical power management systems 124, 624, 724 in FIGS. 1-3, 5-7, and 11-12. The timing diagram 1600 is illustrated in the context of exemplary components of the PEL circuit 126, 1026 that are shown in FIG. 6 and FIG. 10, and the timing diagram 1100 in FIG. 11 as an example with common components shown with common element numbers. As discussed below, this allows the PEL circuit 126, 1026 to perform reception of activity power events 606 and/or aggregated activity power evens 138 in a time synchronized manner as a function of time for determining power throttling in its hierarchical power management system.

As shown in FIG. 16, the PEL circuit 126, 1026 includes a time synchronization circuit 1602 that receives the master clock signal 1102 that is used to generate the centralized clock signal 1114 and its second pulses Pc (see also, FIG. 11). The time synchronization circuit 1602 is configured to generate the centralized clock signal 1114 that is synchronized to the master clock signal 1102. The time synchronization circuit 1602 is configured to synchronize the initial second pulse Pc of the centralized clock signal 1114 to define the beginning of each of the centralized time windows tw$_3$ for the PEL circuit 126, 1026 based on the master clock signal 1102. The centralized clock signal 1114 is used to clock the activity tracker circuits 612 to generate tracker pulses 1606 within a given centralized time windows tw$_3$ to control the timing of the aggregation of the decoded activity power events 611 to then determine power throttle recommendations 614, 1012, 1014 to be provided to the target circuits 620. The centralized clock signal 1114 is also used to generate target pulses 1608 within a given centralized time windows tw$_3$ to control the timing of the target circuits 620 of receiving the power throttle recommendations 614, 1012, 1014 from the activity tracker circuits 612 and generation of the power limiting management responses 140 for each centralized time windows tw$_3$ in response.

Figure 17:
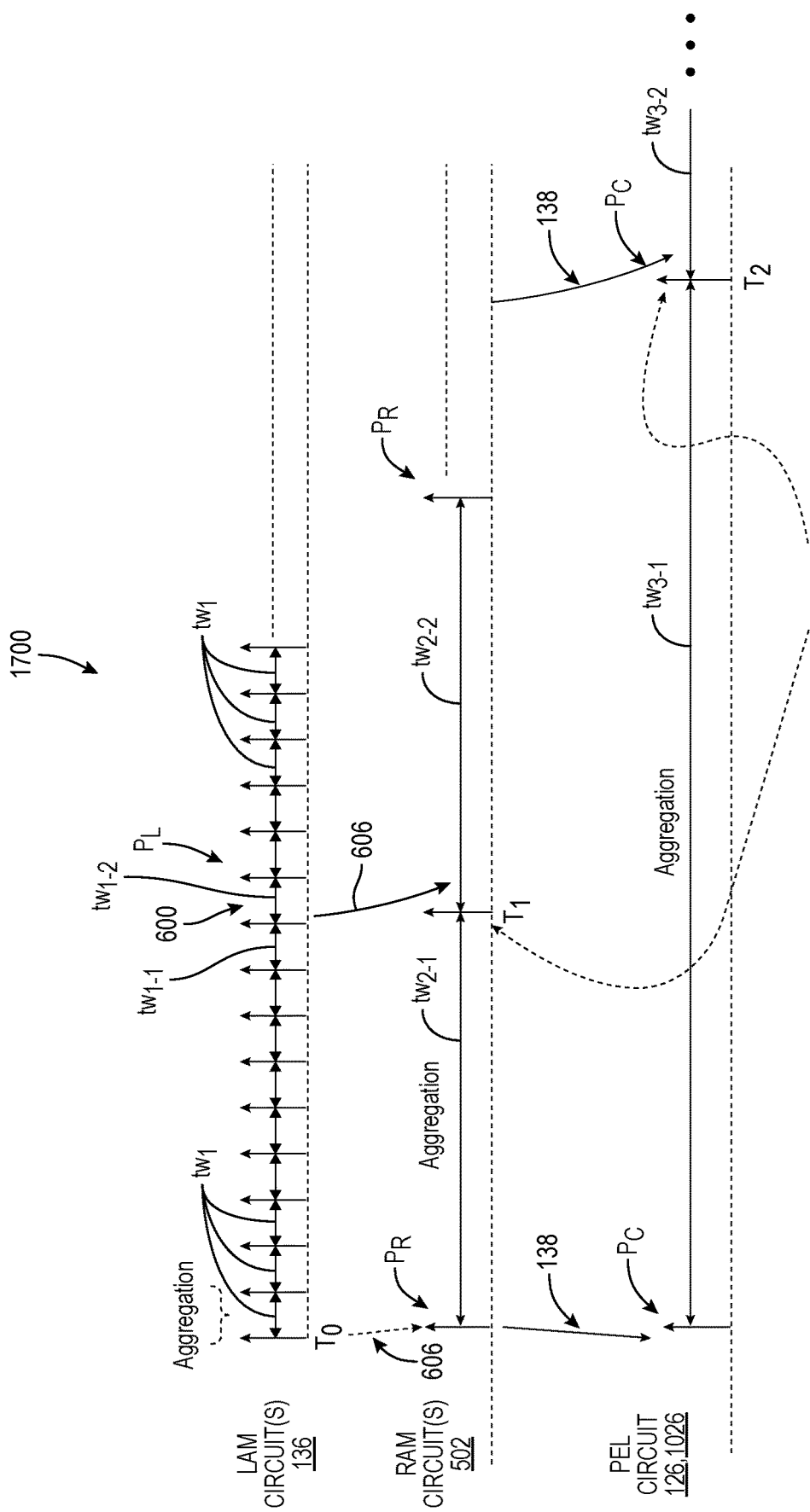
FIG. 17 is a timing diagram illustrating missing/late activity power event(s) and substitutions for missing/late activity power event(s) reported in a hierarchical power management system, including the hierarchical power management systems in FIGS. 1-3, 5-7, and 11-12.

FIG. 17 is a timing diagram 1700 illustrating missing/late activity power event(s) and substitutions for missing/late activity samples 600 and activity power event(s) 606, 138 reported in a hierarchical power management system, including the hierarchical power management systems in FIGS. 1-3, 5-7, and 11-12. As discussed above, including in FIG. 11 for example, the local time window tw$_1$ is synchronized to the master clock signal 1102 and used by the LAM circuits 136 to aggregate activity samples to generate the activity power event 606 and also to locally throttle power consumption of a local monitored processing device 110. The regional time window tw$_2$ is synchronized to the master clock signal 1102 and used by the RAM circuits 502 to process received activity power events 606 to generate the aggregated activity power events 138. The centralized time window tw$_3$ is synchronized to the master clock signal 1102 and used by the PEL circuit 126, 1026 to receive the aggregated activity power events 138 and generate power limiting management responses 140 in response to throttle power consumption in the IC chip 104. With this synchronization, the LAM circuit 136 will expect to receive a certain designed number of activity samples 600 in a given local time window tw$_1$ to then generate the activity power event 606. The RAM circuit 502 will expect to receive a certain designed number of activity power events 606 in a given regional time window tw$_2$ from its assigned LAM circuits 136 to then generate the aggregated activity power event 138. The PEL circuit 126, 1026 will expect to receive a certain designed number of aggregated activity power events 138 in a given centralized time window tw$_3$ from its assigned RAM circuits 502 to then generate the power limiting management responses 140. However, each of these circuits may not timely receive the expected number of activity samples 600, activity power events 606, and/or an aggregated activity power events 138, in a respective time window $tw_1$, time window $tw_2$, time window $tw_3$.

In this regard, with regard to the RAM circuit 502, if an expected activity power event 606 from an assigned LAM circuit 136 is not received in a given regional time window $tw_2$ by the RAM circuit 502, the RAM circuit 502 can be configured to estimate the expected, missing/late activity power event 606 and substitute the missing/late activity power event 606 with the estimated activity power event 606. This is also shown in FIG. 17, where an activity power event 606 meant to be received in the regional time window $tw_{2-1}$ is actually received in the regional time window $tw_{2-2}$. In this regard, the last received activity power event 606 by the RAM circuit 502 in the regional time window $tw_{2-1}$ can be used as a substitute for a missing/late activity power event 606. In another example, an average of a given number of last received activity power event 606 by the RAM circuit 502 can be determined and used by the RAM circuit 502 as a substitute for a missing/late activity sample(s) 600. In yet another example, a value that is stored in a register, which could be programmable, could be used as a substitute for a missing/late activity sample(s) or activity power event(s) and used by the RAM circuit 502 as a substitute for a missing/late activity sample(s) 600.

Also, with regard to the PEL circuit 126, 1026, if an expected aggregated activity power event 138 from an assigned RAM circuit 502 is not received in a given centralized time window $tw_3$ by the PEL circuit 126, 1026, the PEL circuit 126, 1026 can be configured to estimate the expected, missing/late aggregated activity power event 138 and substitute the missing/late aggregated activity power event 138 with the estimated aggregated activity power event 138. This is also shown in FIG. 17, where an aggregated activity power event 138 meant to be received in centralized time window $tw_{3-1}$ is actually received in centralized time window $tw_{3-2}$. In this regard, the last received aggregated activity power event 138 by the PEL circuit 126, 1026 in the centralized time window $tw_{2-1}$ can be used as a substitute for a missing/late aggregated activity power event 138. In another example, an average of a given number of last received aggregated activity power event 138 by the PEL circuit 126, 1026 can be determined and used by the PEL circuit 126, 1026 as a substitute for a missing/late aggregated activity power event 138 by the PEL circuit 126, 1026.

Also note that considering the hierarchical architecture of the LAM circuits 136, the RAM circuits 502, and the PEL circuit 126, there will not be missing activity samples 600 at the LAM circuits 136 in this example. This is because the LAM circuits 136 operate based on weighted activity samples 600 and related summations as described above. However, in another example, if the LAM circuit 136 did operate in manner in which an expected activity sample 600 for a monitored processing device 110 by the LAM circuit 136 was not received as expected in a given local time window $tw_1$ by the LAM circuit 136, the LAM circuit 136 could also be configured to estimate the expected, missing/late activity sample(s) 600 and substitute the missing/late activity sample(s) 600 with the estimated activity sample. This is shown in FIG. 17, where an activity sample 600 meant to be received in local time window $tw_{1-1}$ is actually received in local time window $tw_{1-2}$. In this regard, the last received activity sample 600 by the LAM circuit 136 in the local time window $tw_{1-1}$ can be used as a substitute for a missing/late activity sample 600. In another example, an average of a given number of last received activity samples 600 by the LAM circuit 136 can determined and used by the LAM circuit 136 as a substitute for a missing/late activity sample(s) 600 by the LAM circuit 136. In yet another example, a value that is stored in a register, which could be programmable, could be used as a substitute for a missing/late activity sample(s) or activity power event(s) and used by the LAM circuit 136 as a substitute for a missing/late activity sample(s) 600 by the LAM circuit 136.

A hierarchical power management system that can be provided in an IC chip for an integrated processor-based system that is configured to monitor activity of devices in the processor-based system to estimate and throttle power consumption in the processor-based system, including but not limited to the hierarchical power management systems in FIGS. 1-3, 5-7, and 11-12, wherein the LAM circuits, RAM circuits (if present), and the PEL circuit are time synchronized for reporting and receiving of activity power events for determining power consumption throttling in the hierarchical power management system, and operating according to the exemplary process 1300 in FIGS. 13A and 13B, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 18:
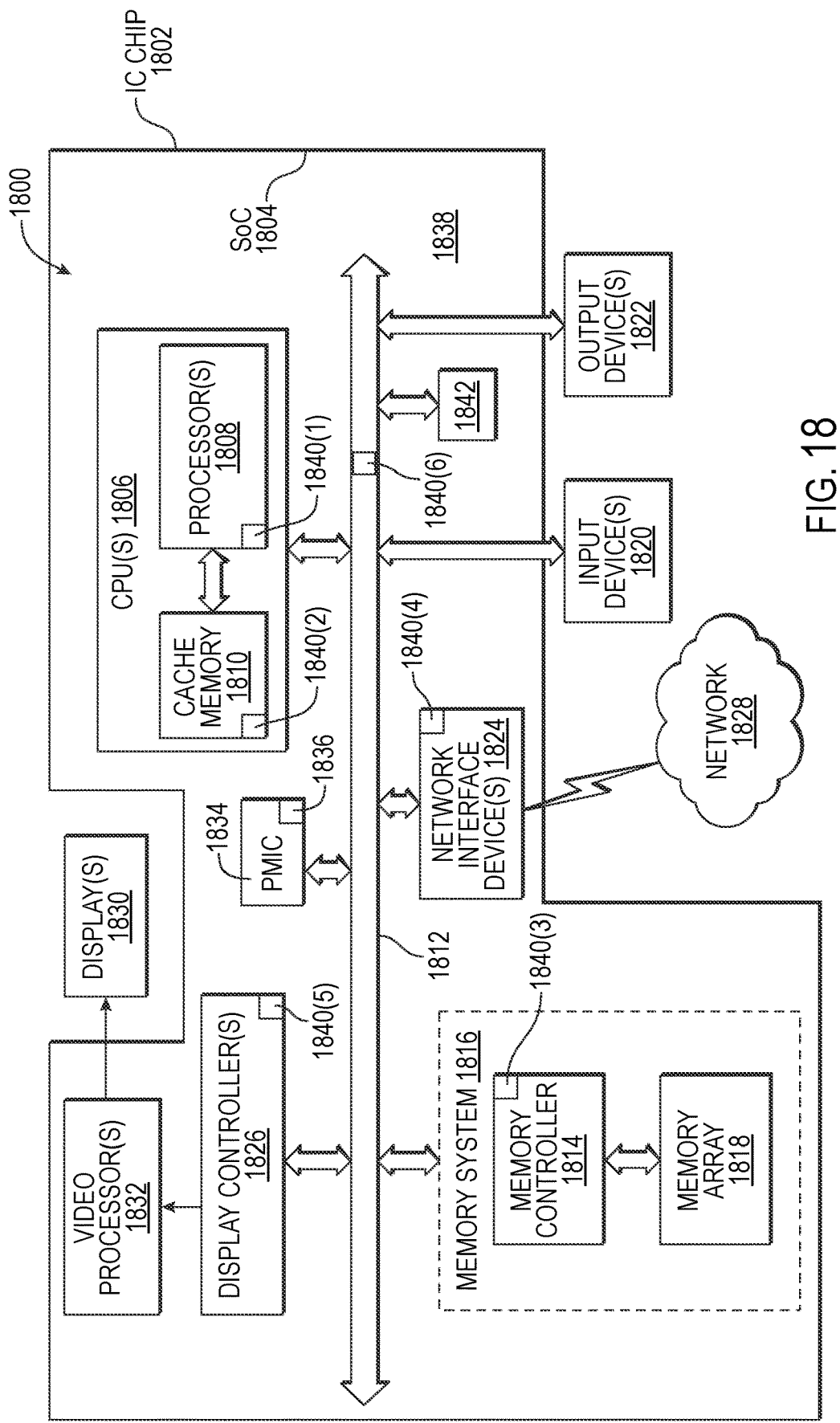
FIG. 18 is a block diagram of another exemplary processor-based system that includes a hierarchical power management system configured to monitor activity of devices in the processor-based system to estimate and throttle power consumption in the processor-based system, including but not limited to the hierarchical power management systems in FIGS. 1-3, 5-7, and 11-12, wherein the LAM circuits, RAM circuits (if present), and the PEL circuit are time synchronized for reporting and reception of activity power events for determining power consumption throttling in the hierarchical power management system.

FIG. 18 is a block diagram of another exemplary processor-based system that includes a hierarchical power management system that can be provided in an IC chip for an integrated processor-based system that is configured to monitor activity of devices in the processor-based system to estimate and throttle power consumption in the processor-based system, including but not limited to the hierarchical power management systems 124, 624, 724 in FIGS. 1-3, 5-7, and 11-12, wherein the LAM circuits, RAM circuits (if present), and the PEL circuit are time synchronized for reporting and receiving of the activity power events for determining power consumption throttling in the hierarchical power management system, and operating according to the exemplary process 1300 in FIGS. 13A and 13B, and according to any aspects disclosed herein, may be provided in or integrated into any processor-based device.

In this example, the processor-based system 1800 may be formed in an IC 1802 and as a system-on-a-chip (SoC) 1804. The processor-based system 1800 includes a central processing unit (CPU) (s) 1806 that includes one or more processors 1808, which may also be referred to as CPU cores or processor cores. The CPU 1806 may have the cache memory 1810 coupled to the CPU 1806 for rapid access to temporarily stored data. The CPU 1806 is coupled to a system bus 1812 and can intercouple master and slave devices included in the processor-based system 1800. As is well known, the CPU 1806 communicates with these other devices by exchanging address, control, and data information over the system bus 1812. For example, the CPU 1806 can communicate bus transaction requests to a memory controller 1814, as an example of a slave device. Although not illustrated in FIG. 18, multiple system buses 1812 could be provided, wherein each system bus 1812 constitutes a different fabric.

Other master and slave devices can be connected to the system bus 1812. As illustrated in FIG. 18, these devices can include a memory system 1816 that includes the memory controller 1814 and a memory array(s) 1818, one or more input devices 1820, one or more output devices 1822, one or more network interface devices 1824, and one or more display controllers 1826, as examples. The input device(s) 1820 can include any type of input device, including, but not limited to, input keys, switches, voice processors, etc. The output device(s) 1822 can include any type of output device, including, but not limited to, audio, video, other visual indicators, etc. The network interface device(s) 1824 can be any device configured to allow exchange of data to and from a network 1828. The network 1828 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1824 can be configured to support any type of communications protocol desired.

The CPU 1806 may also be configured to access the display controller(s) 1826 over the system bus 1812 to control information sent to one or more displays 1830. The display controller(s) 1826 sends information to the display(s) 1830 to be displayed via one or more video processor(s) 1832, which process the information to be displayed into a format suitable for the display(s) 1830. The display(s) 1830 can include any type of display, including, but not limited to, a cathode ray tube (CRT), a liquid crystal display (LCD), a plasma display, a light emitting diode (LED) display, etc.

The IC chip 1802 also includes a PMIC 1834 that includes a PEL circuit 1836 are part of a hierarchical power management system 1838. The PEL circuit 1836 can be the PEL circuit 126 in the hierarchical power management systems 124, 624, 724 in FIGS. 1-3, 5-7, and 9 as examples. The hierarchical power management system 1838 can include one or more LAM circuits 1840(1)-1840(6) that are associated with one or more of the processors 1808, the cache memory 1810, the memory controller 1814, the network interface device(s) 1824, the display controller 1826, and/or the system bus 1812 that are configured to monitor activity associated with these processing devices and reporting activity power events regarding activity of these devices within the hierarchical power management system 1838. The LAM circuits 1840(1)-1840(6) may be the LAM circuits 136, 136R in the hierarchical power management systems 124, 624, 724 in FIGS. 1-3, 5-7, and 10A, 12, 15 as examples. One or more RAM circuits 1842 may also be provided as part of the hierarchical power management system 1838 to receive activity power events from groupings of LAM circuits 1840(1)-1840(6) to aggregate such activity power events into aggregated activity power events to be communicated to the PEL circuit 1836. The RAM circuits 1842 may be the RAM circuits 502 in the hierarchical power management systems 124, 624, 724 in FIGS. 1-3, 5-7, 12, and 15 as examples. The hierarchical power management system 1838 can be configured so that the LAM circuits 1840(1)-1840(6), RAM circuits 1842 and PEL circuit 1836 are time synchronized to each other for reporting and receipt of activity power events 606 and aggregated activity power event 138 for throttling power consumption in the IC chip 1802 like described above in FIGS. 11-17 as examples.

Figure 19:
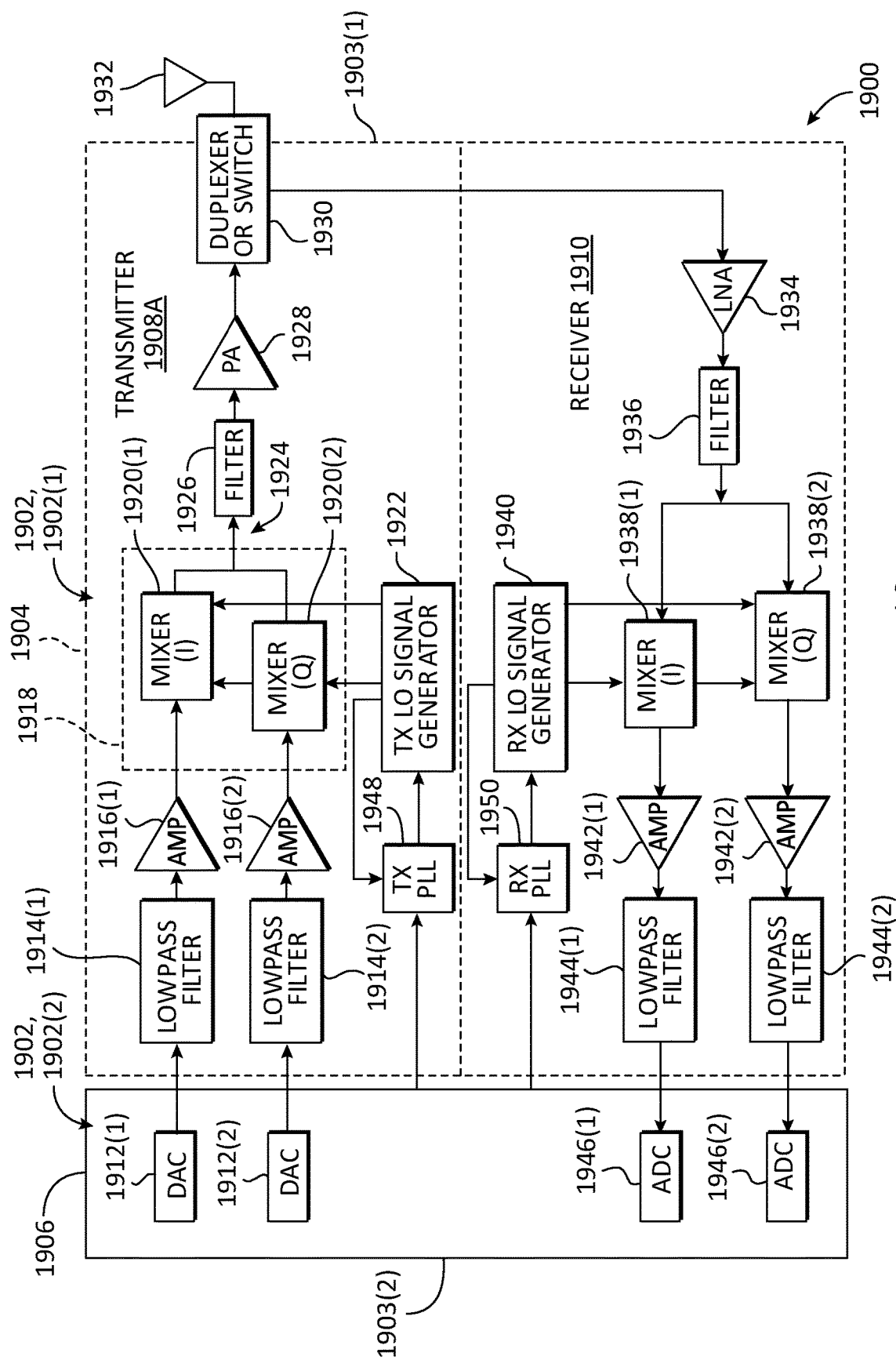
FIG. 19 is a block diagram of an exemplary wireless communications device that includes a hierarchical power management system configured to monitor activity of devices in the processor-based system to estimate and throttle power consumption in the processor-based system, including but not limited to the hierarchical power management systems in FIGS. 1-3, 5-7, and 11-12, wherein the LAM circuits, RAM circuits (if present), and the PEL circuit are time synchronized for reporting and reception of activity power events for determining power consumption throttling in the hierarchical power management system.

FIG. 19 illustrates an exemplary wireless communications device 1900 that can includes a hierarchical power management system 1902 that can be provided in an IC chip for an integrated processor-based system that is configured to monitor activity of devices in the processor-based system to estimate and throttle power consumption in the processor-based system, including but not limited to the hierarchical power management systems 124, 624, 724 in FIGS. 1-3, 5-7, and 11-12, wherein the LAM circuits, RAM circuits (if present), and the PEL circuit are time synchronized for reporting and receiving of the activity power events for determining power consumption throttling in the hierarchical power management system, and operating according to the exemplary process 1300 in FIGS. 13A and 13B, and according to any aspects disclosed herein, may be provided in or integrated into any processor-based device.

As shown in FIG. 19, the wireless communications device 1900 includes a RF transceiver 1904 and a data processor 1906. The RF transceiver 1904 and/or the data processor 1906 can include respective hierarchical power management systems 1902(1), 1902(2) configured to monitor activity of devices in the processor-based system to estimate and throttle power consumption in the processor-based system, including but not limited to the hierarchical power management systems 124, 624, 724 in FIGS. 1-3, 5-7, and 11-12, wherein the LAM circuits, RAM circuits (if present), and the PEL circuit are time synchronized for reporting and receiving of the activity power events for determining power consumption throttling in the hierarchical power management system, and operating according to the exemplary process 1300 in FIGS. 13A and 13B, and according to any aspects disclosed herein, may be provided in or integrated into any processor-based device.

The components of the RF transceiver 1904 and/or data processor 1906 can be split among multiple different die 1903(1), 1903(2). The data processor 1906 may include a memory to store data and program codes. The RF transceiver 1904 includes a transmitter 1908 and a receiver 1910 that support bi-directional communications. In general, the wireless communications device 1900 may include any number of transmitters 1908 and/or receivers 1910 for any number of communication systems and frequency bands. All or a portion of the RF transceiver 1904 may be implemented on one or more analog ICs, RF ICs, mixed-signal ICs, etc.

The transmitter 1908 or the receiver 1910 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 1910. In the direct-conversion architecture, a signal is frequency-converted between RF and baseband in one stage. The super-heterodyne and direct-conversion architectures may use different circuit blocks and/or have different requirements. In the wireless communications device 1900 in FIG. 19, the transmitter 1908 and the receiver 1910 are implemented with the direct-conversion architecture.

In the transmit path, the data processor 1906 processes data to be transmitted and provides I and Q analog output signals to the transmitter 1908. In the exemplary wireless communications device 1900, the data processor 1906 includes digital-to-analog converters (DACs) 1912(1), 1912(2) for converting digital signals generated by the data processor 1906 into the I and Q analog output signals, e.g., I and Q output currents, for further processing.

Within the transmitter 1908, lowpass filters 1914(1), 1914(2) filter the I and Q analog output signals, respectively, to remove undesired signals caused by the prior digital-to-analog conversion. Amplifiers (AMPs) 1916(1), 1916(2) amplify the signals from the lowpass filters 1914(1), 1914(2), respectively, and provide I and Q baseband signals. An upconverter 1918 upconverts the I and Q baseband signals with I and Q transmit (TX) local oscillator (LO) signals through mixers 1920(1), 1920(2) from a TX LO signal generator 1922 to provide an upconverted signal 1924. A filter 1926 filters the upconverted signal 1924 to remove undesired signals caused by the frequency upconversion as well as noise in a receive frequency band. A power amplifier (PA) 1928 amplifies the upconverted signal 1924 from the filter 1926 to obtain the desired output power level and provides a transmit RF signal. The transmit RF signal is routed through a duplexer or switch 1930 and transmitted via an antenna 1932.

In the receive path, the antenna 1932 receives signals transmitted by base stations and provides a received RF signal, which is routed through the duplexer or switch 1930 and provided to a low noise amplifier (LNA) 1934. The duplexer or switch 1930 is designed to operate with a specific receive (RX)-to-TX duplexer frequency separation, such that RX signals are isolated from TX signals. The received RF signal is amplified by the LNA 1934 and filtered by a filter 1936 to obtain a desired RF input signal. Down-conversion mixers 1938(1), 1938(2) mix the output of the filter 1936 with I and Q RX LO signals (i.e., LO_I and LO_Q) from an RX LO signal generator 1940 to generate I and Q baseband signals. The I and Q baseband signals are amplified by AMPs 1942(1), 1942(2) and further filtered by lowpass filters 1944(1), 1944(2) to obtain I and Q analog input signals, which are provided to the data processor 1906. In this example, the data processor 1906 includes analog-to-digital converters (ADCs) 1946(1), 1946(2) for converting the analog input signals into digital signals to be further processed by the data processor 1906.

In the wireless communications device 1900 of FIG. 19, the TX LO signal generator 1922 generates the I and Q TX LO signals used for frequency upconversion, while the RX LO signal generator 1940 generates the I and Q RX LO signals used for frequency downconversion. Each LO signal is a periodic signal with a particular fundamental frequency. A TX phase-locked loop (PLL) circuit 1948 receives timing information from the data processor 1906 and generates a control signal used to adjust the frequency and/or phase of the TX LO signals from the TX LO signal generator 1922. Similarly, an RX PLL circuit 1950 receives timing information from the data processor 1906 and generates a control signal used to adjust the frequency and/or phase of the RX LO signals from the RX LO signal generator 1140.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory, flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An integrated circuit (IC) chip comprising:
a plurality of processing devices each coupled to at least one power rail; and
a master clock circuit configured to generate a master clock signal comprising a plurality of first pulses of a first frequency;
a hierarchical power management system, comprising:
a plurality of local area management (LAM) circuits, comprising:
a local clock circuit configured to generate a local clock signal defining a plurality of local time windows each comprising a defined number of local pulses of the local clock signal;
the plurality of LAM circuits each configured to:
for each local time window of the plurality of local time windows:
synchronize an initial local pulse of the local time window based on the master clock signal;
sample processing activity of at least one processing device of a subset of the plurality of processing devices within the local time window comprising the defined number of local pulses of the local clock signal to generate a plurality of activity samples;
determine a current flow rate of the at least one processing device within the local time window based on the plurality of activity samples;
estimate power consumption of the at least one processing device based on the plurality of activity samples within the local time window; and
generate an activity power event based on the estimated power consumption of the at least one processing device for the local time window; and
a power estimation and limiting (PEL) circuit comprising:
a second clock circuit configured to generate a second clock signal defining a plurality of second time windows each comprising a defined number of second pulses of the second clock signal;
the PEL circuit configured to:
for each second time window of the plurality of second time windows:
synchronize an initial second pulse in the second time window based on the master clock signal;
receive the plurality of activity power events generated by the plurality of LAM circuits within the second time window; and
generate a power limiting management response to cause power consumption to be throttled in the IC chip based on the received plurality of activity power events for the second time window.

2. The IC chip of clause 1, wherein each LAM circuit of the plurality of LAM circuits is configured to generate the activity power event based on the estimated power consumption of the at least one processing device in response to a last pulse in the local time window.

3. The IC chip of clause 1 or 2, wherein:
each LAM circuit of the plurality of LAM circuits further comprises:
a time synchronization circuit configured to generate a sync pulse to the master clock signal after every K first pulses of the master clock signal, wherein 'K' is a whole positive integer; and
each LAM circuit of the plurality of LAM circuits is further configured to:
synchronize the initial local pulse of the local clock signal in each local time window of the plurality of local time windows in response to the sync pulse.

4. The IC chip of any of clauses 1-3, wherein each LAM circuit of the plurality of LAM circuits is further configured to:
determine whether the current flow rate of the at least one processing device exceeds a threshold current flow rate; and
in response to determining the current flow rate of the at least one processing device exceeds the threshold current flow rate:
throttle processing activity of the at least one processing device to throttle its power consumption.

5. The IC chip of any of clauses 1-4, wherein:
a processing device of the plurality of processing devices comprises a communication network.

6. The IC chip of clause 5, wherein:
the communication network comprises a plurality of network nodes; and
the communication network is configured to route communications from each processing unit of a plurality of processing units through one or more of the plurality of network nodes to a processing device of the plurality of processing devices.

7. The IC chip of clause 6, wherein:
a LAM circuit of the plurality of LAM circuits is coupled to at least one network node of a subset of the plurality of network nodes;
the LAM circuit is configured to, for each local time window of the plurality of local time windows:
sample the processing activity of the at least one network node of the plurality of network nodes within the local time window comprising the defined number of local pulses of the local clock signal to generate the plurality of activity samples;
determine the current flow rate of the at least one network node within the local time window based on the plurality of activity samples;
estimate the power consumption of the at least one network node based on the plurality of activity samples within the local time window; and
generate the activity power event based on the estimated power consumption of the at least one network node for the local time window.

8. The IC chip of any of clauses 1-7, wherein:
the PEL circuit is further configured to:
determine whether a throughput in a processing device of the plurality of processing devices should be throttled based on the received plurality of activity power events within the second time window;
the PEL circuit is configured to, in response to determining the throughput in the processing device of the plurality of processing devices should be throttled:
generate the power limiting management response by being configured to generate a throughput throttling power limiting management response to be received by the LAM circuit of the plurality of LAM circuits for the at least one processing device to be throughput throttled for the second time window; and each LAM circuit of the plurality of LAM circuits configured to:
receive the throughput throttling power limiting management response in response to PEL circuit generating the throughput throttling power limiting management response for its at least one processing device; and
throttle processing activity of its at least one processing device to throttle its power consumption based on the received throughput throttling power limiting management response.

9. The IC chip of any of clauses 1-8, wherein the PEL circuit is further configured to:
determine whether there are one or more missing activity power events from an expected number of the plurality of activity power events received within the second time window; and
in response to determining the one or more missing activity power events, substitute the one or more missing activity power events in the plurality of activity power events with a corresponding one or more substitute activity power events.

10. The IC chip of clause 9, wherein the PEL circuit is configured to, in response to determining the one or more missing activity power events, substitute each of the one or more missing activity power events with a last received activity power event of the received plurality of activity power events in the second time window.

11. The IC chip of clause 9 or 10, wherein the PEL circuit is configured to, in response to determining the one or more missing activity power events, substitute each of the one or more missing activity power events with an average of a designated number of last received activity power events of the received plurality of activity power events in the second time window.

12. The IC chip of any of clauses 9-11, wherein the PEL circuit is configured to, in response to determining the one or more missing activity power events, substitute each of the one or more missing activity power events with an activity power event programmed in a register.

13. The IC chip of any of clauses 1-12, wherein:
the PEL circuit is further configured to determine a throughput throttling for at least one processing device of the plurality of processing devices based on the received plurality of activity power events;
the PEL circuit is configured to, in response to determine the throughput throttling for the at least one processing device:
generate the power limiting management response by being configured to generate a throughput throttling power limiting management response to throttle the throughput of the at least one processing device based on the received plurality of activity power events for the second time window.

14. The IC chip of any of clauses 1-14, further comprising:
one or more third clock circuits each configured to generate a third clock signal to clock at least one processing device of the plurality of processing devices;
wherein:
the PEL circuit is further configured to determine a clock throttling of at least one third clock circuit of the one or more third clock circuits, to clock throttle power consumption of at least one processing device of the plurality of processing devices based on the received plurality of activity power events; and
the PEL circuit configured to, in response to determining the clock throttling for the at least one processing device:
generate the power limiting management response by being configured to generate a clock throttling power limiting management response to throttle the third clock signal based on the received plurality of activity power events for the second time window.

15. The IC chip of any of clauses 1-14, further comprising:
one or more third clock circuits each configured to generate a third clock signal to clock at least one processing device of the plurality of processing devices;
wherein:
the PEL circuit is further configured to determine a clock throttling of at least one third clock circuit of the one or more third clock circuits, to clock throttle power consumption of the plurality of processing devices based on the received plurality of activity power events;
the PEL circuit is configured to, in response to determining the clock throttling for the plurality of processing devices:
generate the power limiting management response by being configured to generate a clock throttling power limiting management response to throttle the third clock signal based on the received plurality of activity power events for the second time window.

16. The IC chip of any of clauses 1-15, wherein:
the PEL circuit is further configured to determine a performance throttling of at least one processing device of the plurality of processing devices based on the received plurality of activity power events; and
the PEL circuit is configured to, in response to determining the performance throttling for the at least one processing device:
generate the power limiting management response by being configured to generate a performance throttling power limiting management response to throttle the performance of the at least one processing device based on the received plurality of activity power events for the second time window.

17. The IC chip of any of clauses 1-16, wherein:
a period of the local pulses of the local clock signal is approximately 50 nanoseconds (ns);
a period of the plurality of local time windows is approximately 200 ns; and
a period of the second pulses of the second clock signal is approximately one (1) microsecond (μs).

18. The IC chip of any of clauses 1-17, further comprising:
a plurality of regional area management (RAM) circuits each comprising:
a regional clock circuit configured to generate a regional clock signal defining a plurality of regional time windows each comprising a defined number of regional pulses of the regional clock signal;
each RAM circuit of the plurality of RAM circuits configured to:
for each regional time window of the plurality of regional time windows:
synchronize an initial regional pulse in the regional time window based on the master clock signal;

receive the plurality of activity power events from a subset of LAM circuits of the plurality of LAM circuits in the regional time window; and generate an aggregated activity power event based on the received plurality of activity power events from the subset of LAM circuits of the plurality of LAM circuits for the regional time window; and the PEL circuit configured to:

for each second time window of the plurality of second time windows:

receive the plurality of activity power events by being configured to receive a plurality of aggregated activity power events based on the plurality of aggregated activity power events generated by the plurality of RAM circuits within the second time window; and generate a power limiting management response to cause power consumption to be throttled in the IC chip based on the received plurality of aggregated activity power events for the second time window.

19. The IC chip of clause 18, wherein at least one RAM circuit of the plurality of RAM circuits comprises at least one second LAM circuit, each second LAM circuit of the at least one second LAM circuit comprising:

a second local clock circuit configured to generate a second local clock signal defining a plurality of second local time windows each comprising a defined number of second local pulses of the second local clock signal;

each second LAM circuit of the at least one second LAM circuit is configured to:

for each second local time window of the plurality of second local time windows:

synchronize a second initial local pulse in the second local time windows based on the master clock signal;

sample second processing activity of a at least one second processing device of the plurality of processing devices within the second local time window comprising a defined number of second local pulses of the second local clock signal to generate a plurality of second activity samples;

determine a second current flow rate of the at least one second processing device within the second local time window based on the plurality of second activity samples;

estimate a second power consumption of the at least one second processing device based on the plurality of second activity samples within the second local time window; and generate a second activity power event based on the estimated second power consumption of the at least one second processing device for the second local time window; and wherein the at least one RAM circuit is further configured to:

generate the aggregated activity power event by being configured to generate the aggregated activity power event based on the received plurality of activity power events from the subset of LAM circuits of the plurality of LAM circuits and the second activity power event, for the regional time window.

20. The IC chip of clause 19, wherein the at least one RAM circuit is configured to sample the processing activity of a single second processing device of the plurality of processing devices to generate the plurality of second activity samples.

21. The IC chip of any of clauses 18-20, wherein:

the PEL circuit is further configured to:

determine whether a throughput in a processing device of the plurality of processing devices should be throttled based on the received plurality of aggregated activity power events within the second time window;

the PEL circuit is configured to, in response to determining the throughput in the processing device of the plurality of processing devices should be throttled:

generate the power limiting management response by being configured to generate a throughput throttling power limiting management response for the processing device to be throughput throttled for the second time window;

each RAM circuit of the plurality of RAM circuits configured to:

receive the throughput throttling power limiting management response in response to the PEL circuit generating the throughput throttling power limiting management response; and communicate a local throughput throttling power limiting management response to the LAM circuit of the plurality of LAM circuits for the at least one processing device to be throughput throttled; and each LAM circuit of the plurality of LAM circuits is configured to:

receive the local throughput throttling power limiting management response in response to the RAM circuit generating the local throughput throttling power limiting management response for its at least one processing device; and throttle processing activity of its at least one processing device to throttle its power consumption based on the received local throughput throttling power limiting management response.

22. The IC chip of any of clauses 18-21, wherein the processor-based system further comprises a second communication network communicatively coupled to each LAM circuit of the plurality of LAM circuits, each RAM circuit of the plurality of RAM circuits, and the PEL circuit;

each LAM circuit of the plurality of LAM circuits configured to generate the activity power event based on the estimated power consumption of the at least one processing device on the second communication network;

each RAM circuit of the plurality of RAM circuits configured to generate the aggregated activity power event on the second communication network;

and the PEL circuit configured to receive the plurality of aggregated activity power events generated by the plurality of RAM circuits on the second communication network.

23. The IC chip of any of clauses 18-22, wherein each RAM circuit of the plurality of RAM circuits is further configured to:

determine whether there are one or more missing activity power events from an expected number of activity power events of the plurality of activity power events received within the regional time window; and in response to determining the one or more missing activity power events, substitute the one or more missing activity power events in the plurality of activity power events with a corresponding one or more substitute activity power events.

24. The IC chip of clause 23, wherein each RAM circuit of the plurality of RAM circuits is further configured to, in response to determining the one or more missing activity power events, substitute each of the one or more missing activity power events with a last received activity power event of the received plurality of activity power events in the regional time window.

25. The IC chip of clause 23 or 24, wherein each RAM circuit of the plurality of RAM circuits is further configured to, in response to determining the one or more missing activity power events, substitute each of the one or more missing activity power events with an average of a designated number of last received activity power events of the received plurality of activity power events in the regional time window.

26. The IC chip of clause 5, wherein the plurality of processing devices further comprises a plurality of processing units and a plurality of supporting processing devices; the plurality of processing units and the plurality of supporting processing devices coupled to the communication network; and the plurality of processing units each configured to communicate to a supporting processing device of the plurality of supporting processing devices over the communication network.

27. The IC chip of clause 26, wherein:
the communication network comprises a plurality of network nodes; and
the communication network is configured to route communications from each processing unit of the plurality of processing units through one or more of the plurality of network nodes to a processing device of the plurality of processing devices.

28. The IC chip of any of clauses 1-27 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

29. A method of throttling power consumption in a processor-based system in an integrated circuit (IC) chip, comprising:
generating a master clock signal comprising a plurality of first pulses of a first frequency;
generating a local clock signal defining a plurality of local time windows each comprising a defined number of local pulses of the local clock signal in each local area management (LAM) circuit of a plurality of LAM circuits;
for each local time window of the plurality of local time windows:
synchronizing an initial local pulse of the local time window based on the master clock signal; and
sampling processing activity of at least one processing device of a plurality of processing devices within the local time window comprising the defined number of local pulses of the local clock signal to generate a plurality of activity samples;
determining a current flow rate of the at least one processing device within the local time window based on the plurality of activity samples;
estimating power consumption of the at least one processing device based on the plurality of activity samples within the local time window; and
generating an activity power event based on the estimated power consumption of the at least one processing device for the local time window;
generating a second clock signal defining a plurality of second time windows each comprising a defined number of second pulses of the second clock signal; and
for each second time window of the plurality of second time windows:
synchronizing an initial second pulse in the second time window based on the master clock signal;
receiving the plurality of activity power events generated by the plurality of LAM circuits within the second time window; and
generating a power limiting management response to cause the power consumption to be throttled in the IC chip based on the received plurality of activity power events for the second time window.

30. The method of clause 29, wherein generating the activity power event comprises generating the activity power event based on the estimated power consumption of the at least one processing device in response to a last pulse in the local time window.

31. The method of clause 29 or 30, further comprising, for each LAM circuit of the plurality of LAM circuits:
generating a sync pulse to the master clock signal after every K first pulses of the master clock signal, wherein 'K' is a whole positive integer in each LAM circuit of the plurality of LAM circuits; and
synchronizing the initial local pulse of the local clock signal in each local time window of the plurality of local time windows in response to the sync pulse.

32. The method of any of clauses 29-31, further comprising, for each LAM circuit of the plurality of LAM circuits:
determining whether the current flow rate of the at least one processing device exceeds a threshold current flow rate; and
throttling the processing activity of the at least one processing device to throttle its power consumption, in response to determining the current flow rate of the at least one processing device exceeds the threshold current flow rate.

33. The method of any of clauses 29-32, comprising:
sampling the processing activity of the at least one processing device comprising a network node of a plurality of network nodes in a communication network within the local time window comprising the defined number of local pulses of the local clock signal to generate the plurality of activity samples;
determining the current flow rate of the at least one network node within the local time window based on the plurality of activity samples;
estimating the power consumption of the at least one network node based on the plurality of activity samples within the local time window; and
generating the activity power event based on the estimated power consumption of the at least one network node for the local time window.

34. The method of clauses 29-33, further comprising:
determining whether a throughput in a processing device of the plurality of processing devices should be throttled based on the received plurality of activity power events within the second time window; and
comprising:

in response to determining the throughput in the processing device of the plurality of processing devices should be throttled:
  generating the power limiting management response by being configured to generate a throughput throttling power limiting management response to be received by the LAM circuit of the plurality of LAM circuits for the at least one processing device to be throughput throttled for the second time window; and
  for each LAM circuit of the plurality of LAM circuits:
    receiving the throughput throttling power limiting management response in response to a power estimation and limiting (PEL) circuit generating the throughput throttling power limiting management response for its at least one processing device; and
    throttling the processing activity of its at least one processing device to throttle its power consumption based on the received throughput throttling power limiting management response.

35. The method of any of clauses 29-34, further comprising:
  determining whether there are one or more missing activity power events from an expected number of a plurality of activity power events received within the second time window; and
  substituting the one or more missing activity power events in the plurality of activity power events with a corresponding one or more substitute activity power events, in response to determining the one or more missing activity power events.

36. The method of any of clauses 29-35, further comprising:
  determining a throughput throttling for at least one processing device of the plurality of processing devices based on a received plurality of activity power events; and
  comprising:
    generating the power limiting management response by being configured to generate a throughput throttling power limiting management response to throttle the throughput of the at least one processing device based on the received plurality of activity power events for the second time window in response to determining the throughput throttling for the at least one processing device.

37. The method of any of clauses 29-36, further comprising:
  generating one or more third clock signals in one or more third clock circuits to clock at least one processing device of the plurality of processing devices;
  determining a clock throttling of at least one third clock circuit of the one or more third clock circuits, to clock throttle power consumption of at least one processing device of the plurality of processing devices based on a received plurality of activity power events; and
  comprising:
    generating the power limiting management response by being configured to generate a clock throttling power limiting management response to throttle at least one third clock signal based on the received plurality of activity power events for the second time window in response to determining the clock throttling for the at least one processing device.

38. The method of any of clauses 29-37, further comprising:
  generating one or more third clock signals in one or more third clock circuits each configured to clock at least one processing device of the plurality of processing devices;
  determining a clock throttling of at least one third clock circuit of the one or more third clock circuits, to clock throttle power consumption of the plurality of processing devices based on a received plurality of activity power events; and
  comprising:
    generating the power limiting management response by being configured to generate a clock throttling power limiting management response to throttle at least one third clock signal based on the received plurality of activity power events for the second time window, in response to determining the clock throttling for the plurality of processing devices.

39. The method of any of clauses 29-38, comprising:
  determining a performance throttling of at least one processing device of the plurality of processing devices based on a received plurality of activity power events; and
  generating the power limiting management response by being configured to generate a performance throttling power limiting management response to throttle the performance of the at least one processing device based on the received plurality of activity power events for the second time window, in response to determining the performance throttling for the at least one processing device.

40. The method of any of clauses 29-39, further comprising:
  generating a regional clock signal in a regional clock circuit in a regional area management (RAM) circuit of a plurality of RAM circuits defining a plurality of regional time windows each comprising a defined number of regional pulses of the regional clock signal; and
  further comprising, for each RAM circuit of the plurality of RAM circuits:
    for each regional time window of the plurality of regional time windows:
      synchronizing an initial regional pulse in the regional time window based on the master clock signal;
      receiving a plurality of activity power events from a subset of LAM circuits of the plurality of LAM circuits in the regional time window; and
      generating an aggregated activity power event based on the received plurality of activity power events from the subset of LAM circuits of the plurality of LAM circuits for the regional time window; and
  comprising:
    for each second time window of the plurality of second time windows:
      receiving the plurality of activity power events by being configured to receive a plurality of aggregated activity power events based on the plurality of aggregated activity power events generated by the plurality of RAM circuits within the second time window; and
      generating a power limiting management response to cause power consumption to be throttled in the IC chip based on the received plurality of aggregated activity power events for the second time window.

41. The method of clause 40, further comprising, for at least one second LAM circuit of the plurality of LAM circuits:
generating a second local clock signal in a second local clock circuit defining a plurality of second local time windows each comprising a defined number of second local pulses of the second local clock signal; and
for each second local time window of the plurality of second local time windows:
synchronizing a second initial local pulse in the second local time window based on the master clock signal;
sampling a second processing activity of at least one second processing device of the plurality of processing devices within the second local time window comprising the defined number of second local pulses of the second local clock signal to generate a plurality of second activity samples;
determining a second current flow rate of the at least one second processing device within the second local time window based on the plurality of second activity samples;
estimating a second power consumption of the at least one second processing device based on the plurality of second activity samples within the second local time window; and
generating a second activity power event based on the estimated second power consumption of the at least one second processing device for the second local time window; and
comprising generating the plurality of aggregated activity power events by being configured to generate the plurality of aggregated activity power events based on the received plurality of activity power events from the subset of LAM circuits of the plurality of LAM circuits and the second activity power event, for the regional time window.

42. An apparatus comprising means configured for executing the method of any one of clauses 29 to 41.

43. A computer program comprising instructions to cause the apparatus of clause 42 to execute the steps of the method of any one of claims 29 to 41.

What is claimed is:

1. An integrated circuit (IC) chip comprising:
a plurality of processing devices each coupled to at least one power rail; and
a master clock circuit configured to generate a master clock signal comprising a plurality of first pulses of a first frequency;
a hierarchical power management system, comprising:
a plurality of local area management (LAM) circuits, comprising:
a local clock circuit configured to generate a local clock signal defining a plurality of local time windows each comprising a defined number of local pulses of the local clock signal;
the plurality of LAM circuits each configured to:
for each local time window of the plurality of local time windows:
synchronize an initial local pulse of the local time window based on the master clock signal;
sample processing activity of at least one processing device of a subset of the plurality of processing devices within the local time window comprising the defined number of local pulses of the local clock signal to generate a plurality of activity samples;
determine a current flow rate of the at least one processing device within the local time window based on the plurality of activity samples;
estimate power consumption of the at least one processing device based on the plurality of activity samples within the local time window; and
generate an activity power event based on the estimated power consumption of the at least one processing device for the local time window; and
a power estimation and limiting (PEL) circuit comprising:
a second clock circuit configured to generate a second clock signal defining a plurality of second time windows each comprising a defined number of second pulses of the second clock signal;
the PEL circuit configured to:
for each second time window of the plurality of second time windows:
synchronize an initial second pulse in the second time window based on the master clock signal;
receive the plurality of activity power events generated by the plurality of LAM circuits within the second time window; and
generate a power limiting management response to cause power consumption to be throttled in the IC chip based on the received plurality of activity power events for the second time window.

2. The IC chip of claim 1, wherein each LAM circuit of the plurality of LAM circuits is configured to generate the activity power event based on the estimated power consumption of the at least one processing device in response to a last pulse in the local time window.

3. The IC chip of claim 1, wherein:
each LAM circuit of the plurality of LAM circuits further comprises:
a time synchronization circuit configured to generate a sync pulse to the master clock signal after every K first pulses of the master clock signal, wherein 'K' is a whole positive integer; and
each LAM circuit of the plurality of LAM circuits is further configured to:
synchronize the initial local pulse of the local clock signal in each local time window of the plurality of local time windows in response to the sync pulse.

4. The IC chip of claim 1, wherein each LAM circuit of the plurality of LAM circuits is further configured to:
determine whether the current flow rate of the at least one processing device exceeds a threshold current flow rate; and
in response to determining the current flow rate of the at least one processing device exceeds the threshold current flow rate:
throttle processing activity of the at least one processing device to throttle its power consumption.

5. The IC chip of claim 1, wherein:
a processing device of the plurality of processing devices comprises a communication network;
the communication network comprises a plurality of network nodes; and
the communication network is configured to route communications from each processing unit of a plurality of processing units through one or more of the plurality of network nodes to a processing device of the plurality of processing devices.

6. The IC chip of claim 5, wherein:
a LAM circuit of the plurality of LAM circuits is coupled to at least one network node of a subset of the plurality of network nodes;
the LAM circuit is configured to, for each local time window of the plurality of local time windows:
sample the processing activity of the at least one network node of the plurality of network nodes within the local time window comprising the defined number of local pulses of the local clock signal to generate the plurality of activity samples;
determine the current flow rate of the at least one network node within the local time window based on the plurality of activity samples;
estimate the power consumption of the at least one network node based on the plurality of activity samples within the local time window; and
generate the activity power event based on the estimated power consumption of the at least one network node for the local time window.

7. The IC chip of claim 5, wherein the plurality of processing devices further comprises a plurality of processing units and a plurality of supporting processing devices;
the plurality of processing units and the plurality of supporting processing devices coupled to the communication network; and
the plurality of processing units each configured to communicate to a supporting processing device of the plurality of supporting processing devices over the communication network.

8. The IC chip of claim 7, wherein:
the communication network comprises a plurality of network nodes; and
the communication network is configured to route communications from each processing unit of the plurality of processing units through one or more of the plurality of network nodes to a processing device of the plurality of processing devices.

9. The IC chip of claim 1, wherein:
the PEL circuit is further configured to:
determine whether a throughput in a processing device of the plurality of processing devices should be throttled based on the received plurality of activity power events within the second time window;
the PEL circuit is configured to, in response to determining the throughput in the processing device of the plurality of processing devices should be throttled:
generate the power limiting management response by being configured to generate a throughput throttling power limiting management response to be received by the LAM circuit of the plurality of LAM circuits for the at least one processing device to be throughput throttled for the second time window; and
each LAM circuit of the plurality of LAM circuits configured to:
receive the throughput throttling power limiting management response in response to PEL circuit generating the throughput throttling power limiting management response for its at least one processing device; and
throttle processing activity of its at least one processing device to throttle its power consumption based on the received throughput throttling power limiting management response.

10. The IC chip of claim 1, wherein the PEL circuit is further configured to:
determine whether there are one or more missing activity power events from an expected number of the plurality of activity power events received within the second time window; and
in response to determining the one or more missing activity power events, substitute the one or more missing activity power events in the plurality of activity power events with a corresponding one or more substitute activity power events.

11. The IC chip of claim 10, wherein the PEL circuit is configured to, in response to determining the one or more missing activity power events, substitute each of the one or more missing activity power events with a last received activity power event of the received plurality of activity power events in the second time window.

12. The IC chip of claim 10, wherein the PEL circuit is configured to, in response to determining the one or more missing activity power events, substitute each of the one or more missing activity power events with an average of a designated number of last received activity power events of the received plurality of activity power events in the second time window.

13. The IC chip of claim 10, wherein the PEL circuit is configured to, in response to determining the one or more missing activity power events, substitute each of the one or more missing activity power events with an activity power event programmed in a register.

14. The IC chip of claim 1, wherein:
the PEL circuit is further configured to determine a throughput throttling for at least one processing device of the plurality of processing devices based on the received plurality of activity power events;
the PEL circuit is configured to, in response to determine the throughput throttling for the at least one processing device:
generate the power limiting management response by being configured to generate a throughput throttling power limiting management response to throttle the throughput of the at least one processing device based on the received plurality of activity power events for the second time window.

15. The IC chip of claim 1, further comprising:
one or more third clock circuits each configured to generate a third clock signal to clock at least one processing device of the plurality of processing devices;
wherein:
the PEL circuit is further configured to determine a clock throttling of at least one third clock circuit of the one or more third clock circuits, to clock throttle power consumption of at least one processing device of the plurality of processing devices based on the received plurality of activity power events; and
the PEL circuit configured to, in response to determining the clock throttling for the at least one processing device:
generate the power limiting management response by being configured to generate a clock throttling power limiting management response to throttle the third clock signal based on the received plurality of activity power events for the second time window.

16. The IC chip of claim 1, further comprising:
one or more third clock circuits each configured to generate a third clock signal to clock at least one processing device of the plurality of processing devices;
wherein:
   the PEL circuit is further configured to determine a clock throttling of at least one third clock circuit of the one or more third clock circuits, to clock throttle power consumption of the plurality of processing devices based on the received plurality of activity power events;
   the PEL circuit is configured to, in response to determining the clock throttling for the plurality of processing devices:
      generate the power limiting management response by being configured to generate a clock throttling power limiting management response to throttle the third clock signal based on the received plurality of activity power events for the second time window.

17. The IC chip of claim 1, wherein:
the PEL circuit is further configured to determine a performance throttling of at least one processing device of the plurality of processing devices based on the received plurality of activity power events; and
the PEL circuit is configured to, in response to determining the performance throttling for the at least one processing device:
   generate the power limiting management response by being configured to generate a performance throttling power limiting management response to throttle the performance of the at least one processing device based on the received plurality of activity power events for the second time window.

18. The IC chip of claim 1, further comprising:
a plurality of regional area management (RAM) circuits each comprising:
   a regional clock circuit configured to generate a regional clock signal defining a plurality of regional time windows each comprising a defined number of regional pulses of the regional clock signal;
each RAM circuit of the plurality of RAM circuits configured to:
   for each regional time window of the plurality of regional time windows:
      synchronize an initial regional pulse in the regional time window based on the master clock signal;
      receive the plurality of activity power events from a subset of LAM circuits of the plurality of LAM circuits in the regional time window; and
      generate an aggregated activity power event based on the received plurality of activity power events from the subset of LAM circuits of the plurality of LAM circuits for the regional time window; and
the PEL circuit configured to:
   for each second time window of the plurality of second time windows:
      receive the plurality of activity power events by being configured to receive a plurality of aggregated activity power events based on the plurality of aggregated activity power events generated by the plurality of RAM circuits within the second time window; and
      generate a power limiting management response to cause power consumption to be throttled in the IC chip based on the received plurality of aggregated activity power events for the second time window.

19. The IC chip of claim 18, wherein at least one RAM circuit of the plurality of RAM circuits comprises at least one second LAM circuit, each second LAM circuit of the at least one second LAM circuit comprising:
   a second local clock circuit configured to generate a second local clock signal defining a plurality of second local time windows each comprising a defined number of second local pulses of the second local clock signal;
each second LAM circuit of the at least one second LAM circuit is configured to:
   for each second local time window of the plurality of second local time windows:
      synchronize a second initial local pulse in the second local time windows based on the master clock signal;
      sample second processing activity of a at least one second processing device of the plurality of processing devices within the second local time window comprising a defined number of second local pulses of the second local clock signal to generate a plurality of second activity samples;
      determine a second current flow rate of the at least one second processing device within the second local time window based on the plurality of second activity samples;
      estimate a second power consumption of the at least one second processing device based on the plurality of second activity samples within the second local time window; and
      generate a second activity power event based on the estimated second power consumption of the at least one second processing device for the second local time window; and
   wherein the at least one RAM circuit is further configured to:
      generate the aggregated activity power event by being configured to generate the aggregated activity power event based on the received plurality of activity power events from the subset of LAM circuits of the plurality of LAM circuits and the second activity power event, for the regional time window.

20. The IC chip of claim 19, wherein the at least one RAM circuit is configured to sample the processing activity of a single second processing device of the plurality of processing devices to generate the plurality of second activity samples.

21. The IC chip of claim 18, wherein:
the PEL circuit is further configured to:
   determine whether a throughput in a processing device of the plurality of processing devices should be throttled based on the received plurality of aggregated activity power events within the second time window;
the PEL circuit is configured to, in response to determining the throughput in the processing device of the plurality of processing devices should be throttled:
   generate the power limiting management response by being configured to generate a throughput throttling power limiting management response for the processing device to be throughput throttled for the second time window;
each RAM circuit of the plurality of RAM circuits configured to:
   receive the throughput throttling power limiting management response in response to the PEL circuit generating the throughput throttling power limiting management response; and communicate a local throughput throttling power limiting management response to the LAM circuit of the plurality of LAM circuits for the at least one processing device to be throughput throttled; and each LAM circuit of the plurality of LAM circuits is configured to:

receive the local throughput throttling power limiting management response in response to the RAM circuit generating the local throughput throttling power limiting management response for its at least one processing device; and throttle processing activity of its at least one processing device to throttle its power consumption based on the received local throughput throttling power limiting management response.

22. The IC chip of claim 18, wherein the processor-based system further comprises a second communication network communicatively coupled to each LAM circuit of the plurality of LAM circuits, each RAM circuit of the plurality of RAM circuits, and the PEL circuit;

each LAM circuit of the plurality of LAM circuits configured to generate the activity power event based on the estimated power consumption of the at least one processing device on the second communication network;

each RAM circuit of the plurality of RAM circuits configured to generate the aggregated activity power event on the second communication network; and the PEL circuit configured to receive the plurality of aggregated activity power events generated by the plurality of RAM circuits on the second communication network.

23. The IC chip of claim 18, wherein each RAM circuit of the plurality of RAM circuits is further configured to:

determine whether there are one or more missing activity power events from an expected number of activity power events of the plurality of activity power events received within the regional time window; and in response to determining the one or more missing activity power events, substitute the one or more missing activity power events in the plurality of activity power events with a corresponding one or more substitute activity power events.

24. The IC chip of claim 23, wherein each RAM circuit of the plurality of RAM circuits is further configured to, in response to determining the one or more missing activity power events, substitute each of the one or more missing activity power events with a last received activity power event of the received plurality of activity power events in the regional time window.

25. The IC chip of claim 23, wherein each RAM circuit of the plurality of RAM circuits is further configured to, in response to determining the one or more missing activity power events, substitute each of the one or more missing activity power events with an average of a designated number of last received activity power events of the received plurality of activity power events in the regional time window.

26. The IC chip of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

27. A method of throttling power consumption in a processor-based system in an integrated circuit (IC) chip, comprising:

generating a master clock signal comprising a plurality of first pulses of a first frequency;

generating a local clock signal defining a plurality of local time windows each comprising a defined number of local pulses of the local clock signal in each local area management (LAM) circuit of a plurality of LAM circuits;

for each local time window of the plurality of local time windows:

synchronizing an initial local pulse of the local time window based on the master clock signal; and sampling processing activity of at least one processing device of a plurality of processing devices within the local time window comprising the defined number of local pulses of the local clock signal to generate a plurality of activity samples;

determining a current flow rate of the at least one processing device within the local time window based on the plurality of activity samples;

estimating power consumption of the at least one processing device based on the plurality of activity samples within the local time window; and generating an activity power event based on the estimated power consumption of the at least one processing device for the local time window;

generating a second clock signal defining a plurality of second time windows each comprising a defined number of second pulses of the second clock signal; and for each second time window of the plurality of second time windows:

synchronizing an initial second pulse in the second time window based on the master clock signal;

receiving the plurality of activity power events generated by the plurality of LAM circuits within the second time window; and generating a power limiting management response to cause the power consumption to be throttled in the IC chip based on the received plurality of activity power events for the second time window.

28. The method of claim 27, wherein generating the activity power event comprises generating the activity power event based on the estimated power consumption of the at least one processing device in response to a last pulse in the local time window.

29. The method of claim 27, further comprising, for each LAM circuit of the plurality of LAM circuits:

generating a sync pulse to the master clock signal after every K first pulses of the master clock signal, wherein 'K' is a whole positive integer in each LAM circuit of the plurality of LAM circuits; and synchronizing the initial local pulse of the local clock signal in each local time window of the plurality of local time windows in response to the sync pulse.

30. The method of claim 27, further comprising, for each LAM circuit of the plurality of LAM circuits:
  determining whether the current flow rate of the at least one processing device exceeds a threshold current flow rate; and
  throttling the processing activity of the at least one processing device to throttle its power consumption, in response to determining the current flow rate of the at least one processing device exceeds the threshold current flow rate.

31. The method of claim 27, comprising:
  sampling the processing activity of the at least one processing device comprising a network node of a plurality of network nodes in a communication network within the local time window comprising the defined number of local pulses of the local clock signal to generate the plurality of activity samples;
  determining the current flow rate of the at least one network node within the local time window based on the plurality of activity samples;
  estimating the power consumption of the at least one network node based on the plurality of activity samples within the local time window; and
  generating the activity power event based on the estimated power consumption of the at least one network node for the local time window.

32. The method of claim 27, further comprising:
  determining whether a throughput in a processing device of the plurality of processing devices should be throttled based on the received plurality of activity power events within the second time window; and
  comprising:
    in response to determining the throughput in the processing device of the plurality of processing devices should be throttled:
      generating the power limiting management response by being configured to generate a throughput throttling power limiting management response to be received by the LAM circuit of the plurality of LAM circuits for the at least one processing device to be throughput throttled for the second time window; and
      for each LAM circuit of the plurality of LAM circuits:
        receiving the throughput throttling power limiting management response in response to a power estimation and limiting (PEL) circuit generating the throughput throttling power limiting management response for its at least one processing device; and
        throttling the processing activity of its at least one processing device to throttle its power consumption based on the received throughput throttling power limiting management response.

33. The method of claim 27, further comprising:
  determining whether there are one or more missing activity power events from an expected number of a plurality of activity power events received within the second time window; and
  substituting the one or more missing activity power events in the plurality of activity power events with a corresponding one or more substitute activity power events, in response to determining the one or more missing activity power events.

34. The method of claim 27, further comprising:
  determining a throughput throttling for at least one processing device of the plurality of processing devices based on a received plurality of activity power events; and
  comprising:
    generating the power limiting management response by being configured to generate a throughput throttling power limiting management response to throttle the throughput of the at least one processing device based on the received plurality of activity power events for the second time window in response to determining the throughput throttling for the at least one processing device.

35. The method of claim 27, further comprising:
  generating one or more third clock signals in one or more third clock circuits to clock at least one processing device of the plurality of processing devices;
  determining a clock throttling of at least one third clock circuit of the one or more third clock circuits, to clock throttle power consumption of at least one processing device of the plurality of processing devices based on a received plurality of activity power events; and
  comprising:
    generating the power limiting management response by being configured to generate a clock throttling power limiting management response to throttle at least one third clock signal based on a received plurality of activity power events for the second time window in response to determining the clock throttling for the at least one processing device.

36. The method of claim 27, further comprising:
  generating one or more third clock signals in one or more third clock circuits each configured to clock at least one processing device of the plurality of processing devices;
  determining a clock throttling of at least one third clock circuit of the one or more third clock circuits, to clock throttle power consumption of the plurality of processing devices based on a received plurality of activity power events; and
  comprising:
    generating the power limiting management response by being configured to generate a clock throttling power limiting management response to throttle at least one third clock signal based on the received plurality of activity power events for the second time window, in response to determining the clock throttling for the plurality of processing devices.

37. The method of claim 27, comprising:
  determining a performance throttling of at least one processing device of the plurality of processing devices based on a received plurality of activity power events; and
  generating the power limiting management response by being configured to generate a performance throttling power limiting management response to throttle the performance of the at least one processing device based on the received plurality of activity power events for the second time window, in response to determining the performance throttling for the at least one processing device.

38. The method of claim 27, further comprising:
  generating a regional clock signal in a regional clock circuit in a regional area management (RAM) circuit of a plurality of RAM circuits defining a plurality of regional time windows each comprising a defined number of regional pulses of the regional clock signal; and
further comprising, for each RAM circuit of the plurality of RAM circuits:
for each regional time window of the plurality of regional time windows:
synchronizing an initial regional pulse in the regional time window based on the master clock signal;
receiving a plurality of activity power events from a subset of LAM circuits of the plurality of LAM circuits in the regional time window; and
generating an aggregated activity power event based on the received plurality of activity power events from the subset of LAM circuits of the plurality of LAM circuits for the regional time window; and
comprising:
for each second time window of the plurality of second time windows:
receiving the plurality of activity power events by being configured to receive a plurality of aggregated activity power events based on the plurality of aggregated activity power events generated by the plurality of RAM circuits within the second time window; and
generating a power limiting management response to cause power consumption to be throttled in the IC chip based on the received plurality of aggregated activity power events for the second time window.

39. The method of claim 38, further comprising, for at least one second LAM circuit of the plurality of LAM circuits:
generating a second local clock signal in a second local clock circuit defining a plurality of second local time windows each comprising a defined number of second local pulses of the second local clock signal; and
for each second local time window of the plurality of second local time windows:
synchronizing a second initial local pulse in the second local time window based on the master clock signal;
sampling a second processing activity of at least one second processing device of the plurality of processing devices within the second local time window comprising the defined number of second local pulses of the second local clock signal to generate a plurality of second activity samples;
determining a second current flow rate of the at least one second processing device within the second local time window based on the plurality of second activity samples;
estimating a second power consumption of the at least one second processing device based on the plurality of second activity samples within the second local time window; and
generating a second activity power event based on the estimated second power consumption of the at least one second processing device for the second local time window; and
comprising generating the plurality of aggregated activity power events by being configured to generate the plurality of aggregated activity power events based on the received plurality of activity power events from the subset of LAM circuits of the plurality of LAM circuits and the second activity power event, for the regional time window.

* * * * *